United States Patent
Fujiwara et al.

(10) Patent No.: US 7,113,784 B2
(45) Date of Patent: Sep. 26, 2006

(54) METHOD OF REGISTERING POSITION OF MOBILE COMMUNICATION TERMINAL, GENERAL CALLING METHOD FOR MOBILE COMMUNICATION TERMINAL AND MOBILE COMMUNICATION SYSTEM

(75) Inventors: Masumi Fujiwara, Yokosuka (JP); Masami Yabusaki, Kashiwa (JP); Yugo Watanabe, Yokohama (JP); Masahiro Sawada, Yokohama (JP); Kouji Sasada, Kamakura (JP)

(73) Assignee: NTT DoCoMo, Inc., Tokyo (JP)

( * ) Notice: Subject to any disclaimer, the term of this patent is extended or adjusted under 35 U.S.C. 154(b) by 527 days.

(21) Appl. No.: 10/182,926

(22) PCT Filed: Nov. 16, 2001

(86) PCT No.: PCT/JP01/10046

§ 371 (c)(1),
(2), (4) Date: Jul. 30, 2002

(87) PCT Pub. No.: WO02/41659

PCT Pub. Date: May 23, 2002

(65) Prior Publication Data

US 2003/0013445 A1 Jan. 16, 2003

(30) Foreign Application Priority Data

Nov. 16, 2000 (JP) ........................ 2000-350320
Jan. 19, 2001 (JP) ........................ 2001-12390
Jan. 26, 2001 (JP) ........................ 2001-19154

(51) Int. Cl.
*H04Q 7/20* (2006.01)

(52) U.S. Cl. ................ 455/435.1; 455/435.2; 455/435.3; 455/433; 455/456.2; 455/414.1; 455/414.2; 455/445; 455/422.1

(58) Field of Classification Search .............. 455/435.1, 455/435.3, 433, 456.1, 422.1, 414.1, 414.2, 455/456.2, 456.3, 445, 552.1, 553.1
See application file for complete search history.

(56) References Cited

U.S. PATENT DOCUMENTS 5,559,865 A   9/1996  Gilhousen
5,577,264 A * 11/1996  Tuohino .................. 455/432.1

(Continued)

FOREIGN PATENT DOCUMENTS

| AU | 9746850 A | 11/1998 |
|----|-----------|---------|
| JP | 7-30962   | 1/1995  |
| JP | 10-173789 | 6/1998  |
| WO | WO 94/08406 | 4/1994 |

OTHER PUBLICATIONS

Patent Abstract of Japan for JP11–355835.
Gu, D. L.; Pei, G.; Ly, H.; Gerla, M.; Hong, X., "Hierarchical Routing for Multi–Layer Ad–Hoc Wireless Networks with UAVs," *IEEE*, 2000, pp. 310–314.

(Continued)

*Primary Examiner*—Marceau Milord
(74) *Attorney, Agent, or Firm*—Brinks Hofer Gilson & Lione

(57) ABSTRACT

A relay device installed in a moving unit can, by notifying an own identification number to a mobile communication network along with identification numbers of all mobile communication terminals subordinate to itself, perform en bloc updating of location registration area information of these mobile communication terminals. This relay device can receive an en bloc paging request wherein paging requests to plural subordinate mobile communication terminals are aggregated, reconstruct the received en bloc paging request, and transmit the paging requests to each of the mobile communication terminals subordinate to itself.

40 Claims, 30 Drawing Sheets

U.S. PATENT DOCUMENTS

| | | | |
|---|---|---|---|
| 5,815,810 A | * | 9/1998 | Gallant et al. ............... 455/433 |
| 5,828,958 A | * | 10/1998 | Ishida et al. ................ 455/433 |
| 5,898,922 A | * | 4/1999 | Reininghaus ............... 455/433 |
| 5,970,408 A | | 10/1999 | Carlsson et al. |
| 6,097,942 A | * | 8/2000 | Laiho ...................... 455/414.1 |
| 6,272,344 B1 | | 8/2001 | Kojima |
| 6,330,446 B1 | * | 12/2001 | Mori ....................... 455/435.2 |
| 6,466,785 B1 | * | 10/2002 | Chambert et al. ....... 455/422.1 |
| 6,466,788 B1 | * | 10/2002 | Carlsson ................. 455/435.2 |
| 6,556,831 B1 | * | 4/2003 | Buppelmann ............... 455/403 |
| 6,646,999 B1 | * | 11/2003 | Kato et al. .................. 370/329 |

OTHER PUBLICATIONS

Pei, G.; Gerla, M.; Hong, X.; Chiang, C., "A Wireless Hierarchical Routing Protocol with Group Mobility," *IEEE*, 1999, pp. 1538–1542.

* cited by examiner

| MOVING UNIT IDENTIFICATION NUMBER | TERMINAL IDENTIFICATION NUMBER |
|---|---|
| TID-01 | 654321 |
| | 333343 |
| | 777555 |
| | 123123 |
| | 456456 |

| TERMINAL IDENTIFICATION NUMBER / MOVING UNIT IDENTIFICATION NUMBER | LOCATION REGISTRATION AREA INFORMATION |
|---|---|
| 001001 | LOCATION REGISTRATION AREA 5C |
| 234567 | LOCATION REGISTRATION AREA 5C |
| TID-01 | LOCATION REGISTRATION AREA 5A |
| 123456 | LOCATION REGISTRATION AREA 5B |

| TERMINAL IDENTIFICATION NUMBER / MOVING UNIT IDENTIFICATION NUMBER | LOCATION REGISTRATION AREA INFORMATION |
|---|---|
| 001001 | LOCATION REGISTRATION AREA 5C |
| 234567 | LOCATION REGISTRATION AREA 5C |
| TID-01 | LOCATION REGISTRATION AREA 5A |
| 123456 | LOCATION REGISTRATION AREA 5B |
| 654321 | LOCATION REGISTRATION AREA 5A |
| 333343 | LOCATION REGISTRATION AREA 5A |
| 777555 | LOCATION REGISTRATION AREA 5A |
| ... | ... |

METHOD OF REGISTERING POSITION OF MOBILE COMMUNICATION TERMINAL, GENERAL CALLING METHOD FOR MOBILE COMMUNICATION TERMINAL AND MOBILE COMMUNICATION SYSTEM

TECHNICAL FIELD

The present invention relates to a location registration method for mobile communication terminals, an en bloc paging method for mobile communication terminals, a mobile communication terminal, a relay device, a location information managing device, an en bloc paging request generating device, a switch, a mobile communication network, and a mobile communication system.

It is known that with mobile communication services, generally, the locations of mobile communication terminals such as cellular phones and the like are stored in location information managing devices (so-called location registers) so that the mobile communication terminals can terminate at any location. Specifically, an area where a mobile communication service is provided is divided into plural location registration areas, and upon a mobile communication terminal moving from one location registration area to another location registration area, a location registration request which determines the post-move location registration area is transmitted from the mobile communication terminal to the network. The location registration areas of each of the mobile communication terminals stored in the location information registration device are sequentially updated, according to this location registration request. Now, in the event that a termination request to a certain mobile communication terminal occurs, the stored contents of the location information managing device are referred to, which location registration area the subject mobile communication terminal belongs to is determined, an paging request is generated, and transmitted to the paging destination mobile communication terminal, via a switch and base stations belonging to the determined location registration area.

However, in the event that a great number of passengers having mobile communication terminals are on a train or the like for example, this means that a great number of mobile communication terminals simultaneously move together with the train. Accordingly, in the event that the train moves from one location registration area to another location registration area, location registration requests are sent from these mobile communication terminals all at once, so there has been the problem that the location management traffic of the network temporarily increases drastically.

As a technique for solving this problem, Japanese Unexamined Patent Application Publication 11-355835 for example proposes a mobile communication system wherein location registration requests from plural mobile communication terminals within a train are represented by a communication device installed in the train. With this mobile communication system, the plural mobile communication terminals within the train perform location registration with the aforementioned communication device as a virtual base station device. On the other hand, upon the train moving from one location registration area to another location registration area, the aforementioned communication device transmits a location registration request to a control station device via a base station device, thereby realizing representing the location registration operation of plural mobile communication terminals within a train by a communication device.

However, with the mobile communication system disclosed in the above-described Publication, the plural mobile communication terminals situated within the train transmit subordination information indicating subordination to the aforementioned communication device, to the control station device.

Accordingly, in the event that a great number of people get on a train all at once at rush hour or the like, this means that subordination information is transmitted from the mobile communication terminals to the control station device all at once. Accordingly, even in the event that the above mobile communication system is used, there is a limit to sufficient reduction of communication traffic between the base station device and the control station device.

Also, with such a mobile communication system, in the event that there are termination requests to each of the plural mobile communication terminals within the train, individual paging requests have had to be transmitted from the base station. That is to say, the conventional mobile communication system has had the problem that, even though the traffic relating to location registration requests can be reduced, the traffic relating to paging requests cannot be reduced.

Further, the aforementioned mobile communication system has had the problem that a special communication device has to be installed in the train.

DISCLOSURE OF INVENTION

The present invention provides a mobile communication terminal location registration method for registering, with a mobile communication network, location registration area information indicating which location registration area a mobile communication terminal belongs to; wherein, in the event that the mobile communication terminal enters into a moving unit, the moving unit makes registration with the mobile communication network that the mobile communication terminal is subordinate to the moving unit; and wherein in the event that there has been a change in the location registration area to which the moving unit belongs, the moving unit registers location registration area information indicating the location registration area to which the mobile communication terminal following the change belongs, in behalf of the mobile communication terminal contained therein. This will be referred to as a First location registration method, for convenience.

With the first location registration method, the mobile communication terminal may notifies the moving unit of a hierarchical registration request to the effect of registering a subordination relation as to the moving unit, with the moving unit storing the fact that the mobile communication terminal is subordinate to itself, while registering the subordination relation to the mobile communication network. This will be referred to as a Second location registration method, for convenience.

Also, with the first location registration method, the stage at which the moving unit registers subordination of mobile communication terminal to the moving unit with the mobile communication network may be performed simultaneously with the stage for the moving unit to register the location registration area information with the mobile communication network.

Also, with the first location registration method, the stage at which the moving unit registers subordination of mobile communication terminal to the moving unit with the mobile communication network may be performed by registering a terminal identification number for identifying the mobile communication terminal and a moving unit identification number for identifying the moving unit as a set with the mobile communication network.

The present invention provides a mobile communication terminal location registration method for registering, with a mobile communication network, location registration area information indicating which location registration area a mobile communication terminal belongs to; wherein, in the event that the mobile communication terminal enters into a moving unit, registration is made with the moving unit that the mobile communication terminal is subordinate to the moving unit; and wherein in the event that there has been a change in the location registration area to which the moving unit belongs, the moving unit registers location registration area information indicating the location registration area to which the mobile communication terminal following the change belongs, in behalf of the mobile communication terminal contained therein. This will be referred to as a Third location registration method, for convenience.

Also, with the first or second location registration methods, in the event that the mobile communication terminal departs from the moving unit and the subordination relation is released, the mobile communication terminal may notify the mobile communication network of a release request for releasing the subordination relation. These will be referred to as Fourth and Fifth location registration methods, for convenience.

Also, with the fourth or fifth location registration methods, the mobile communication terminal may notify the mobile communication network of the release request via the moving unit.

Also, with the second or third location registration methods, in the event that the mobile communication terminal departs from the moving unit and the subordination relation is released, the mobile communication terminal may notify the moving unit of a release request for releasing the subordination relation. Further, the mobile communication terminal may notify the moving unit of the release request via the mobile communication network.

The present invention provides a mobile communication terminal location registration method for registering, with a mobile communication network, location registration area information indicating which location registration area mobile communication terminals belong to; wherein plural mobile communication terminals are placed in a hierarchical subordination relation; wherein a mobile communication terminal serving as a child notifies terminal identification numbers of mobile communication terminals at lower hierarchical levels than itself to a mobile communication terminal serving as a parent, along with own terminal identification number; and wherein a mobile communication terminal at the highest order registers, in the mobile communication network, terminal identification numbers of mobile communication terminals at lower hierarchical levels than itself to the mobile communication network, along with own terminal identification number; and wherein, in the event that there is a change in the location registration area, only the highest order mobile communication terminal registers the location registration area information with the mobile communication network. This will be referred to as a Sixth location registration method, for convenience.

The present invention provides a mobile communication terminal location registration method for registering, with a mobile communication network, location registration area information indicating which location registration area mobile communication terminals belong to; wherein plural mobile communication terminals are placed in a hierarchical subordination relation; wherein a mobile communication terminal serving as a child notifies a mobile communication terminal, serving as a parent, of a terminal identification number; and wherein a mobile communication terminal serving as a parent registers, with the mobile communication network, the terminal identification number of a mobile communication terminal serving as a child, along with own terminal identification number; and wherein, in the event that there is a change in the location registration area, the mobile communication network updates the location registration area information for only the highest order mobile communication terminal. This will be referred to as a Seventh location registration method, for convenience.

With the sixth or seventh location registration methods, the mobile communication terminal serving as a parent may store the terminal identification number of a mobile communication terminal serving as a child. These will be referred to as eighth and ninth location registration methods, for convenience.

The present invention provides a mobile communication terminal location registration method for registering, with a mobile communication network, location registration area information indicating which location registration area mobile communication terminals belong to; wherein plural mobile communication terminals are placed in a hierarchical subordination relation; wherein a mobile communication terminal serving as a child registers, with the mobile communication network, the terminal identification number of a parent and own terminal identification number, upon receiving a terminal identification number from a mobile communication terminal serving as a parent; and wherein, in the event that there is a change in the location registration area, the mobile communication network updates the location registration area information for only the highest order mobile communication terminal. This will be referred to as a Tenth location registration method, for convenience.

The present invention provides a mobile communication terminal location registration method for registering, with a mobile communication network, location registration area information indicating which location registration area mobile communication terminals belong to; wherein plural mobile communication terminals are placed in a hierarchical subordination relation; wherein a mobile communication terminal serving as a child notifies a mobile communication terminal, serving as a parent, of a terminal identification number; and wherein a mobile communication terminal serving as a parent stores the terminal identification number of a mobile communication terminal serving as a child; and wherein, in the event that there is a change in the location registration area, the mobile communication terminal serving as a parent registers the location registration area information with the mobile communication network. This will be referred to as an Eleventh location registration method, for convenience.

With the sixth through tenth location registration methods, in the event of releasing a parent-child subordination relation, the child mobile communication terminal may notify the mobile communication network of the terminal identification number of the parent mobile communication terminal and own terminal identification number; and the mobile communication network may release the parent-child subordination relation based on the terminal identification number of the child and the terminal identification number of the parent. Further, the child mobile communication terminal may notify the mobile communication network of the terminal identification number of the parent and own terminal identification number via the parent mobile communication terminal.

Also, with the eighth, ninth, or eleventh location registration methods, in the event of releasing a parent-child subordination relation, the child mobile communication terminal may notify the parent mobile communication terminal of the terminal identification number of the parent mobile communication terminal and own terminal identification number, and the parent mobile communication terminal may delete the terminal identification number of the child mobile communication terminal.

Also, with the eighth, ninth, or eleventh location registration methods, in the event of releasing a parent-child subordination relation, the child mobile communication terminal may notify the mobile communication network of a release request containing the terminal identification number of the parent mobile communication terminal and own terminal identification number, the mobile communication network may notify the release request to the parent mobile communication terminal, and the parent mobile communication terminal may delete the terminal identification number of the child mobile communication terminal.

The present invention provides an en bloc paging method for mobile communication terminals, wherein a plurality of mobile communication terminals are aggregated to form a group, and one of the mobile communication terminals belonging to the group is set as a representative mobile communication terminal, the mobile communication terminals performing communication with a mobile communication network which stores which location registration area the representative mobile communication terminal belongs to as well as the correlation between other mobile communication terminals belonging to the group and the representative mobile communication terminal; wherein termination requests occurring within a predetermined time are stored; and wherein, of the termination requests, those with the mobile communication terminals correlated to the same the representative mobile communication terminal as the termination destinations thereof are specified; and wherein an en bloc paging request for specifying all of the mobile communication terminals correlating to the specified plurality of termination requests is generated; and wherein the en bloc paging request is transmitted to the location registration area where the representative mobile communication terminal exists. This will be referred to as a First en bloc paging method, for convenience.

With the first en bloc paging method, upon the representative mobile communication terminal receiving an en bloc paging request, the representative mobile communication terminal may transmit an paging request to the mobile communication terminals specified by the en bloc paging request. This will be referred to as a Second en bloc paging method, for convenience.

With the second en bloc paging method, upon the mobile communication terminals receiving the paging request from the representative mobile communication terminal, the mobile communication terminals may each transmit paging responses to the mobile communication network. This will be referred to as a Third en bloc paging method, for convenience.

With the second en bloc paging method, upon the mobile communication terminals each receiving the paging request from the representative mobile communication terminal, the mobile communication terminals may each transmit the paging responses to the representative mobile communication terminal, and the representative mobile communication terminal may transmit the paging responses that have been received, to the mobile communication network. This will be referred to as a Fourth en bloc paging method, for convenience.

With the second en bloc paging method, upon the mobile communication terminals each receiving the paging request from the representative mobile communication terminal, the mobile communication terminals may each transmit paging responses to the representative mobile communication terminal, and the representative mobile communication terminal may generate an en bloc paging response obtained by aggregation of the paging responses that have been received, and transmit this to the mobile communication network. This will be referred to as a Fifth en bloc paging method, for convenience.

With the fourth or fifth en bloc paging methods, the mobile communication network may comprise a plurality of base stations and a plurality of switches, with the mobile communication terminals transmitting the paging responses to the representative mobile communication terminal with a smaller transmitting power as compared to the transmitting power for communicating with the base stations. These will be referred to as a Sixth or Seventh en bloc paging method, for convenience.

With the fifth en bloc paging method, the mobile communication network may comprise a plurality of switches and a plurality of base stations, with the representative mobile communication terminal transmitting the en bloc paging responses to the switches via the base stations, and the switches dividing the en bloc paging response that has been received and generating the paging responses. This will be referred to as an Eighth en bloc paging method, for convenience.

With the first through eighth en bloc paging methods, the representative mobile communication terminal may be a predetermined mobile communication terminal.

The present invention provides a relay device which is installed in a moving unit and which registers location registration area information indicating which location registration area that mobile communication terminals contained within the moving unit belong to, with a mobile communication network; the relay device comprising: a transmission/reception unit for performing transmission/reception of signals with an external device; a first storing unit which, upon the transmission/reception unit receiving, from the mobile communication terminal, a hierarchy request containing a terminal identification number for identifying the mobile communication terminal, stores the terminal identification number that has been received; a second storing unit for storing, beforehand, a moving unit identification number for identifying the moving unit; a third storing unit for storing location registration area information indicating a location registration area; and a control unit which, in the event of detecting a change in the location registration area upon comparing location registration area information received from the mobile communication network via the transmission/reception unit with location registration area information stored in the third storing unit, stores the received location registration area information in the third storing unit, but which, on the other hand, in the event of detecting change in first location registration area following reception of the hierarchy request, transmits a hierarchy location registration request containing the moving unit identification number, the terminal identification numbers, and the new location registration area information, to the mobile communication network, using the transmission/reception unit. This will be referred to as a First relay device, for convenience.

The present invention provides a relay device for performing communication with a mobile communication network wherein a plurality of mobile communication terminals are aggregated and registered as a group, and wherein in the event that there are termination requests within a predetermined time to a plurality of mobile communication terminals belonging to the group, an en bloc paging request which is a compilation of the paging requests corresponding to the termination requests is transmitted, the relay device comprising: a reception unit for receiving the en bloc paging request; a processing unit for dividing the en bloc paging request that has been received and generating the paging requests; and a transmitting unit for transmitting the generated paging requests to the mobile communication terminals belonging to the group. This will be referred to as a Second relay device, for convenience.

With the second relay device, the en bloc paging request may contain each set of terminal identification information for identifying the mobile communication terminals corresponding to each the termination request, with the processing unit combining each set of terminal identification information contained in the en bloc paging request that has been received, and identification information for identifying the relay device, and generating the paging requests. This will be referred to as a Third relay device, for convenience.

Also, with the second relay device, the mobile communication network may comprise a plurality of switches and a plurality of base stations, with the en bloc paging request being transmitted via the base stations, and containing each set of terminal identification information for identifying the mobile communication terminals corresponding to the termination requests, and the processing unit generating the termination requests for each set of the terminal identification information contained in the en bloc paging requests received. This will be referred to as a Fourth relay device, for convenience.

With the third relay device, the reception unit may receive the paging responses transmitted from the mobile communication terminals, with the processing unit aggregating the paging responses received in each predetermined time and generating an en bloc paging response, and the transmission unit transmitting the generated en bloc paging response to the base station. This will be referred to as a Fifth relay device, for convenience.

With the second through fifth relay devices, the relay device may be configured of a mobile communication terminal.

The present invention provides a mobile communication terminal which, upon being contained in a moving unit to which a relay device is disposed, registers location registration area information indicating which location registration area it belongs to, with a mobile communication network, using the relay device, the mobile communication terminal comprising: a transmission/reception unit for performing transmission/reception of signals with an external device; an advertisement information monitoring unit for detecting whether or not the mobile communication terminal is subordinate to the relay device, based on advertisement information transmitted from the relay device using the transmission/reception unit; and a control unit for, in the event that the state of the mobile communication terminal changes from a state of non-subordination to the relay device to a state of subordination, transmitting a hierarchical registration request for registering the subordination relation to the relay device or the mobile communication network, using the transmission/reception unit. This will be referred to as a First mobile communication terminal, for convenience.

With the first mobile communication terminal, in the event that the state of the mobile communication terminal changes from a state of subordination to the relay device to a state of non-subordination, the control unit may transmit a release request for releasing the subordination relation to the relay device or the mobile communication network, using the transmission/reception unit.

With the first mobile communication terminal, the advertisement information may contain a moving unit identification number for identifying the moving unit, and the mobile communication terminal may comprise: a moving unit identification number storing unit for storing the moving unit identification number; and a terminal identification number storing unit for storing a terminal identification number for identifying the mobile communication terminal; with the control unit transmitting the release request containing the moving unit identification number read out from the moving unit identification number storing unit and the terminal identification number read out from the terminal identification number storing unit, using the transmission/reception unit.

The present invention provides a mobile communication terminal which performs communication with a mobile communication network, and autonomously constructs hierarchical relations with other mobile communication terminals, the mobile communication terminal comprising: a first storing unit for storing own terminal identification number for identifying the mobile communication terminal; an advertisement unit for performing advertisement of terminal advertisement information containing the own terminal identification number; a hierarchy unit wherein, in the event of receiving the terminal advertisement information advertised from another mobile communication terminal, one of the mobile communication terminal and the other mobile communication terminal becomes a parent and the other becomes a child, following predetermined rules; a second storing unit for storing a child terminal identification number for identifying the mobile communication terminal to be a child, in the event that the mobile communication terminal becomes a parent; and a third storing unit for storing a parent terminal identification number for identifying the mobile communication terminal to be a parent, in the event that the mobile communication terminal becomes a child. This will be referred to as a Second mobile communication terminal, for convenience.

With the second mobile communication terminal, in the event that the mobile communication terminal becomes a parent, a hierarchy registration request containing the own terminal identification number and the child terminal identification number may be transmitted to the mobile communication network.

Also, with the second mobile communication terminal, in the event that the mobile communication terminal becomes a child, a hierarchy registration request containing the own terminal identification number and the parent terminal identification number may be transmitted to the mobile communication network.

Also, with the second mobile communication terminal, in the event of releasing the hierarchical relation after the mobile communication terminal has become a child, a release request containing the own terminal identification number and the parent terminal identification number may be transmitted to the mobile communication network.

The present invention provides a location information managing device which is used with a mobile communication network comprising a plurality of base stations which perform communication with mobile communication terminals and a plurality of switches which perform communication with the base stations, for performing communication with the plurality of switches and managing location registration area information indicating which location registration area the mobile communication terminals belong to, the location information managing device comprising: a moving unit table for storing, in a correlated manner, a terminal identification number for identifying a mobile communication terminal, and a moving unit identification number corresponding to a moving unit to which mobile communication terminal having the terminal identification number belongs; and a location table for storing, in a correlated manner, the terminal identification number and the moving unit identification number, and the location registration area information. This will be referred to as a First location information managing device, for convenience.

The present invention provides a location information managing device which is used with a mobile communication network comprising a plurality of base stations which perform communication with mobile communication terminals and a plurality of switches which perform communication with the base stations, for performing communication with the plurality of switches and managing location registration area information indicating which location registration area the mobile communication terminals belong to, the location information managing device comprising: a hierarchical table for storing, in a correlated manner, a terminal identification number for identifying a mobile communication terminal to be a parent, and a terminal identification number of a mobile communication terminal to be a child; and a location table for storing, in a correlated manner, the terminal identification number and the location registration area information. This will be referred to as a Second location information managing device, for convenience.

The present invention provides a location information managing device which is used with a mobile communication network comprising a plurality of base stations which perform communication with mobile communication terminals and a plurality of switches which perform communication with the base stations, for performing communication with the plurality of switches and managing location registration area information indicating which location registration area the mobile communication terminals belong to, the location information managing device comprising: an extended location table for storing, in a correlated manner, a terminal identification number for identifying the mobile communication terminal and a moving unit identification number for identifying a moving unit, location registration area information of the mobile communication terminal, and a moving unit identification number of a moving unit to which the mobile communication terminal is subordinate. This will be referred to as a Third location information managing device, for convenience.

The present invention provides a location information managing device which is used with a mobile communication network comprising a plurality of base stations which perform communication with mobile communication terminals and a plurality of switches which perform communication with the base stations, for performing communication with the plurality of switches, the location information managing device comprising: an extended location table for storing, in a correlated manner, a terminal identification number for identifying the mobile communication terminal, location registration area information of the mobile communication terminal, and a terminal identification number of a mobile communication terminal to which the mobile communication terminal is subordinate. This will be referred to as a Fourth location information managing device, for convenience.

The present invention provides an en bloc paging request generating device, used with a mobile communication system comprising a plurality of switches and a plurality of base stations, wherein a plurality of mobile communication terminals are aggregated to form a group, and wherein one mobile communication terminal belonging to the group is handled as a representative mobile communication terminal, the en bloc paging request generating device comprising: a table for storing which location registration area the representative mobile communication terminal belongs to, along with storing the correlation between other mobile communication terminals belonging to the group and the representative mobile communication terminal; a storing unit for storing termination requests; and a control unit for reading out the termination requests from the storing unit once every predetermined time, determining, of the termination requests read out, those having the mobile communication terminals correlated with same the representative mobile communication terminal as the termination destinations thereof, by making reference to the table, and generating an en bloc paging request for specifying all of the mobile communication terminals corresponding to the determined plurality of termination requests. This will be referred to as a First en bloc paging request generating device, for convenience.

With the first en bloc paging request generating device, the table may contain a first table and a second table; with the first table storing, in a correlated manner, representative terminal identification information for identifying the representative mobile communication terminal and location registration area information indicating the location registration area where the representative mobile communication terminal belongs; the second table storing, in a correlated manner, each of terminal identification information for identifying the other mobile communication terminals belonging to the group and the representative terminal identification information; and the control unit reading out termination requests from the storing unit once every predetermined time, extracting each of the terminal identification information contained in the termination requests that have been read out, determining each of the representative terminal identification information by searching the second table based on each of the extracted terminal identification information, grouping the terminal identification information which matches the determined representative terminal identification information, determining the location registration area information by searching the first table based on the representative terminal identification information of each group, and generating an en bloc paging request containing each of the terminal identification information grouped with regard to the location registration area indicated by the location registration area information that has been determined.

The present invention provides a switch, used with a mobile communication system wherein a plurality of mobile communication terminals are aggregated to form a group, and one of the mobile communication terminals belonging to the group receives the paging responses from other mobile communication terminals belonging to the group and generates an en bloc paging response wherein the paging responses are aggregated, and transmits the en bloc paging response to a base station, wherein, upon receiving the en bloc paging response from the base station, the switch reconfigures the en bloc paging response into individual the paging responses, which the switch outputs. This will be referred to as a First switch, for convenience.

The present invention provides a mobile communication network comprising a plurality of switches, a plurality of base stations, and the first en bloc paging request generating device.

The present invention provides a mobile communication system comprising a plurality of base stations, one or a plurality of switches, the first or third location information managing device, the first relay device, and the first mobile communication terminal.

The present invention provides a mobile communication system comprising a plurality of base stations, one or a plurality of switches, the second or fourth location information managing device, and the second mobile communication terminal.

BRIEF DESCRIPTION OF THE DRAWINGS

FIG. 5 is a diagram illustrating the contents of a location table in the mobile communication system.

FIG. 6 is a diagram illustrating the contents of a moving unit table in the mobile communication system.

FIG. 14 is a diagram illustrating an example of the stored contents of a location table used in a mobile communication system according to a third embodiment.

BEST MODE FOR CARRYING OUT THE INVENTION

<1. First Embodiment>
<1-1: Configuration of the First Embodiment>

Figure 1:
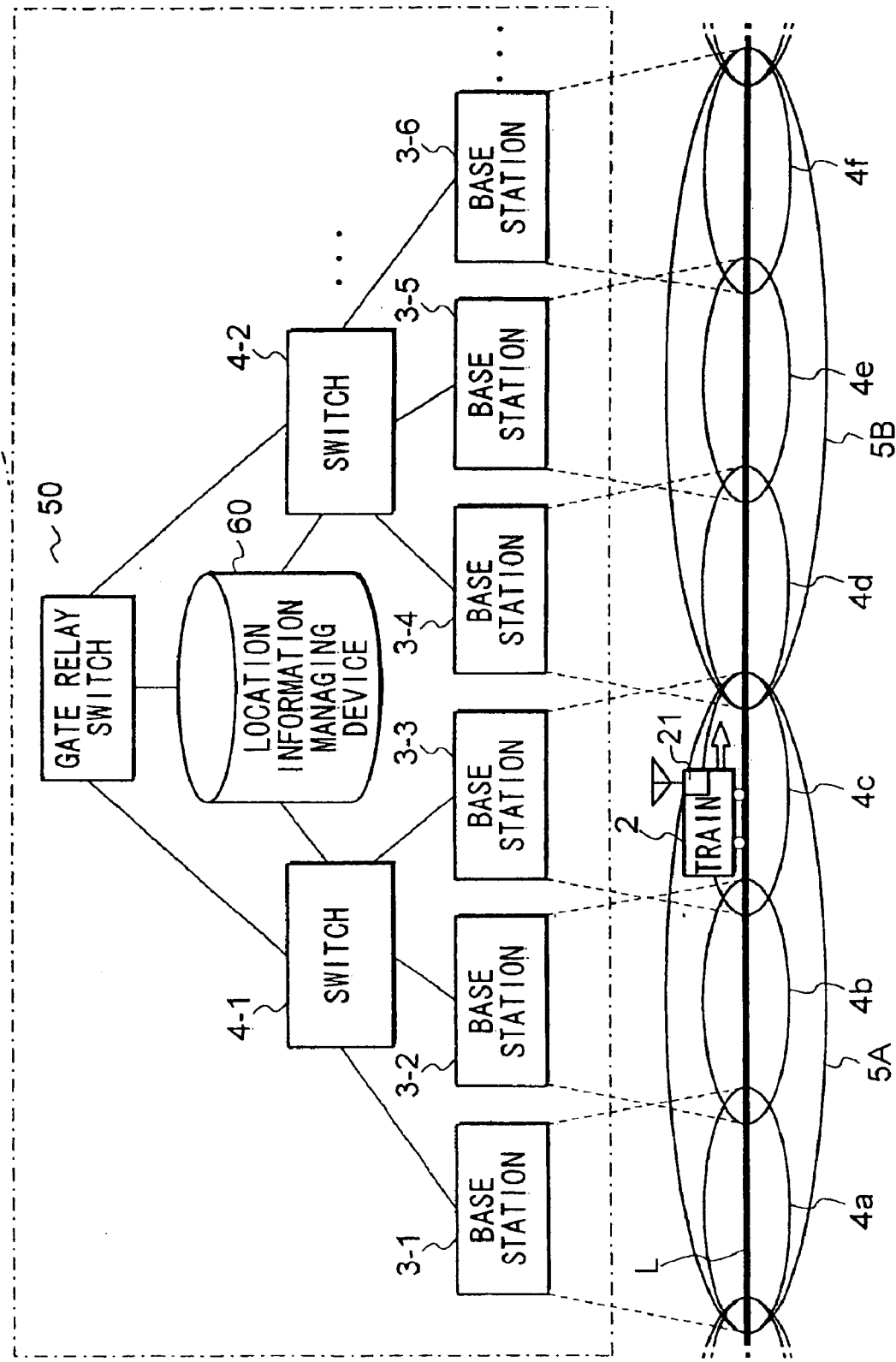
FIG. 1 is a block diagram illustrating the overall configuration of a mobile communication system according to a first embodiment of the present invention.

FIG. 1 is a diagram illustrating the overall configuration of a mobile communication system according to a first embodiment of the present invention. As shown in the diagram, the mobile communication system has a mobile communication network NET, and a relay device 21 (mobile communication device) installed in a moving unit 2. The moving unit 2 is a mass-transit vehicle such as a train or a bus, and a train will be used in this example. Also, though only one moving unit 2 is shown in FIG. 1, in reality, a greater number of trains 2 exist, and relay devices 21 are installed in each.

The mobile communication network NET comprises plural base stations 3-1, 3-2, ..., plural switches 4-1, 4-2, ..., a gate relay switch 50, and a location information managing device 60.

The base stations 3-1, 3-2, ..., are disposed at predetermined intervals, each forming a base station area 4 (denoted by the symbols "4a" through "4f" in FIG. 1). The base station areas 4 are areas wherein wireless communication with the base stations 3 making them up is possible. In the following, as shown in FIG. 1, the base stations 3-1 through 3-6 make up the base station areas 4a through 4f, respectively. Also, the location registration areas 5 (denoted by the symbols "5A" and "5B" in FIG. 1) are groups of plural base station areas 4, and are provided in a manner corresponding to the switches 4-1, 4-2, ... In the event of transmitting a termination request to a certain mobile communication terminal 1, which location registration area 5 the mobile communication terminal 1 is contained in is determined, and a termination request is transmitted from all base stations 3 belonging to the determined location registration area 5. That is, it can also be said that the location registration area 5 represents the range in which to transmit a termination request.

The moving unit 2 is a train which moves upon a railway line L, arranged so that plural passengers having mobile communication terminals 1-1, 1-2, ..., such as cellular phones or the like, can ride therein. This moving unit 2 sequentially passes through plural location registration areas 5 crossing the railway line L.

Figure 2:
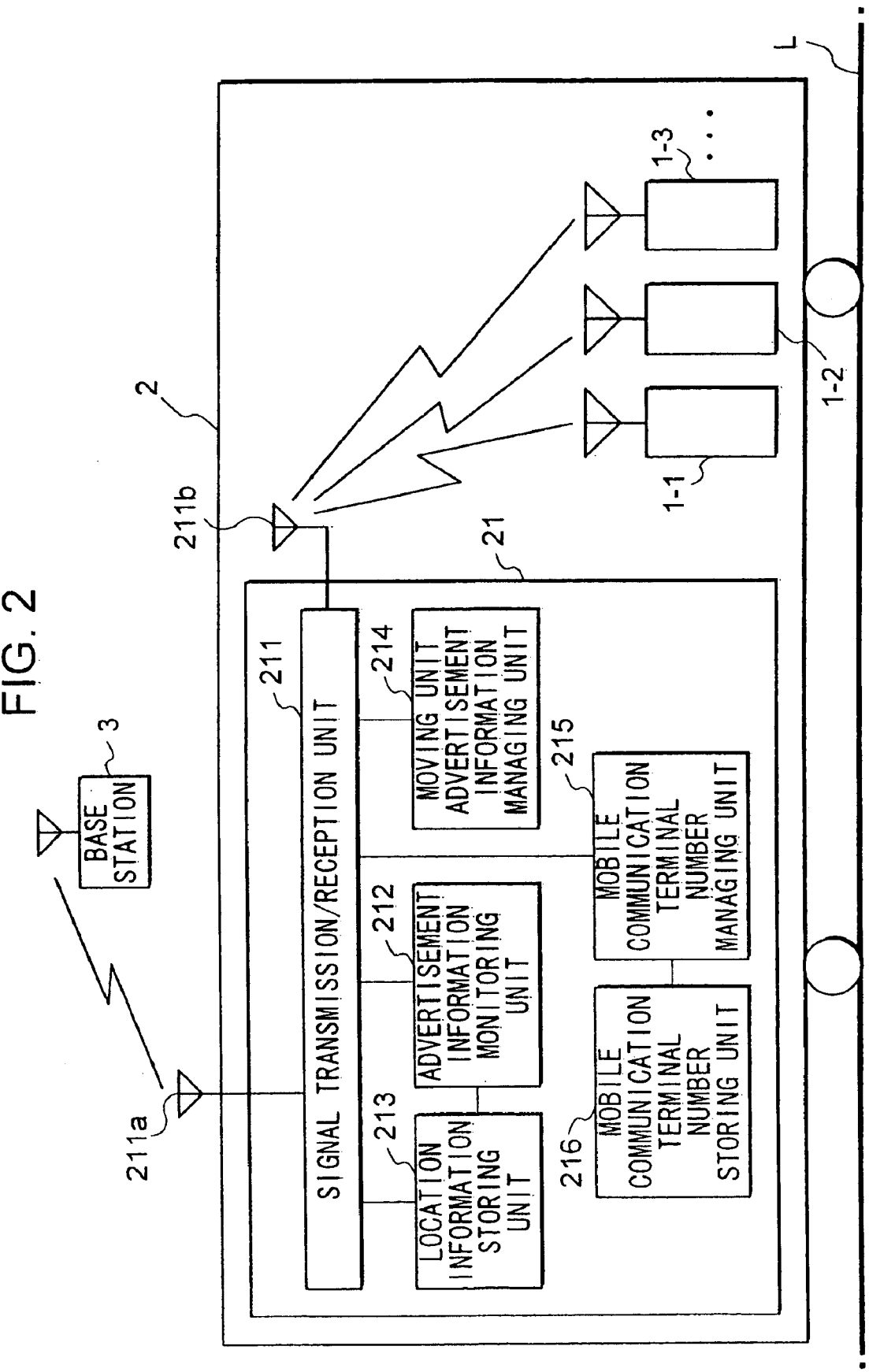
FIG. 2 is a block diagram illustrating the configuration of a moving unit in the mobile communication system.

Next, FIG. 2 is a block diagram illustrating the configuration of the moving unit 2 relating to the mobile communication system according to the present embodiment. As shown in the drawing, the moving unit 2 contains plural mobile communication terminals 1-1, 1-2, ..., besides the relay device 21. The relay device 21 comprises, besides a signal transmission/reception unit 211, an advertisement information monitoring unit 212, a location information storing unit 213, a moving unit advertisement information managing unit 214, a mobile communication terminal number managing unit 215, and a mobile communication terminal identification number storing unit 216; a control unit (not shown) for controlling the components.

The signal transmission/reception unit 211 comprises an antenna 211a extending outwards from the moving unit 2, for performing wireless communication with base stations 3 making up base station areas 4 in which zone the relay device 21 exists, and also comprises an antenna 211b extending inward into the moving unit 2, for performing wireless communication with one or more mobile communication terminals 1 contained in the moving unit 2.

The advertisement information monitoring unit 212 obtains advertisement information transmitted at predetermined cycles from a base station 3, via the signal transmission/reception unit 211, which it monitors. The advertisement information contains location registration area information for identifying location registration areas. The advertisement information monitoring unit 212 monitors change in the location registration area information, and in the event that there is change therein, writes new location registration area information to the location information storing unit 213.

For example, in FIG. 1, saying that the moving unit 2 has moved from the location registration area 5A to the location registration area 5B, the relay device 21 at first receives location registration area information indicating the location registration area 5A from the base station 3-1, and subsequently receives location registration area information indicating the location registration area 5B from the base station 3-4. In this case, the advertisement information monitoring unit 212 detects the change in the location registration area information, and updates the location registration area information stored in the location information storing unit 213.

Next, the moving unit advertisement information managing unit 214 outputs a moving unit identification number to the signal transmission/reception unit 211 at predetermined cycles, and notifies the moving unit identification number to the mobile communication terminals 1-1, 1-2, ..., via the signal transmission/reception unit 211. The moving unit identification number is used to identify the moving unit 2.

Next, the mobile communication terminal number managing unit 215 manages the terminal identification numbers of the mobile communication terminals 1-1, 1-2, ..., contained in the moving unit 2. Also, the mobile communication terminal identification number storing unit 216 stores the terminal identification numbers of the mobile communication terminals 1-1, 1-2, ..., contained in the moving unit 2, under the management of the mobile communication terminal number managing unit 215. In this example, the phone numbers (originating ID) of the mobile communication terminals 1-1, 1-2, ..., are used as the terminal identification numbers.

Also, the control unit transmits various control signals via the signal transmission/reception unit 211, or controls the components based on received control signals.

The details of the method for obtaining terminal identification numbers will be described later, but the overview thereof is that relay device 21 performs advertisement of the moving unit identification number at a predetermined cycle, and upon the mobile communication terminal 1 receiving this, the mobile communication terminal 1 transmits the terminal identification number to the relay device 21. Accordingly, upon the mobile communication terminal 1 entering inside the moving unit 2, the terminal identification number thereof is stored in the mobile communication terminal identification number storing unit 216 by the mobile communication terminal number managing unit 215.

The location registration of the mobile communication terminals 1-1, 1-2, ..., contained in the moving unit 2 is performed by the relay device 21 representatively in behalf of the mobile communication terminals 1-1, 1-2, .... That is, the mobile communication terminals 1-1, 1-2, ..., are in subordination to the relay device 21 with regard to location registration.

Now establishing such a subordination relation means that the mobile communication network NET side needs to know which moving unit 2 the mobile communication terminal 1 is subordinate to. However, with an arrangement wherein each mobile communication terminal 1 individually advertise the mobile communication network NET regarding which moving unit it has become subordinate to, in the event that a great number of people having mobile communication terminals 1 get onto a train (moving unit 2), the mobile communication terminals 1 advertise all at the same time, so the traffic of the base station 3 increases.

Accordingly, with the present embodiment, at the time of the moving unit 2 moving from a location registration area 3 to another location registration area, advertisement of the terminal identification numbers of the mobile communication terminals 1-1, 1-2, ..., in a subordinate relation, is made to the mobile communication network NET along with the location registration of the relay device 21.

Figure 3:
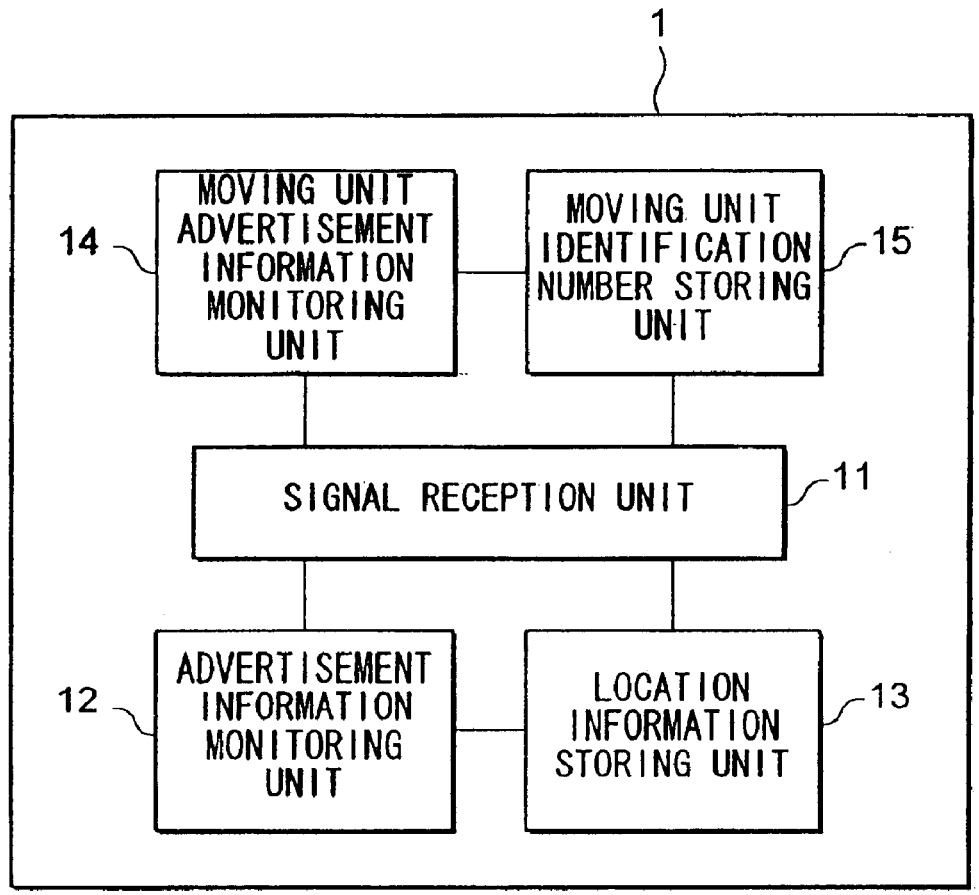
FIG. 3 is a block diagram illustrating the configuration of a mobile communication terminal in the mobile communication system.

Next, FIG. 3 is a block diagram illustrating the configuration of a mobile communication terminal 1. As shown in the figure, the mobile communication terminal 1 comprises, besides a signal transmission/reception unit 11, an advertisement information monitoring unit 12, a location information storing unit 13, a moving unit advertisement information monitoring unit 14, and a moving unit identification number storing unit 15; a control unit (not shown) for controlling the components.

The signal transmission/reception unit 11 performs wireless communication with the base station 3 and relay device 21. The advertisement information monitoring unit 12 and location information storing unit 13 have the same functions as the above-described advertisement information monitoring unit 212 and location information storing unit 213 of the relay device 21. That is, the advertisement information monitoring unit 12 monitors the advertisement information from the base station 3, and in the event that there has been a change to the location registration area information contained in the advertisement information, new location registration area information is written to the location information storing unit 13.

The moving unit advertisement information monitoring unit 14 monitors the moving unit identification number advertised at predetermined cycles from the relay device 21, and judges whether or not the mobile communication terminal 1 is contained in the moving unit 2. The moving unit advertisement information monitoring unit 14 stores the received moving unit identification number in the moving unit identification number storing unit 15, and in the event that the moving unit identification number has not been received for a certain period, the moving unit identification number stored in the moving unit identification number storing unit 15 is deleted.

Also, the control unit transmits various control signals via the signal transmission/reception unit 11, or controls the components based on received control signals.

Figure 4:
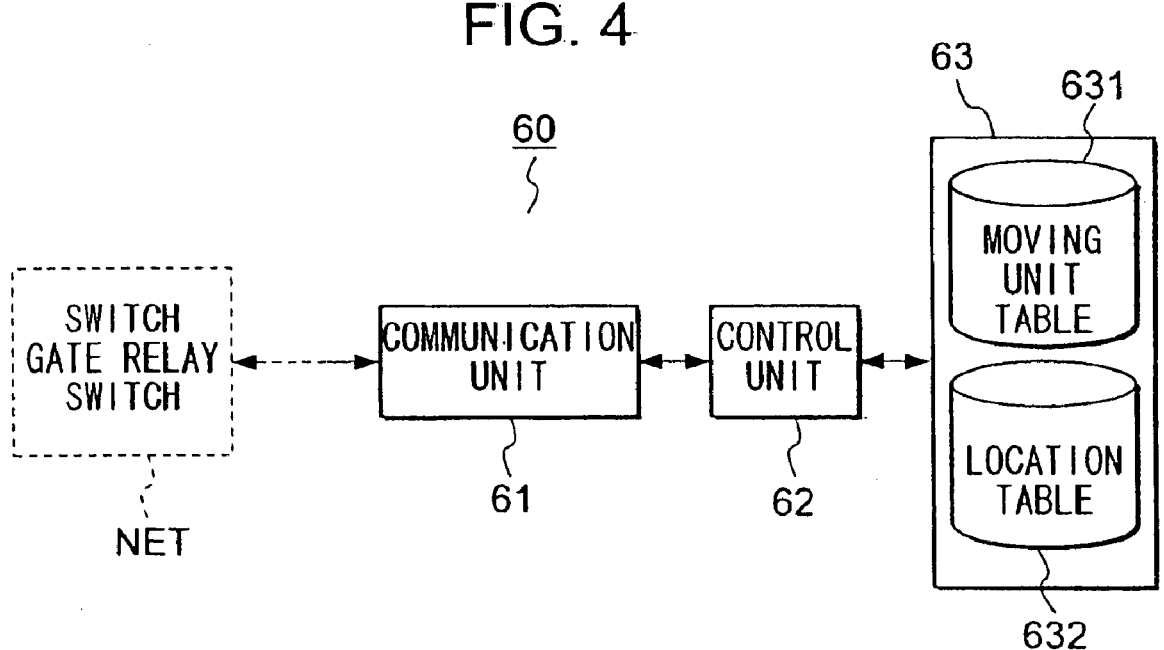
FIG. 4 is a block diagram illustrating the configuration of a location information managing device in the mobile communication system.

Next, FIG. 4 is a block diagram illustrating the configuration of the location information managing device 60. As shown in the figure, the location information managing device 60 comprises a communication unit 61, a control unit 62, and a storing unit 63.

The communication unit 61 is means for performing communication with the switches 4-1, 4-2, . . . , the gate relay switch 50, and so forth. The control unit 62 functions as a control center for the location information managing device 60, exchanging information with the components within the location information managing device 60.

The storing unit 63 is a database for registering the location registration area of the mobile communication terminals 1, with regard to the mobile communication terminals 1 receiving mobile communication services using the mobile communication network NET. Stored in this storing unit 63 are a moving unit table 631 and a location table 632. The contents of these tables will now be described.

FIG. 5 is a diagram illustrating the specific contents of the moving unit table 631. As shown in the figure, the moving unit identification number of the moving unit 2, and the terminal identification numbers of the mobile communication terminals 1 contained in the moving unit 2 are stored in a correlated manner. Accordingly, all mobile communication terminals 1 in a subordination relation with a particular moving unit can be determined by making reference to the moving unit table 631.

FIG. 6 is a diagram illustrating the specific contents of the location table 632. As shown in the figure, the location table 632 stores the terminal identification numbers of the mobile communication terminals 1 (both mobile communication terminals 1 inside the moving unit 2 and mobile communication terminals 1 outside of the moving unit 2), moving unit identification number of the moving unit, and location registration area information representing the location registration area where the mobile communication terminals 1 and the moving unit 2 exist, in a correlated manner. Accordingly, the location registration area of the mobile communication terminals 1 can be determined by making reference to the location table 632.

<1-2: Operation of First Embodiment>

Next, the operation of the mobile communication system will be described with reference to the drawings.

<1-2-1: Hierarchical Location Registration>

First, the operations of a mobile communication terminal 1 becoming subordinate to a particular moving unit 2, up to this being registered from the moving unit 2, and this being registered to the location information managing device 60, will be described. In the present embodiment, the registration of the subordinate relation will be performed at the same time as the location registration of the moving unit 2. This series of processing will be referred to as hierarchical location registration. In the following description, a case wherein a user of a mobile communication terminal 1-1 and a user of a mobile communication terminal 1-2 get in a moving unit 2 located in a base station area 4c (the location registration area 5A), and this moving unit 2 moves to the base station area 4d (the location registration area 5B), will be assumed.

Figure 7:
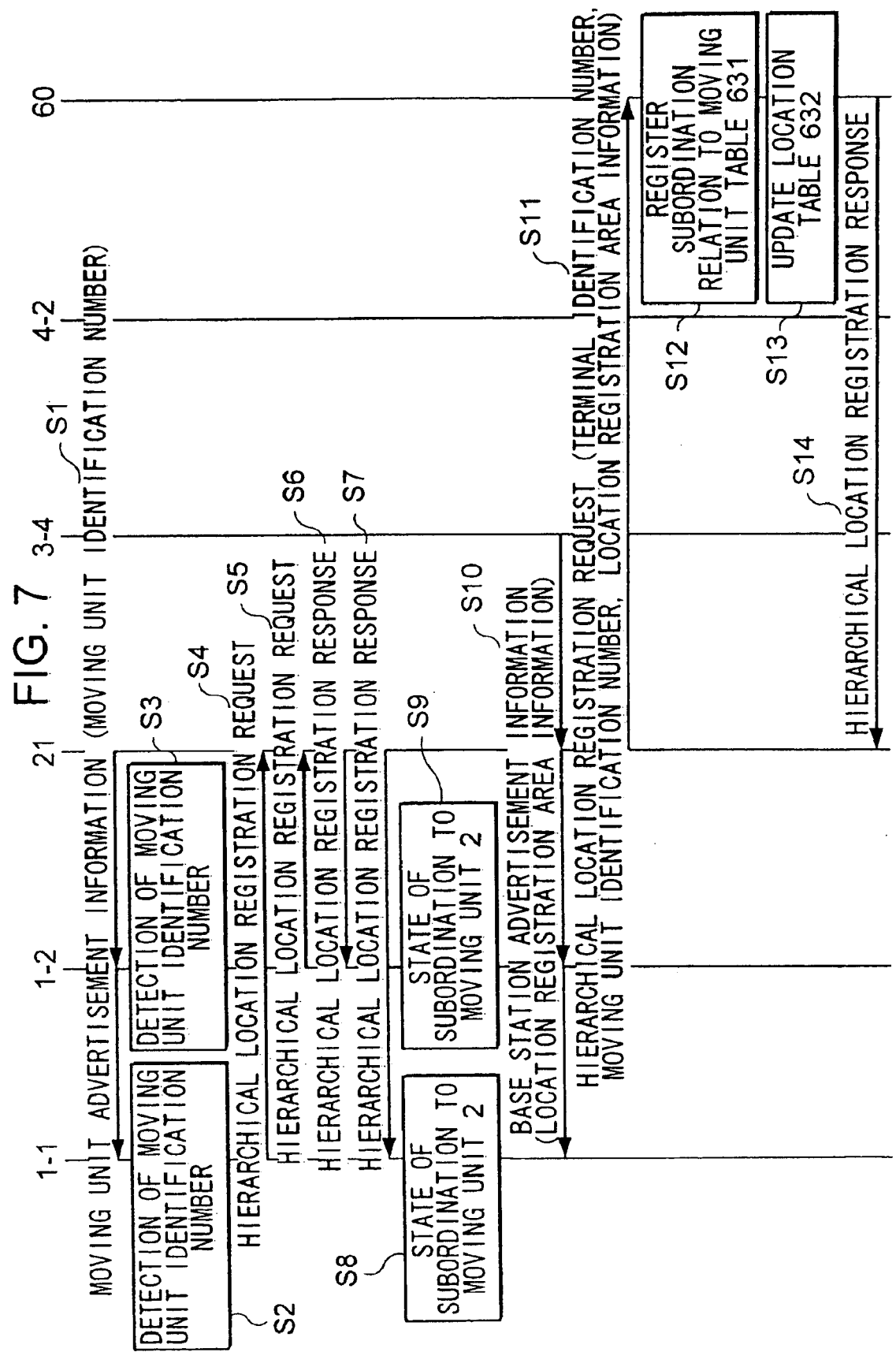
FIG. 7 is a sequence diagram illustrating the operation of hierarchical location registration in the mobile communication system.

FIG. 7 is a sequence diagram illustrating the procedures of hierarchical location registration. First, the relay device 21 advertises the moving unit advertisement information containing the moving unit identification number at predetermined cycles (Step S1). Upon the mobile communication terminal 1-1 and the mobile communication terminal 1-2 detecting this (steps S2 and S3), the mobile communication terminal 1-1 and the mobile communication terminal 1-2 each make hierarchical location registration requests to the relay device 21 (steps S4 and S5). The hierarchical location registration requests each contain the terminal identification numbers of the mobile communication terminals 1-1 and 1-2.

Upon receiving the hierarchical location registration requests, the relay device 21 stores the terminal identification numbers in the terminal identification number storing unit 216, and transmits a hierarchical location registration response to the mobile communication terminal 1-1 and the mobile communication terminal 1-2 (steps S6 and S7). Accordingly, the mobile communication terminals 1-1 and 1-2 receiving this know that hierarchical location registration has been made, i.e., that they are made subordinate to the moving unit 2 (steps S8 and S9). In the event that the location registration area is changed, a general mobile communication terminal 1 transmits a location registration request to the base station 3 of itself, but the mobile communication terminals 1-1 and 1-2 which are in a subordinate state do not make a location registration request to the base station 3.

Subsequently, upon the moving unit 2 moving from the base station area 4c (the location registration area 5A) into the base station area 4d (the location registration area 5B), the location registration area information contained in the base station advertisement information advertised from the base station 3-4 is received by each of the relay device 21 and the mobile communication terminals 1-1 and 1-2 (step S10). Then, the mobile communication terminals 1-1 and 1-2 store the received location registration area information in their location information storing units. On the other hand, the advertisement information monitoring unit of the relay device 21 detects that there is a disagreement between the former location registration area information and the received location registration area information, and detects that there has been a change in the location registration area.

Subsequently, the relay device 21 transmits a hierarchical location registration request to the location information managing device 60 via the base station 3-4 and switch 4-2 (step S11). This hierarchical location registration request contains the terminal identification numbers of the mobile communication terminals 1-1 and 1-2, the moving unit identification number, and location registration area information.

Next, upon the location information managing device 60 receiving the hierarchical location registration request, the control unit 62 registers the terminal identification numbers of the mobile communication terminals 1-1 and 1-2 in the moving unit table 631 in a manner correlated with the moving unit identification number of the moving unit 2 (step S12). Also, the control unit 62 overwrites the location registration area information space corresponding to the terminal identification numbers of the mobile communication terminals 1-1 and 1-2 and the moving unit identification numbers of the moving unit 2 with the received location registration area information (step S13). Thus, the subordination relation of the mobile communication terminals 1-1 and 1-2 and the moving unit 2 is registered, and the location registration area information is updated. Subsequently, the location information managing device 60 transmits a hierarchical location registration response to the relay device 21, via the switch 4-2 and the base station 3-4 (step S14).

<1-2-2: Location Registration>

Next, description will be made regarding location registration, using as an example a case wherein the moving unit 2 moves from the base station area 4d (the location registration area 5B) to the base station area 4c (the location registration area 5A), with the mobile communication terminals 1-1 and 1-2 remaining subordinate to the moving unit 2.

Figure 8:
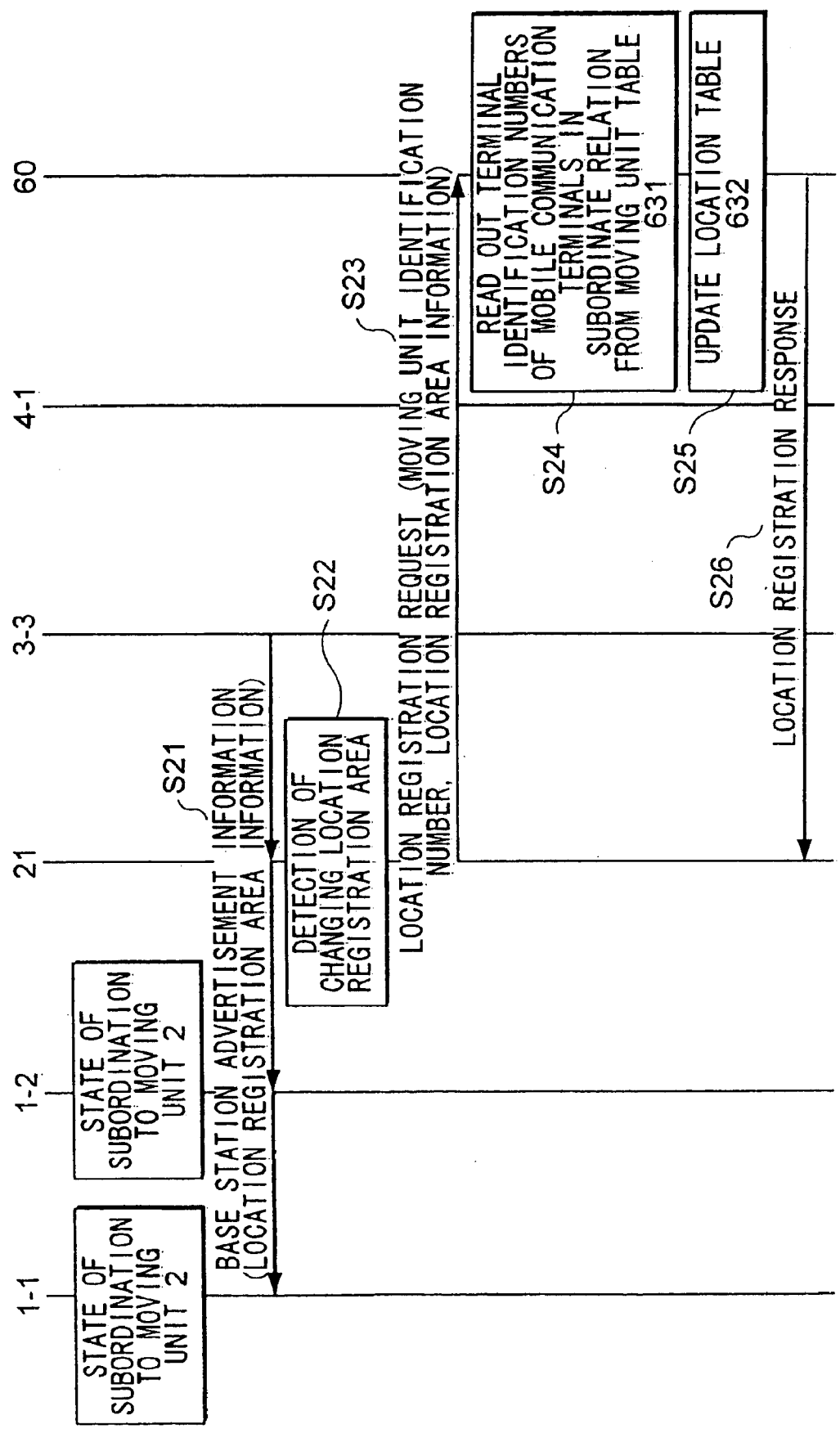
FIG. 8 is a sequence diagram illustrating the operation of location registration in the mobile communication system.

FIG. 8 is a sequence diagram illustrating the operation of location registration. Upon the moving unit 2 entering the location registration area 5A, the location registration area information contained in the base station advertisement information advertised from the base station 3-3 is received by each of the relay device 21 and the mobile communication terminals 1-1 and 1-2 (step S21). Thus, the mobile communication terminals 1-1 and 1-2 update the stored contents of the location information storing unit to the location registration area information received. On the other hand, the advertisement information monitoring unit of the relay device 21 detects that there is a disagreement between the former location registration area information and the received location registration area information, and detects that there has been a change in the location registration area (step S22).

Subsequently, the relay device 21 transmits a location registration request to the location information managing device 60 via the base station 3-3 and switch 4-1 (step S23). This hierarchical location registration request contains the moving unit identification number and location registration area information, but does not contain the terminal identification numbers of the mobile communication terminals 1-1 and 1-2.

Next, upon the location information managing device 60 receiving the location registration request, the control unit 62 makes reference to the moving unit table 631, and reads out the terminal identification numbers corresponding to the moving unit identification number (step S24). In this case, the terminal identification numbers of the mobile communication terminals 1-1 and 1-2 are read out. Next, the control unit 62 overwrites the location registration area information space corresponding to the terminal identification numbers and moving unit identification number read out, with the received location registration area information (step S25). Thus, the location registration area information of the mobile communication terminals 1-1 and 1-2 and the moving unit 2 is updated. Subsequently, the location information managing device 60 transmits a location registration response to the relay device 21, via the switch 4-1 and the base station 3-3 (step S26).

<1-2-3: Releasing Hierarchical Location Registration>

Figure 9:
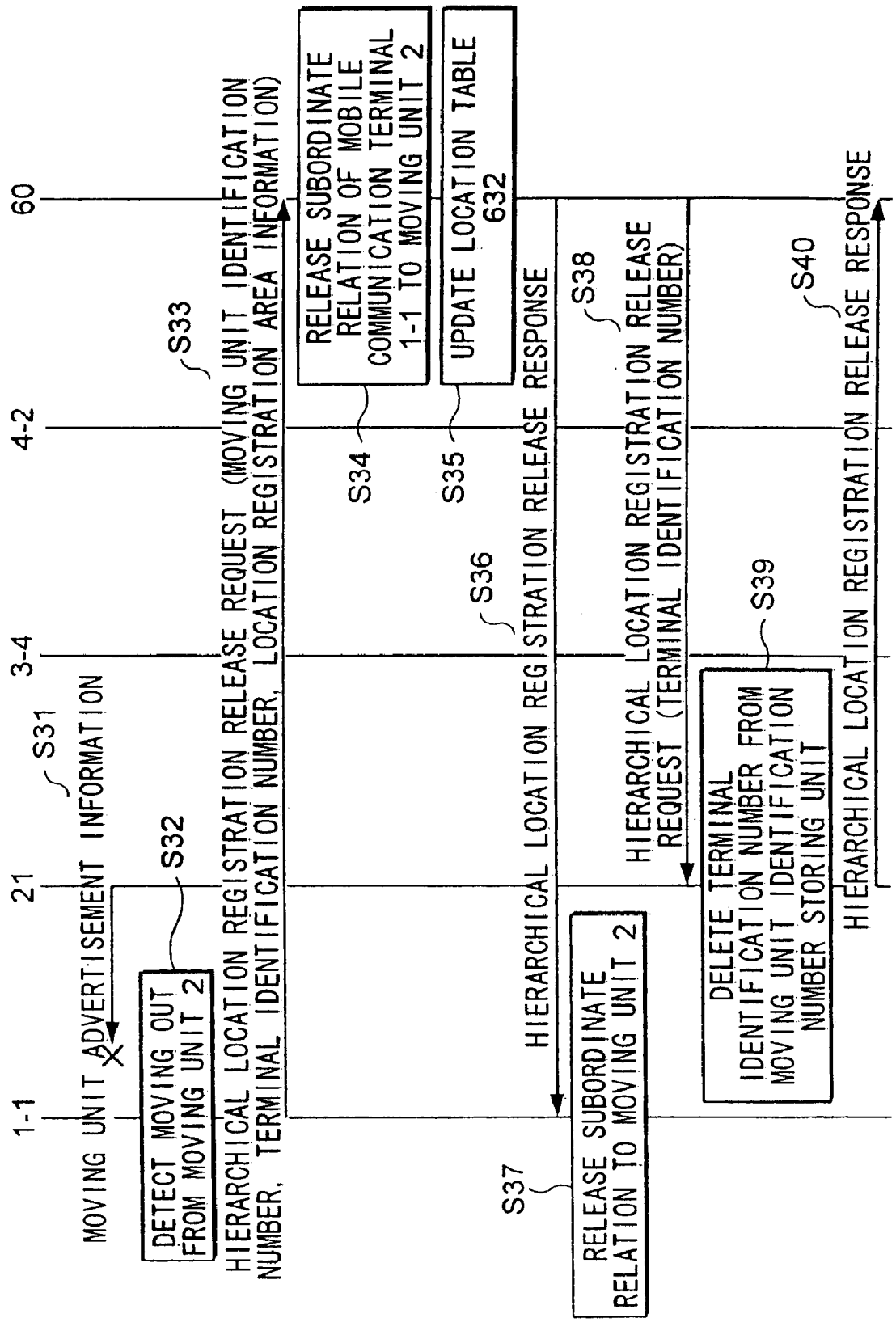
FIG. 9 is a sequence diagram illustrating the operation of releasing hierarchical location registration in the mobile communication system.

Next, releasing of the hierarchical location registration will be described. FIG. 9 is a sequence diagram illustrating the operation for releasing the hierarchical location registration. This example assumes a case wherein the user of the mobile communication terminal 1-1 leaves the moving unit 2.

The relay device 21 of the moving unit 2 advertises the moving unit advertisement information at predetermined cycles (Step S31), but in the event that the user of the mobile communication terminal 1-1 disembarks and leaves the moving unit 2, the mobile communication terminal 1-1 can no longer receive the moving unit advertisement information. The moving unit advertisement information monitoring unit 14 of the mobile communication terminal 1-1 measures the time from receiving one set of moving unit advertisement information till the time of receiving another set of moving unit advertisement information, and in the event that this measured time exceeds a predetermined period of time which is longer than the cycle wherein the relay device 21 advertises the moving unit advertisement information, detects that the user has left the moving unit 2 (step S32).

Subsequently, the mobile communication terminal 1-1 transmits a hierarchical location registration release request to the location information managing device 60 via the base station 3-4 and switch 4-2 (step S33). This hierarchical location registration release request contains the moving unit identification number of the moving unit 2 to which it was subordinate, the terminal identification number of the mobile communication terminal 1-1, and current location registration area information.

Upon the location information managing device 60 receiving the hierarchical location registration release request, the location information managing device 60 deletes the terminal identification number corresponding to the moving unit identification number received from the moving unit table 631, and releases the subordination relation between the moving unit 2 and the mobile communication terminal 1-1 (step S34). Accordingly, the location registration area information of the mobile communication terminal 1-1 is no longer updated by the moving unit 2 moving to another location registration area. Next, the control unit 62 updates the location table 632 based on the received terminal identification number and the location registration area information (step S35).

Subsequently, the location information managing device 60 transmits a hierarchical location registration release response to the mobile communication terminal 1-1 via the switch 4-2 and the base station 3-4 (step S36). Accordingly, the mobile communication terminal 1-1 can know that the subordination relation has been released (step S37).

Next, the location information managing device 60 transmits a hierarchical location registration release request containing the terminal identification number to the relay device 21 (step S38), upon which the relay device 31 deletes the terminal identification number from the mobile communication terminal identification number storing unit 216 (step S39), and returns a hierarchical location registration release response to the location information managing device 60 (step S40). Accordingly, this does away with the problem wherein the terminal identification number of a mobile communication terminal with which the subordination relation has been released is permanently stored in the mobile communication terminal identification number storing unit 216.

<2. Second Embodiment>

Next, a mobile communication system according to a second embodiment of the present invention will be described.

<2-1: Configuration of Second Embodiment>

The mobile communication system according to the second embodiment is the same as the mobile communication system according to the first embodiment shown in FIG. 1, except that a relay device 21 is not provided to the moving unit 2, a hierarchy table 633 is used instead of the moving unit table 631 of the location information managing device 60, and detailed configuration of the mobile communication terminal 1.

With the mobile communication system according to the first embodiment, location registration of all mobile communication terminals 1 in a subornation relation is handled by location registration from the relay device 21, by making a subordination relation between the relay device 21 and the mobile communication terminals 1. Considering the subordination relation as a parent-child relation, the relay device 21 is equivalent to a parent which brings the mobile communication terminal 1 into subordination, and the mobile communication terminal 1 is a child which is subordinate to the relay device 21. Here, that which could become a parent was limited to the relay device 21. In comparison, with the mobile communication system according to the second embodiment, each mobile communication terminal 1 may become either a parent or a child, and freely structure subordination relations.

Figure 10:
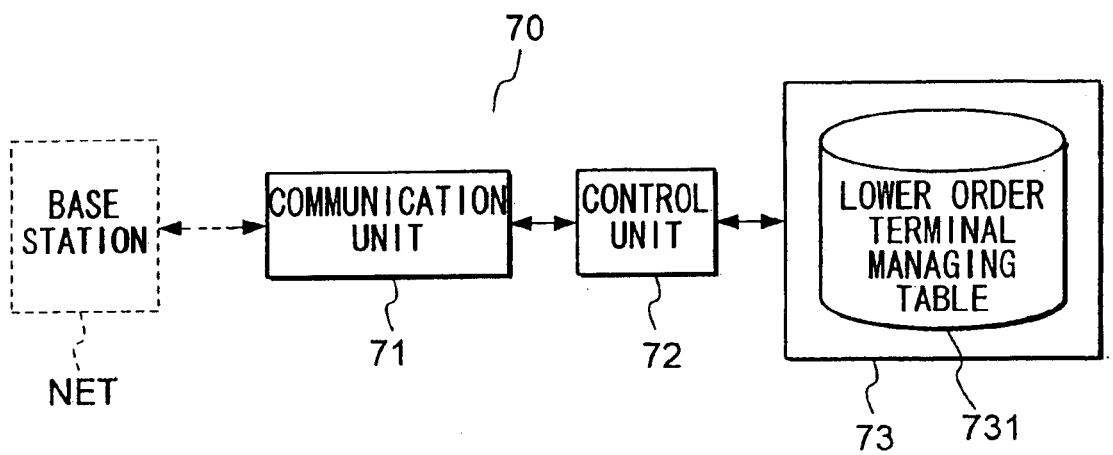
FIG. 10 is a block diagram illustrating the configuration of a mobile communication terminal in a mobile communication system according to a second embodiment.

FIG. 10 is a block diagram illustrating the configuration of the mobile communication terminal 1 according to the second embodiment. As shown in this figure, the mobile communication terminal 1 comprises a communication unit 71, a control unit 72, and a storing device 73.

The communication unit 71 performs wireless communication with the base station 3. The control unit 72 functions as a control center for controlling the components of the mobile communication terminal. The storing unit 73 stores a lower order terminal managing table 731, mode information, the terminal identification number of the mobile communication terminal, location registration area information, and the terminal identification number of the parent mobile communication terminal (hereafter referred to as parent terminal identification number). However, the lower order terminal managing table 731 is generated as necessary, and is not generated in the event that there is no child mobile communication terminal.

The mode information indicates whether the state of the mobile communication terminal 1 is an independent mode, child mode, or a parent mode. The independent mode is a state wherein the mobile communication terminal has no parent-child relation with other mobile communication terminals and is independent. The child mode is a state wherein the mobile communication terminal is subordinate to another mobile communication terminal. Further, the parent mode is a state wherein the mobile communication terminal is not subordinate to another mobile communication terminal, and has another mobile communication terminal in subordination.

With the present embodiment, a hierarchical subordination relation is structured, wherein a child mobile communication terminal 1 is subordinate to a certain mobile communication terminal 1, and further a grandchild mobile communication terminal 1 is subordinate to the child mobile communication terminal 1. The aforementioned mode information and parent terminal identification numbers are used for correlating between hierarchical levels.

Figure 11:
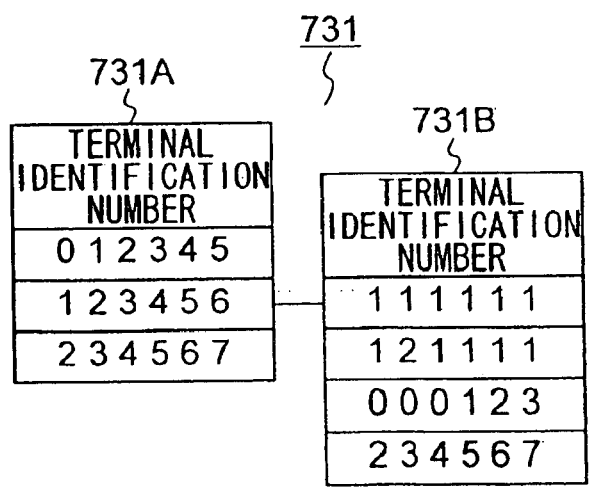
FIG. 11 is a diagram illustrating the stored contents of a lower order terminal managing table in the mobile communication system.

Next, terminal identification numbers regarding all mobile communication terminals lower than the mobile communication terminal are stored in the lower order terminal managing table 731. FIG. 11 is a diagram illustrating an example of the stored contents of the lower order terminal managing table 731. Note that in this example, there are three child mobile communication terminals subordinate to this mobile communication terminal, and further, one of these has in subordination four mobile communication terminals which are grandchildren from the perspective of this mobile communication terminal.

In this case, the lower order terminal managing table 731 is configured of two hierarchical levels. The level 1 managing table 731A stores the terminal identification numbers of the terminals which are the children of the mobile communication terminal. On the other hand, the level 2 managing table 731B stores the terminal identification numbers of the terminals which are the grandchildren from the perspective of the mobile communication terminal. In this case, a mobile communication terminal having the terminal identification number "123456" is the parent of the four mobile communication terminals.

Figure 12:
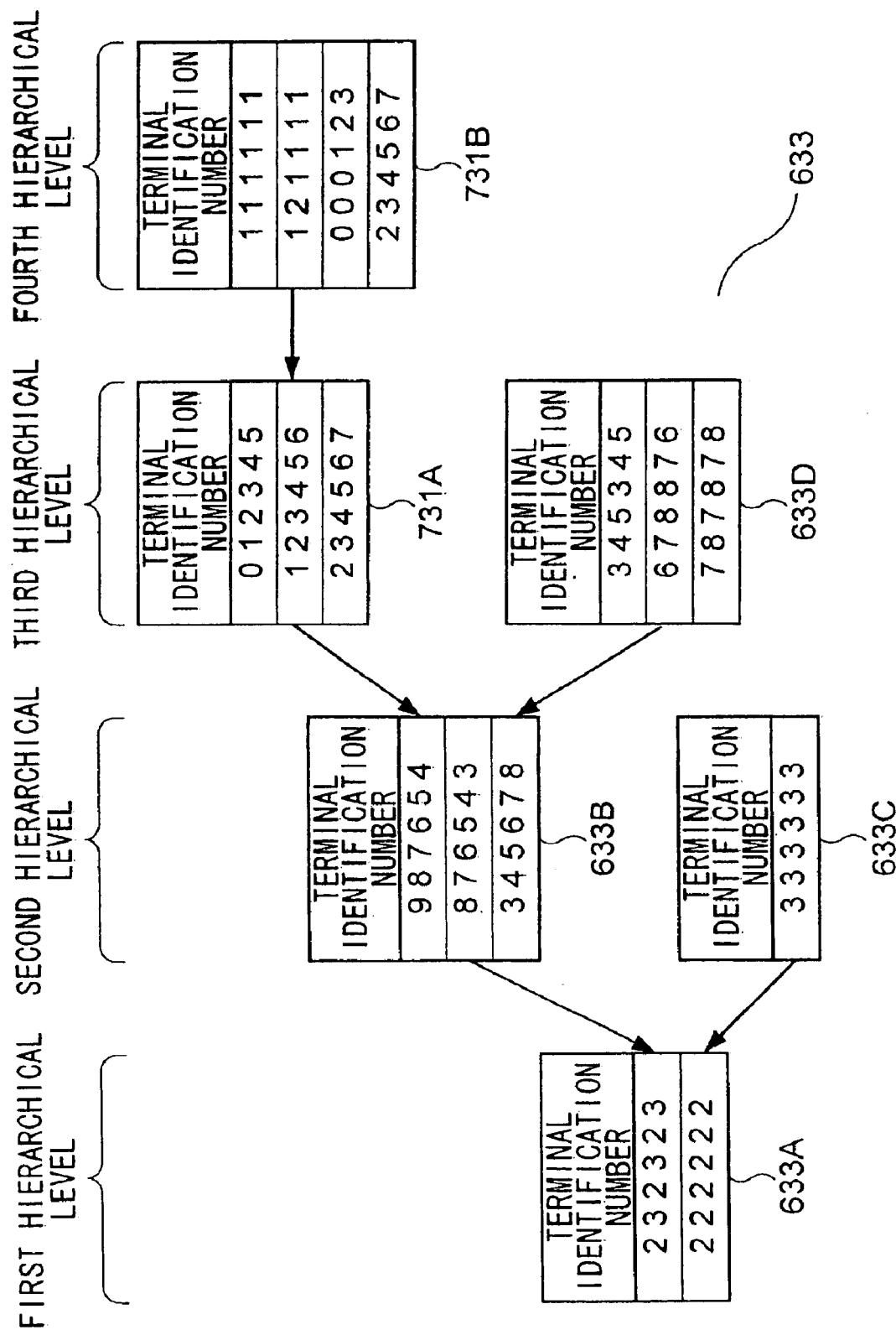
FIG. 12 is a diagram illustrating the contents of a hierarchical table in the mobile communication system.

Next, description will be made regarding the hierarchy table 633 stored in the storing unit 63 of the location information managing device 60. FIG. 12 is a diagram illustrating an example of the stored contents of the hierarchy table 633. The hierarchy table 633 is the above-described lower order terminal managing table 731 extended to the entire service area. As shown in the figure, the hierarchy table 633 is configured of plural tables 633A through 633D, 731A, and 731B. Of these, the tables 731A and 731B are the above-described level 1 managing table 731A and level 2 managing table 731B.

As described above, the mobile communication terminals 1 each have lower order terminal managing tables 731 indicating the terminal identification numbers of the lower-order mobile communication terminals 1. Accordingly, the mobile communication terminal 1 of the highest order has a lower order terminal managing table 731 containing the entire lower order hierarchical structure.

In this case, the mobile communication terminals 1 respectively corresponding to the terminal identification numbers "232323" and "222222" stored in the level 1 table 633A are at the highest order. Upon the contents of the lower order terminal managing table 731 being changed, a highest order mobile communication terminal 1 is to transmit the changed lower order terminal managing table 731 to the location information managing device 60 via the base station 3 and switch 4. Accordingly, the contents of the hierarchy table 633 constantly reflect the subordination relations of the mobile communication terminals 1.

<2-2: Operation of the Second Embodiment>

Next, the operation of the mobile communication system according to the second embodiment will be described.

<2-2-1: Constructing a Hierarchical Structure>

Figure 13:
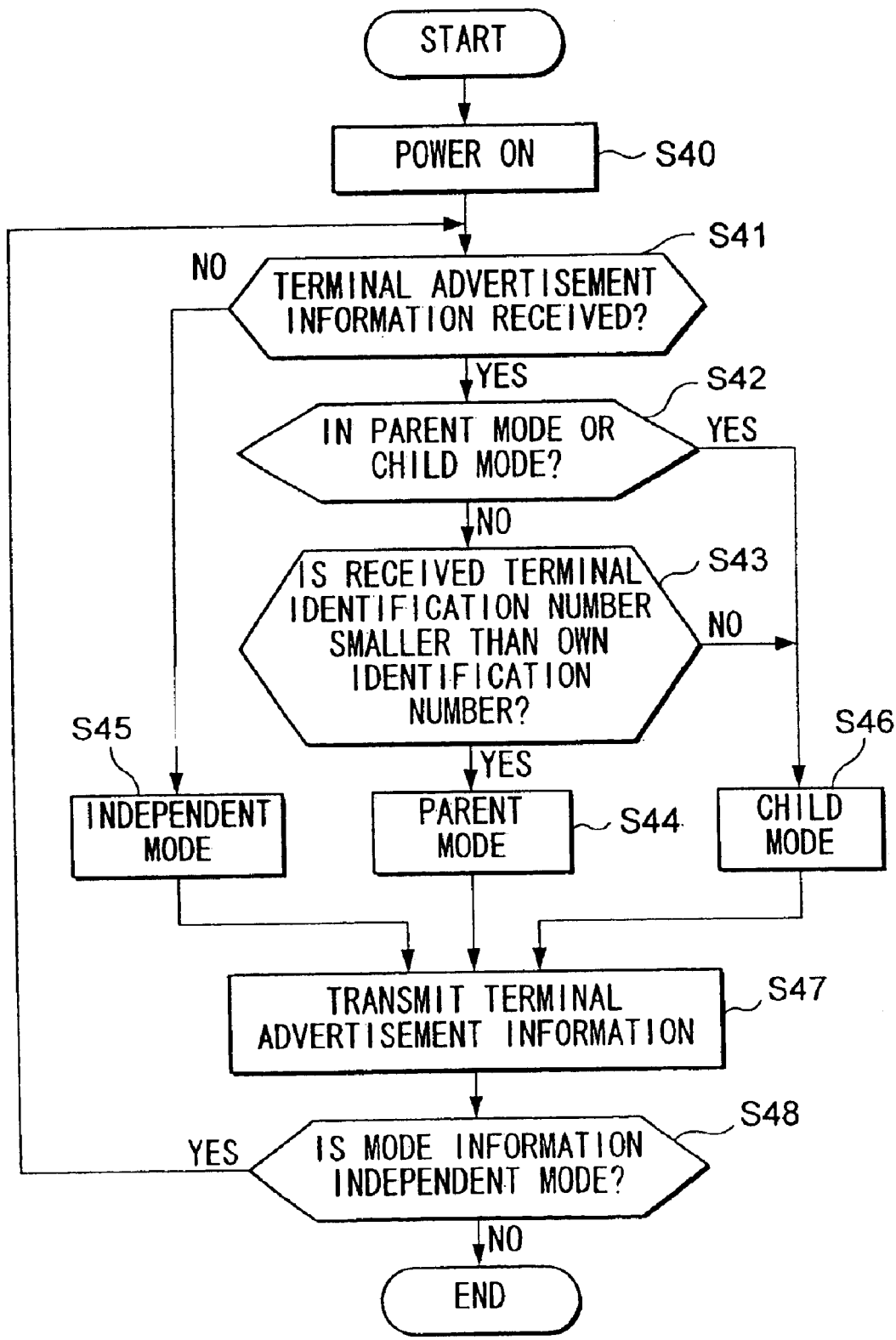
FIG. 13 is a flowchart illustrating the operation of the mobile communication terminal in the mobile communication system.

How the above-described hierarchical structure is constructed will be described through the operations of the mobile communication terminals. FIG. 13 is a flowchart illustrating the operations of the mobile communication terminal 1. First, upon the user turning the power source of the mobile communication terminal 1 to an on state, the control unit 72 judges whether or not terminal advertisement information advertised by other mobile communication terminals has been received (step S41). In the event that terminal advertisement information is not received, this is a case wherein there is no other mobile communication terminal 1 near the mobile communication terminal 1, so the mobile communication terminal 1 does not have a subordinate relation with another mobile communication terminal 1. Accordingly, the control unit 72 proceeds to step S45, and determines that the mode of the mobile communication terminal 1 is the independent mode (step S45).

On the other hand, in the event that terminal advertisement information is received, the judgment results in step S41 are YES, so the control unit 72 advances the processing to step S42, where judgment is made regarding whether the mode information contained in the terminal advertisement information is for a parent mode or child mode (step S42). In the event that neither match, this means that another mobile communication terminal 1 operating in the independent mode is nearby. Accordingly, the control unit 72 determines whether itself should be subordinate to the other, or whether the other should be subordinate to itself, following predetermined rules. In this example, this is determined by the greatness of the terminal identification number.

Specifically, in step S43, the control unit 72 judges whether or not the terminal identification number contained in the received terminal advertisement information is smaller than the terminal identification number of itself, and in the event that it is smaller, the mode of the mobile communication terminal is determined to be the parent mode (step S44). On the other hand, in the event that this is greater, the control unit 72 determines the mode of the mobile communication terminal to be the child mode (step S46).

Thus, following determining of the mode, the control unit 72 generates terminal advertisement information, and advertises this to the other mobile communication terminal 1 (step S47). Here, the terminal advertisement information contains the mode information and the terminal identification number of the mobile communication terminal. Also, in the event that the mode information instructs the child mode, the terminal identification number of the mobile communication terminal to be the parent is also contained in the terminal advertisement information.

Next, the control unit 72 judges whether or not the mode information is the independent mode or not (step S48), and in the event that this is the independent mode, the processing from step S41 through step S48 is repeated, and the processing ends at the point that the mode information is the parent mode or the child mode.

<2-2-2: Registration Processing>

Next, the operation of registration processing which the mobile communication terminal 1 performs with regard to the location information managing device 60 will be described. The registration processing is generally divided into hierarchical registration processing for registration of a hierarchical subordination relation of the mobile communication terminals 1, and location registration processing for registration of location registration area information using a hierarchical subordination relation.

First, in the event that there has been a change to the lower order terminal managing table 731 of the mobile communication terminals 1, the lower order terminal managing table 731 following change is notified to the mobile communication terminal 1 contained in the terminal advertisement information. Accordingly, even in the event that there is a change in the subordination relation with regard to a lower-order mobile communication terminal 1, the lower order terminal managing tables 731 are sequentially updated from the lower levels to the higher levels, so all changes are reflected in the lower order terminal managing table 731 of the highest-order mobile communication terminal 1.

Second, the mobile communication terminal 1 at the highest order transmits the lower order terminal managing table 731 to the location information managing device 60 every time there is a change. According to such processing, there is no need for each of the mobile communication terminals 1 to transmit the lower order terminal managing table 731 to the location information managing device 60, so wireless resources and network resources can be used effectively.

The location registration processing is performed according to the following procedures. First, in the event that there has been a change to the location registration area, only the highest-order mobile communication terminal 1 transmits the post-change location registration area information to the location information managing device 60 along with the terminal identification information.

Second, the control unit 72 of the location information managing device 60 searches the hierarchy table 633 based on the terminal identification number, and determines all terminal identification numbers of lower order than the mobile communication terminal 1. For example, in the event that the stored contents of the hierarchy table 633 are such as shown in FIG. 12, and the terminal identification number of the highest-order mobile communication terminal 1 is "232323", all terminal identification numbers stored in the tables 633B, 633D, 731A, and 731B, are determined.

Third, the control unit 72 accesses the location table 632 based on the determined terminal identification numbers, and rewrites the received location registration area information over the location registration area information corresponding to the terminal identification numbers.

Thus, the location registration area information of all mobile communication terminals 1 in a hierarchical relation can be updated with a single location registration process, so traffic at the base station 3 can be markedly suppressed, and the wireless resources and network resources can be effectively used.

<3: Third Embodiment>

<3-1: Configuration of Third Embodiment>

The mobile communication system according to the third embodiment is the same as the mobile communication system according to the first embodiment shown in FIG. 1, except that only a location table 632 is provided as the location information managing device 60, and a moving unit table 631 is not provided.

With the mobile communication system according to the first embodiment, the subordination relations of all mobile communication terminals 1-1, 1-2, . . . , is managed by both the mobile communication network NET and the relay device 21, but with the third embodiment, the subordination relation is managed by the relay device 21 alone, and is not managed by the mobile communication network NET. This is because that, in the event that termination occurs at a certain mobile communication terminal 1, the mobile communication network NET can carry out the communication functions as long as paging requests can be transmitted to the location registration area to which the mobile communication terminal 1 belongs, so there is no particular need to manage the subordination relation with the mobile communication network NET.

For example, let us say that the moving unit identification number of a certain moving unit 2 is "TID-01", that the moving unit 2 belongs to a location registration area 5A, and further, contained in the moving unit 2 are mobile communication terminals 1-1 and 1-2 which have the terminal identification numbers of "654321" and "333343". In this case, the stored contents of the location table 632 are such as shown in FIG. 14. That is to say, the location registration area information of all mobile communication terminals 1-1, 1-2, ..., and the relay device 21, are stored in the location table 632, in a manner correlated with the moving unit identification number.

<3-2: Operation of Third Embodiment>
<3-2-1: En Bloc Location Registration>

With the present embodiment, subordination relation is not registered with the mobile communication network Net, but the relay device 21 makes en bloc location registration with the mobile communication network NET for the mobile communication terminals 1 contained in the moving unit 2. This processing will be referred to as en bloc location registration. In the following description, let us assume a case wherein, as with the first embodiment, a user of a mobile communication terminal 1-1 and a user of a mobile communication terminal 1-2 get in a moving unit 2 located in a base station area 4c (the location registration area 5A), and this moving unit 2 moves to the base station area 4d (the location registration area 5B).

Figure 15:
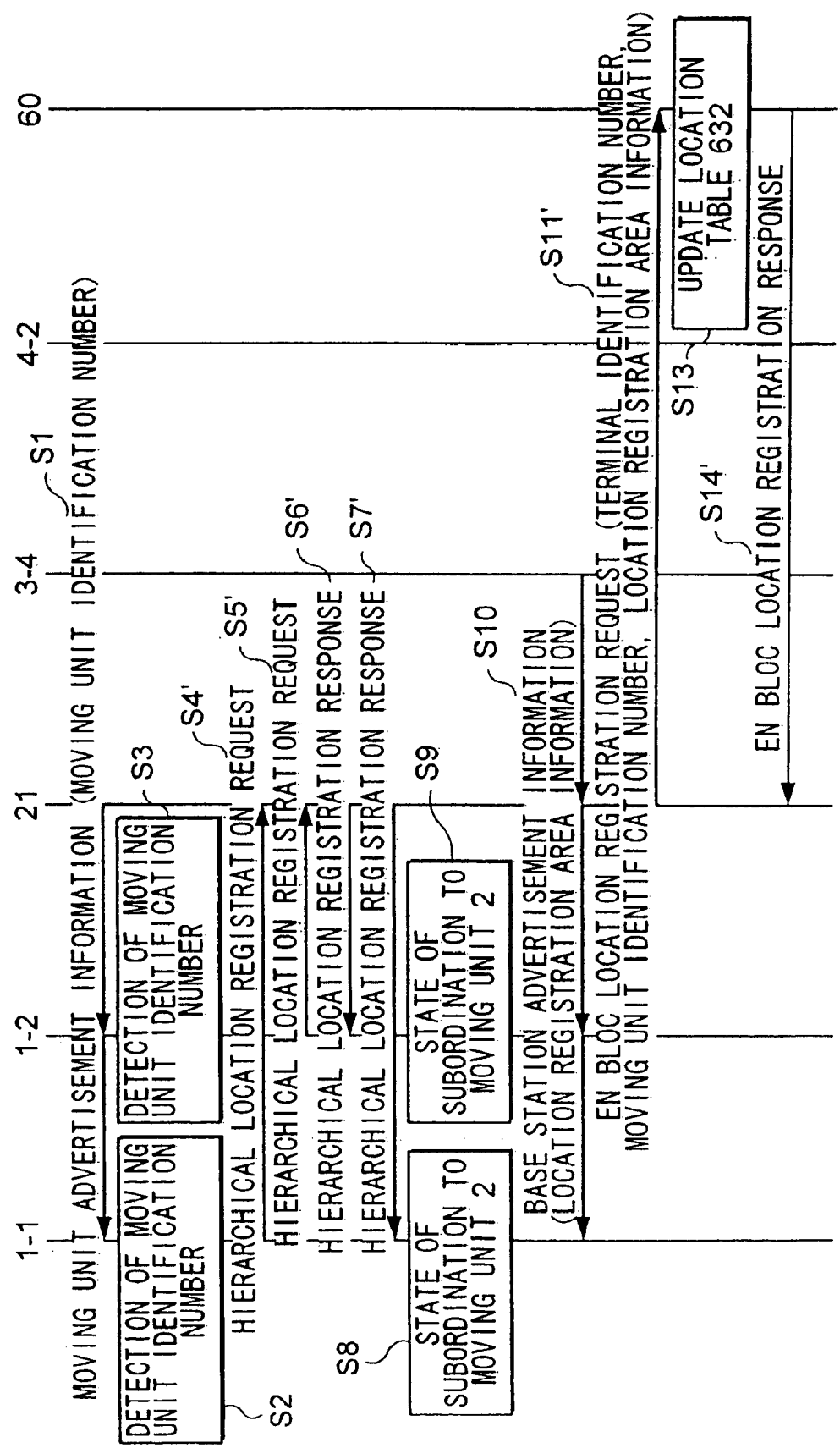
FIG. 15 is a sequence diagram illustrating the initial operation of en bloc location registration in the mobile communication system.

FIG. 15 is a sequence diagram illustrating the initial operation of en bloc location registration in the mobile communication system according to the third embodiment. As shown in the figure, the initial operation of en bloc location registration is the same as the hierarchical location registration according to the first embodiment shown in FIG. 7, except for the point that the subordination relation is not registered in a moving unit table 631, the point that a hierarchical registration request (steps S4' and S5') and an en bloc location registration request are transmitted (step S11'), and the point that, instead of a hierarchical location registration response, a hierarchical registration response (steps S6' and S7') and an en bloc location registration response are transmitted (step S14'). That is to say, with this example, registration of which moving unit 2 the mobile communication terminal 1 belongs to is not performed for the mobile communication network NET. However, en bloc location registration is made for the mobile communication terminals 1-1 and 1-2 contained in the moving unit 2.

In this case, even in the event of receiving a hierarchical registration request from the mobile communication terminals 1-1 and 1-2 (steps S4' and S5'), the relay device 21 does not immediately perform en bloc location registration, but rather performs en bloc location registration at the point that the moving unit 2 moves from the base station area 4c (the location registration area 5A) to the base station area 4d (the location registration area 5B). Specifically, upon the relay device 21 and the mobile communication terminals 1-1 and 1-2 receiving the location registration area information contained in the base station advertisement information advertised from the base station 3-4 (step S10), the advertisement information monitoring unit 212 of the relay device 21 detects that there is a disagreement between the former location registration area information and the received location registration area information, and detects that there has been a change in the location registration area.

Subsequently, the relay device 21 transmits an en bloc location registration request to the location information managing device 60 via the base station 3-4 and switch 4-2 (step S11'). This en bloc location registration request contains the moving unit identification number and location registration area information. The terminal identification numbers of the mobile communication terminals 1-1 and 1-2 are contained in the en bloc location registration request transmitted from the mobile communication terminals 1-1 and 1-2, and the relay device 21 uses these to generated an en bloc location registration request for the location information managing device 60.

Next, upon the location information managing device 60 receiving the en bloc location registration request, the control unit 62 records the terminal identification numbers of the mobile communication terminals 1-1 and 1-2 in the location table 632 in a manner correlated with the location registration area information (step S13). Thus, the location table 632 is updated.

Upon the location registration area being changed, a mobile communication terminal 1 in a normal state transmits of itself a location registration request to the base station 3, but the mobile communication terminals 1-1 and 1-2 which are in a subordination state do not make a location registration request to the base station 3. An en bloc location registration request is performed collectively for the individual location registration requests, so the wireless resources of the base station 3-4 can be conserved. Also, the en bloc location registration response is not transmitted to the individual mobile communication terminals 1-1 and 1-2, but only to the relay device 21, so the wireless resources of the base station 3-4 can be conserved.

The above has been a description of the initial operations of en bloc location registration, and the same location registration is performed in the event that the moving unit 2 subsequently moves to another location registration area, as long as the mobile communication terminals 1-1 and 1-2 are contained in the moving unit 2. For example, in the event that the moving unit 2 moves from the base station area 4d (location registration area 5B) to the base station area 4c (location registration area 5A), an en bloc location registration request is transmitted from the relay device 21 to the location information managing device 60 via the base station 3-3 and switch 4-1. The en bloc location registration request contains the moving unit identification number of the moving unit 2, the terminal identification numbers of the mobile communication terminals 1-1 and 1-2, and the location registration area information.

With the above-described first embodiment, the subordination relation is managed at the location information managing device 60, and accordingly location registration requests containing the moving unit identification numbers and the location registration area information are transmitted from the relay device 21 to the mobile communication network NET. Conversely, with the present embodiment, this subordination relation is not managed by the mobile communication network NET, so an en bloc location registration request is transmitted from the relay device 21 to the mobile communication network NET each time there is a change in the location registration area, thereby performing location registration of the mobile communication terminals 1 contained in the moving unit 2.

However, the relay device 21 stores the terminal identification numbers of the mobile communication terminals 1-1 and 1-2 in a subordination relation in the mobile communication terminal identification number storing unit 216, as with the first embodiment. Specifically, upon the mobile communication terminals 1-1 and 1-2 transmitting a hierarchical registration request to the relay device 21 (steps S5' and S6'), the relay device 21 stores the terminal identification numbers. In other words, the hierarchical relation is stored in the relay device 21. Accordingly, the mobile communication terminals 1-1 and 1-2 which are in a subordination relation do not transmit location registration requests to the base station 3 or relay device 21 even in the event that there is a change in the location registration area, and the relay device 21 performs en bloc location registration. Accordingly, the number of location registration signals are reduced.

<3-2-2: Releasing the Hierarchical Relation>

Figure 16:
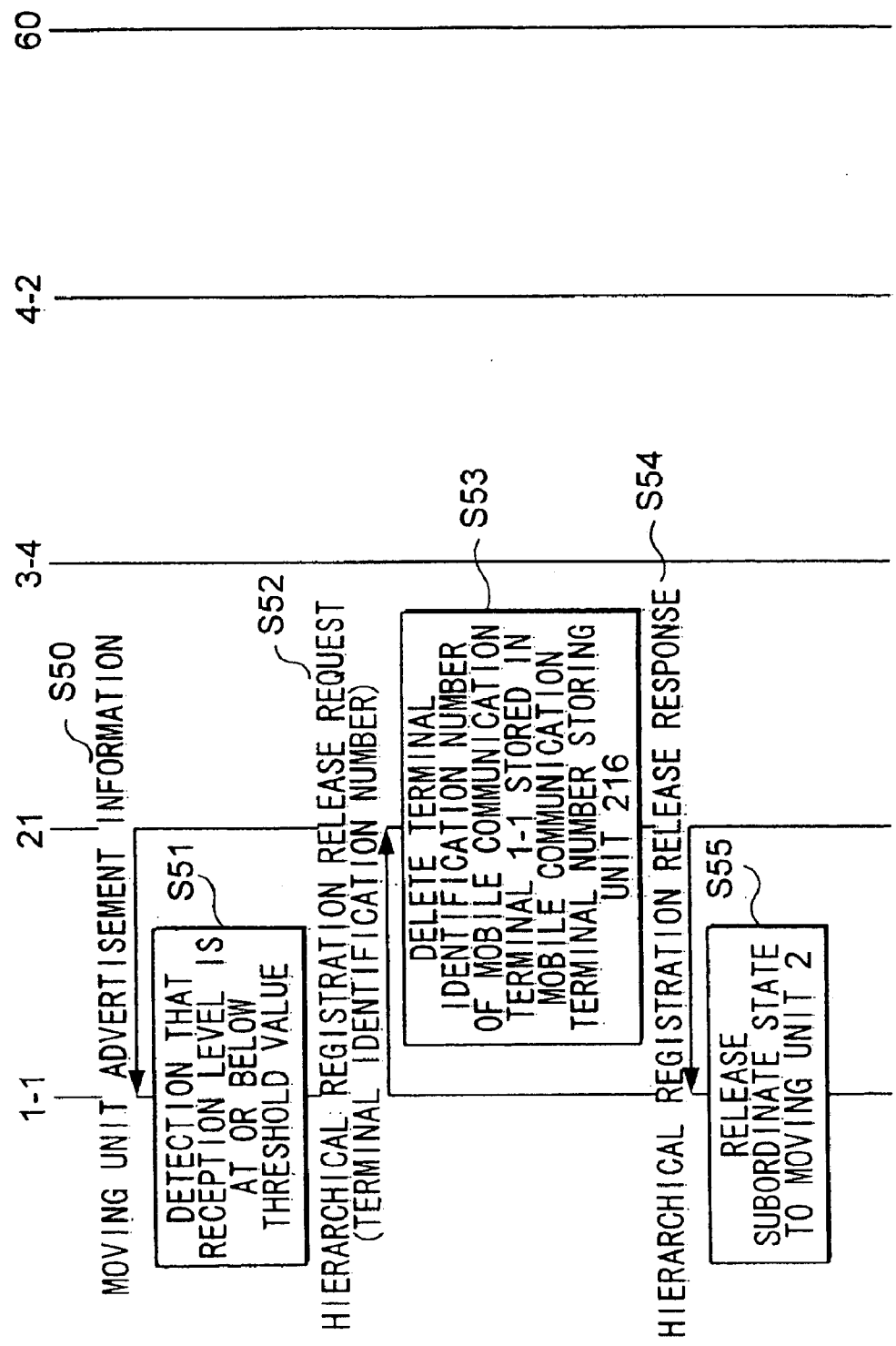
FIG. 16 is a sequence diagram illustrating the releasing operation of the hierarchical relation in the mobile communication system.

Next, releasing of the hierarchical relation will be described. As for the forms of releasing the hierarchical relation, this is a first form wherein a mobile communication terminal 1 directly communicates with the relay device 21, and a second form wherein the mobile communication terminal 1 communicates with the relay device 21 via the mobile communication network NET. FIG. 16 is a sequence diagram illustrating the operations of releasing the hierarchical relation according to the first form. In this example, a case wherein the user of the mobile communication terminal 1-1 disembarks and leaves the train (moving unit 2).

First, the relay device 21 constantly advertises moving unit advertisement information (step S50). On the other hand, the mobile communication terminal 1-1 compares the reception level of the moving unit advertisement information with a threshold value. In the event that the mobile communication terminal 1-1 departs from the moving unit 2, the reception level of the moving unit advertisement information drops. In the event that the mobile communication terminal 1-1 detects that the reception level of the moving unit advertisement information is at or lower than the threshold value (step S51), the mobile communication terminal 1-1 transmits a hierarchical registration release request to the relay device 21 (step S52). The terminal identification number of the mobile communication terminal 1-1 is contained in this hierarchical registration release request.

Next, upon the relay device 21 receiving the hierarchical registration release request, the terminal identification number of the mobile communication terminal 1-1 stored in the mobile communication terminal identification number storing unit 216 is deleted by the mobile communication terminal managing unit 215 (step S53). Accordingly, the registration of the hierarchical relation is released.

Subsequently, upon the relay device 21 transmitting a hierarchical registration release response to the mobile communication terminal 1-1 (step S54), the mobile communication terminal 1-1 can know that the subordination state with the moving unit 2 has been released (step S55). At this time, the mobile communication terminal 1-1 deletes the moving unit identification number from the moving unit identification number storing unit 15. Subsequently, in the event that there is a change in the location registration area, the mobile communication terminal 1-1 transmits a location registration request to the base station 3.

Now, in the event that the processing of the above-described hierarchical registration release request (step S52) through the hierarchical registration release response (step S54) is not performed successfully, this means that the registration of the hierarchical relation may not be released in the relay device 21, or the moving unit identification number may not be deleted from the mobile communication terminal 1-1.

Accordingly, in the event that the mobile communication terminal 1-1 does not receive a hierarchical registration release response from the relay device 21 following elapsing of a predetermined amount of time following transmitting the hierarchical registration release request to the relay device 21, the mobile communication terminal 1-1 performs releasing of registration of the hierarchical relation via the mobile communication network NET.

Figure 17:
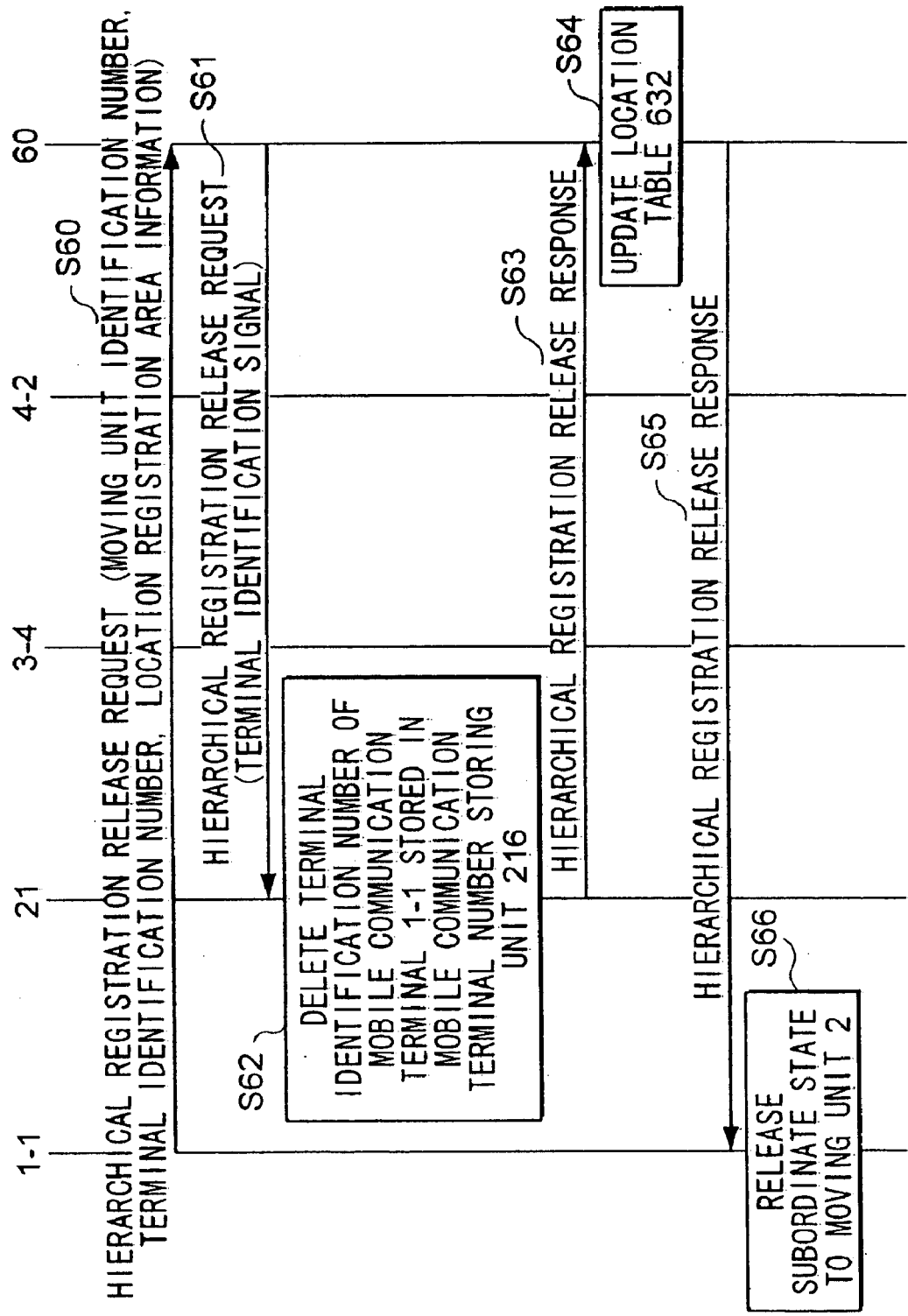
FIG. 17 is a sequence diagram illustrating the operation of releasing registration of the hierarchical relation via a mobile communication network NET in the mobile communication system.

Next, description will be made regarding the second form. FIG. 17 is a sequence diagram illustrating the operation of performing releasing of registration of the hierarchical relation via the mobile communication network NET. First, the mobile communication terminal 1-1 transmits a hierarchical registration release request to the location information managing device 60 via the base station 3-4 and the switch 4-2 (step S60). This hierarchical registration release request contains the moving unit identification number, the terminal identification number, and the location registration area information.

Next, the location information managing device 60 searches the location table 632 based on the moving unit identification number contained in the hierarchical registration release request, obtains the location registration area information of the moving unit 2, and transmits a hierarchical registration release request to the location registration area indicated by the location registration area information (step S61). This hierarchical registration release request contains the terminal identification number of the mobile communication terminal 1-1 which is the object of this operation.

Next, upon the relay device 21 receiving the hierarchical registration release request, the relay device 21 deletes the terminal identification number of the mobile communication terminal 1-1 stored in the mobile communication terminal identification number storing unit 216 (step S62). Thus, the hierarchical relation is released.

Subsequently, upon the relay device 21 transmitting a hierarchical registration release response to the location information managing device (step S63), the location information managing device 21 updates the location registration area information of the mobile communication terminal 1-1 stored in the location table 632, based on the location registration area information contained in the hierarchical registration release request received from the mobile communication terminal 1-1 (step S64). The reason that the location table 632 is not updated at the time of the hierarchical relation being released in the sequence shown in FIG. 16 but the location table 632 is updated with this sequence is that with the present sequence, a certain amount of time has elapsed since the mobile communication terminal 1-1 has departed from the moving unit 2, so the location registration areas of the moving unit 2 and the mobile communication terminal 1-1 may be different.

Next, upon the location information managing device 60 transmitting the hierarchical registration release response following the route of switch 4-2→base station 3-4→mobile communication terminal 1-1 (step S65), the mobile communication terminal 1-1 releases the subordination state to the moving unit 2 (step S66). Accordingly, even in the event that releasing of the registration of the hierarchical relation cannot be performed between the relay device 21 and the mobile communication terminal 1-1, registration of the hierarchical relation can be released via the mobile communication network NET. Note that an arrangement may be made wherein the registration of the hierarchical relation is released via the mobile communication network NET from the beginning, without performing releasing of the registration of the hierarchical relation between the relay device 21 and the mobile communication terminal 1-1.

<4: Fourth Embodiment>

<4-1: Configuration of the Fourth Embodiment>

The mobile communication system according to the fourth embodiment is the same as the mobile communication system according to the first embodiment shown in FIG. 1, except for the point that an extended location table 634 is used instead of the location table 632 for the table of the location information managing device 60, and the point that a moving unit table 631 is not provided.

Figure 18:
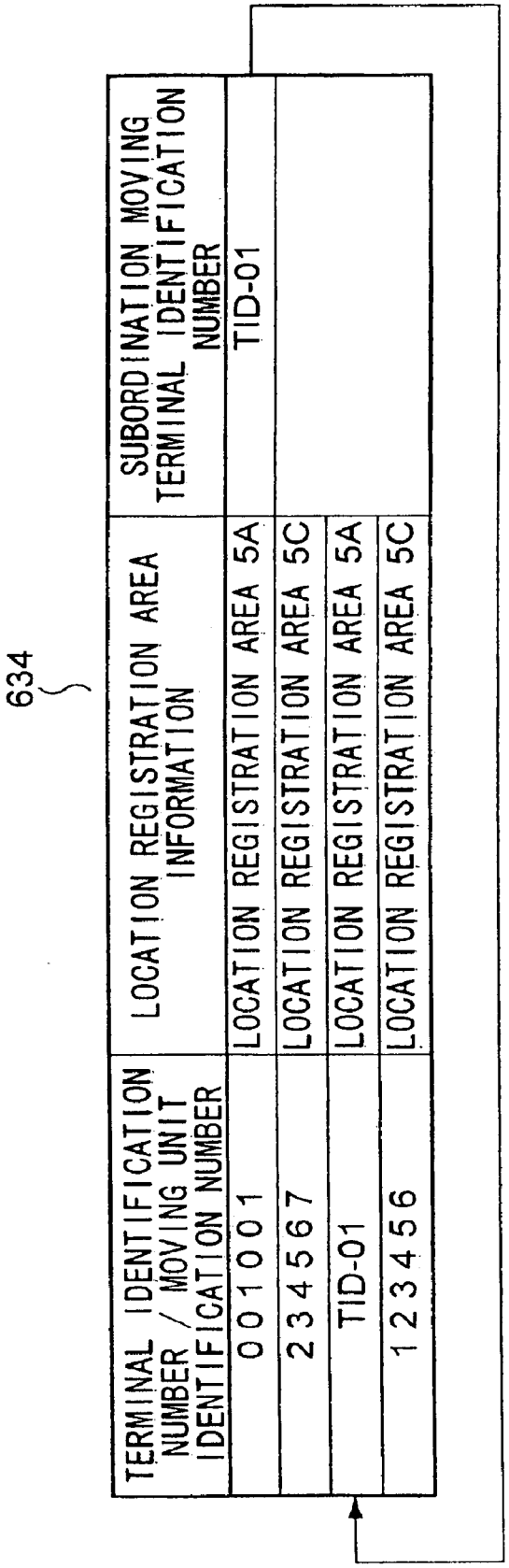
FIG. 18 is a diagram illustrating an example of the stored contents of an extended location table used in a mobile communication system according to a fourth embodiment.

FIG. 18 is a diagram illustrating the stored contents of the extended location table 634. The extended location table 634 stores terminal identification numbers or moving unit identification numbers, location registration area information, and subordinate mobile terminal identification information, in a correlated manner. Here, the subordinate mobile terminal identification information is information for identifying the moving unit 2 to which the mobile communication terminal 1 is subordinate, and is represented by the moving unit identification number. In the example shown in FIG. 18, the mobile communication terminal 1 corresponding to the terminal identification number "001001" is subordinate to the moving unit 2 which corresponds to the moving unit identification number "TID-01".

Thus, the extended location table 634 according to the fourth embodiment is capable of centrally managing the location registration area information and the subordination relations.

<4-2: Operation of the Fourth Embodiment>
<4-2-1: Hierarchical Location Registration>

First, the operations for hierarchical location registration with the mobile communication system according to the fourth embodiment are the same as the hierarchical location registration operations according to the first embodiment shown in FIG. 7, except for the point that the stored contents of the extended location table 634 are updated based on a hierarchical location registration request from the relay device 21. That is, the extended location table 634 is updated instead of the step S12 for registering the subordination relation in the moving unit table 631 in FIG. 7, and the step S13 for updating the location table 632.

The hierarchical location registration request from the relay device 21 contains the terminal identification numbers of the terminals in a subordination relation, the moving unit identification number, and the location registration area information. Updating the extended location table 634 is performed by overwriting the location registration area information space corresponding to the moving unit identification number with the location registration area information contained in the hierarchical location registration request, and writing the moving unit identification number contained in the hierarchical location registration request into the subordinate mobile terminal identification information space corresponding to the terminal identification numbers.

<4-2-2: Location Registration>

Next, the operations for location registration with the mobile communication system according to the fourth embodiment are the same as the hierarchical location registration operations according to the first embodiment shown in FIG. 8, except for the point that the stored contents of the extended location table 634 are updated based on a location registration request from the relay device 21. That is, the extended location table 634 is updated instead of the step S24 for reading the terminal identification number from the moving unit table 631 shown in FIG. 8, and the step S25 for updating the location table 632.

The moving unit identification number and location registration area information are contained in the location registration request. For updating the extended location table 634, the location registration area information space corresponding to the moving unit identification number is overwritten with only the location registration area information contained in the location registration request. At the extended location table 634, the moving unit 2 can be identified by the subordinate mobile terminal identification information of the mobile communication terminal 1 that is subordinate thereto. Accordingly, in the event that termination occurs at a mobile communication terminal 1 with which there is a subordination relation, the location registration area of the mobile communication terminal 1 can be determined by making reference to the location registration area information of the moving unit 2 to which it is subordinate.

<4-2-3: Releasing Hierarchical Location Registration>

Next, the operations for releasing the hierarchical location registration are the same as the releasing of the hierarchical location registration according to the first embodiment shown in FIG. 9, except for the point of deleting the subordinate mobile terminal identification information in the extended location table 634 based on releasing of the hierarchical location registration. That is to say, the location information managing device 60 updates the extended location table 634 based on a hierarchical location registration release request transmitted from the mobile communication terminal 1-1, instead of the step S34 for releasing the subordination relation to the moving unit 2 shown in FIG. 9, and the step S35 for updating the location table 632.

The hierarchical location registration release request contains the moving unit identification number, terminal identification number, and location registration area information. For updating the extended location table 634, first, the subordinate mobile terminal identification information corresponding to the terminal identification number is deleted. Second, the location registration area space corresponding to the terminal identification number is overwritten with the location registration area information contained in the hierarchical location registration release request.

Thus, the subordination relation is released, and also the location registration area is updated for the released mobile communication terminal 1.

<5: Fifth Embodiment>
<5-1: Configuration of the Fifth Embodiment>

The mobile communication system according to the fifth embodiment is the same as the mobile communication system according to the second embodiment, except for the point that an extended location table 634' is used for the table of the location information managing device 60 instead of the hierarchy table 633 and the location table 632.

Figure 19:
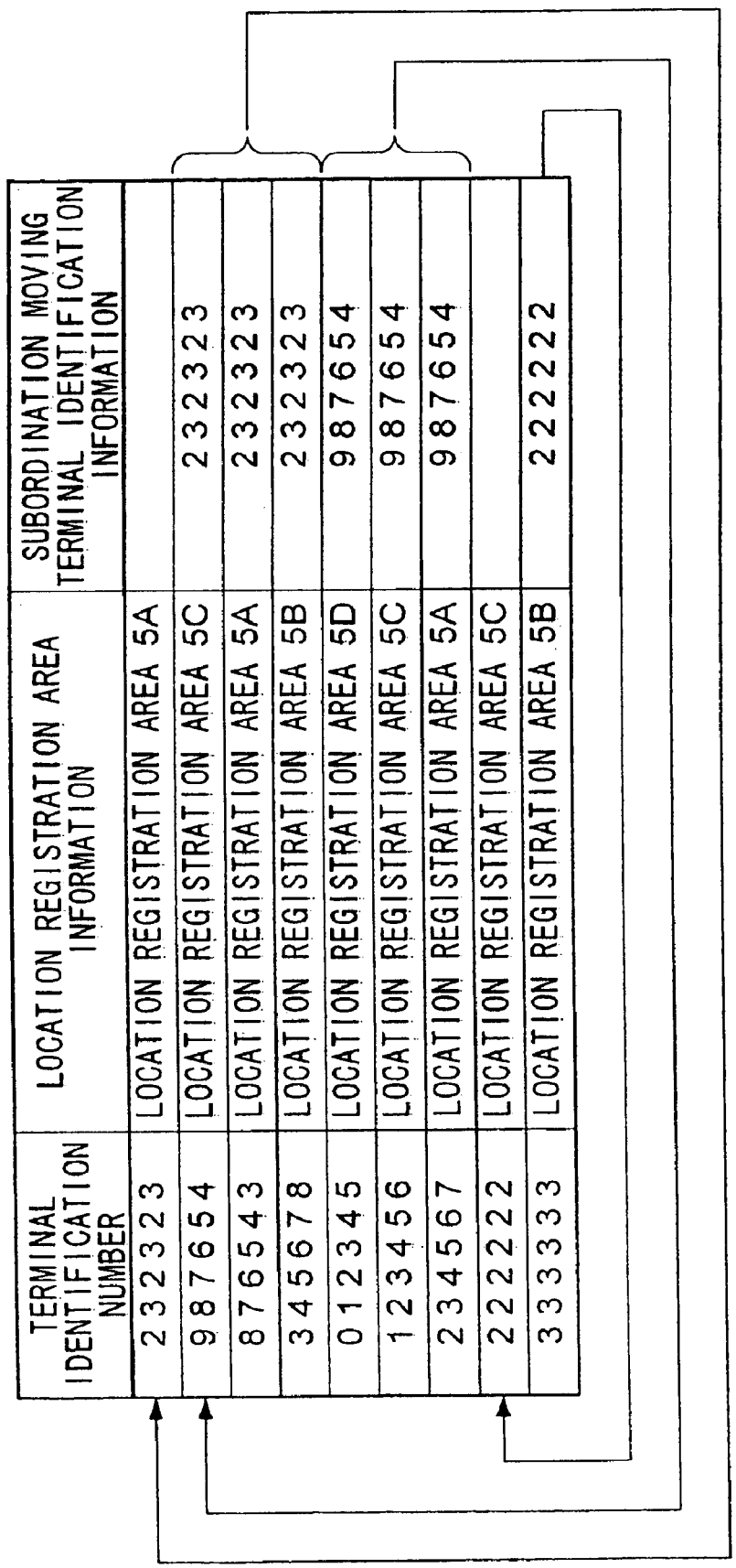
FIG. 19 is a diagram illustrating an example of the stored contents of an extended location table used in a mobile communication system according to a fifth embodiment.

FIG. 19 is a diagram illustrating the stored contents of the extended location table 634'. Note that this example corresponds to the hierarchical tables 633A, 633C, 633B, and 731A, shown in FIG. 12. As shown in the figure, the extended location table 634' stores terminal identification numbers, location registration area information, and subordinate mobile terminal identification information, in a correlated manner, as with the extended location table 634 described in the fourth embodiment.

For example, the terminal identification number "012345" is stored in a manner correlated with the subordinate mobile terminal identification information "987654", and the terminal identification number "987654" is stored in a manner correlated with the subordinate mobile terminal identification information "232323". In this case, the mobile communication terminal with the terminal identification number "012345" is subordinate to the mobile communication terminal having the terminal identification number "987654", and further, the mobile communication terminal having the terminal identification number "987654" is subordinate to the mobile communication terminal having the terminal identification number "232323". Accordingly, the location registration area of the terminal identification number "012345" is the location registration area indicated in the location registration area information of the terminal identification number "232323".

In this way, the extended location table 634' according to the fifth embodiment can centrally manage location registration area information and plural hierarchical relations.

<5-2: Operations of the Fifth Embodiment>

The operations of the mobile communication terminal 1 according to the fifth embodiment are the same as those described in the second embodiment, with the mobile communication terminals 1 autonomously constructing hierarchical relations. On the other hand, the registration operations with the mobile communication network NET according to the fifth embodiment are the same as the hierarchical location registration, location registration, and hierarchical location registration releasing, described in the fourth embodiment.

That is, with the fifth embodiment, in the event that a certain mobile communication terminal 1 is subordinate to another mobile communication terminal 1, the extended location table 634' is updated at the point that there has been a change in the location registration area. At this time, the terminal identification number of the parent mobile communication terminal 1 is written into the subordinate mobile communication terminal information space corresponding to the child mobile communication terminal 1 in the extended location table 634', and also new location registration area information is written to the location registration area information space of the parent mobile communication terminal 1. Thus, storing the terminal identification number of the parent in the subordinate mobile terminal identification information space allows subordination relations spanning plural hierarchical levels to be managed.

Also, upon the location registration area of the parent mobile communication terminal 1 being changed, only the location registration area information of the parent is updated, and the location registration area information of the child is not updated. In the event of searching for the location registration area information of the child, the desired location registration area information can be obtained by obtaining the terminal identification number stored in the space of the subordinate mobile terminal identification information based on the terminal identification number of the child, and further repeating the like processing, thereby determining the terminal identification number of the highest order, and obtaining location registration area information corresponding thereto.

<6: Sixth Embodiment>
<6-1: Configuration of the Sixth Embodiment>

The mobile communication system according to the sixth embodiment is the same as the mobile communication system according to the fifth embodiment, except for the point that the parent mobile communication terminal 1 does not have a lower order terminal managing table 731. That is to say, while with the fifth embodiment, the subordination relation is managed at both the mobile communication network NET and the mobile communication terminal 1, with the sixth embodiment, the subordination relation is managed only at the mobile communication network NET.

<6-2: Operations of the Sixth Embodiment>
<6-2-1: Hierarchical Location Registration>

With the sixth embodiment, the mobile communication terminal 1 serving as a parent does not have a lower order terminal managing table 731. Accordingly, with the mobile communication terminal 1 which has entered the child mode by the procedure shown in FIG. 13, in the event that the location registration area changes following entering the child mode, a hierarchical location registration request is transmitted following the route of mobile communication terminal 1 (child mode)→base station 3→switch 4→location information managing device 60, or the route of mobile communication terminal 1 (child mode)→mobile communication terminal 1 (parent mode)→base station 3→switch 4→location information managing device 60. In this case, the mobile communication terminal 1 (parent mode) may serve as a simple relay device for airwaves, or may generate the aggregated hierarchical location registration requests transmitted from the child mobile communication terminals 1, at predetermined time intervals.

The hierarchical location registration request itself contains the terminal identification number of itself (child), the terminal identification number of the parent, and location registration area information. Upon the location information managing device 60 receiving the hierarchical location registration request, the location information managing device accesses the extended location table 634' based on the terminal identification number of the child, writes the terminal identification number of the parent to the corresponding subordinate mobile communication terminal identification information space, and further updates the location registration area. While the subordination relation is registered, the location registration area information of the parent is handled as location registration area of the child, so updating of the location registration area information may be omitted.

Subsequently, the location information managing device 60 transmits a hierarchical location registration response by the route of location information managing device 60→switch 4→base station 3→mobile communication terminal 1 (child mode), or by the route of location information managing device 60→switch 4→base station 3→mobile communication terminal 1 (parent mode)→mobile communication terminal 1 (child mode). Thus, the child mobile communication terminal 1 can know that the subordination relation has been registered.

<6-2-2: Location Registration>

The location registration according to the sixth embodiment is, as with the fourth and fifth embodiments, performed only by the mobile communication terminal 1 serving as a parent, and not by a mobile communication terminal 1 serving as a child. Accordingly, upon receiving a location registration request for a parent mobile communication terminal 1, the location information managing device 60 updates the location registration area information space corresponding to this mobile communication terminal based on the location registration area information contained in the location registration request, but updating of the location registration area information is not performed for the mobile communication terminal 1 serving as a child. Accordingly, the number of times of updating the location registration area information can be reduced.

<6-2-3: Releasing Hierarchical Location Registration>

Releasing of the hierarchical location registration is performed according to the following procedures with the sixth embodiment.

First, the mobile communication terminal 1 serving as a child constantly compares the reception airwave level of terminal advertisement information transmitted from a mobile communication terminal 1 serving as a parent, with a predetermined threshold value.

Second, upon detecting that the reception airwave level is at or lower than the threshold value, the mobile communication terminal 1 serving as a child transmits a hierarchical location registration release request by the route of mobile communication terminal 1 (child)→base station 3→switch 4→location information managing device 60. The hierarchical location registration release request contains the terminal identification number of itself (child), the terminal identification number of the parent, and location registration area information. Also, the child mobile communication terminal 1 may transmit the hierarchical location registration release request to the base station 3 via the parent mobile communication terminal 1. In this case, the parent mobile communication terminal 1 serves as a simple relay device for airwaves.

Third, upon the location information managing device 60 receiving the hierarchical location registration release request, the location information managing device 60 accesses the extended location table 634' based on the terminal identification number of the child, deletes the corresponding subordinate mobile communication terminal identification information space, and further updates the location registration area. In this way, the subordination relation is released.

Fourth, the location information managing device 60 transmits a hierarchical location registration release response by the route of location information managing device 60→switch 4→base station 3→mobile communication terminal 1 (child mode). Thus, the mobile communication terminal 1 which was a child can know that the subordination relation has been released.

Note that the location information managing device 60 may transmit the hierarchical location registration release response by the route of location information managing device 60→switch 4→base station 3→mobile communication terminal 1 which was parent→mobile communication terminal 1 (child mode). In this case, the mobile communication terminal 1 which was a parent serves as a simple relay device for airwaves.

For example, let us say that the stored contents of the extended location table 634' are in the state shown in FIG. 19, and from this state, the mobile communication terminal 1 having the terminal identification number "987654" has cancelled the subordination relation with the mobile communication terminal 1 having the terminal identification number of "232323", thereby becoming independent. In this case, the terminal identification number "232323" is deleted from the subordinate mobile terminal information space corresponding to the terminal identification number "987654". However, the subordination relation between the mobile communication terminal 1 having the terminal identification number of "987654" and the mobile communication terminals 1 having the terminal identification numbers of "012345", "123456", and "234567", is maintained. If the subordination relations between these were to be cancelled, it would be because the location information managing device 60 received individual hierarchical location registration release requests.

Thus, the present embodiment is advantageous in that, in the event that subordination relations spanning plural hierarchical levels exist, and the subordination relation between one hierarchical level and the next hierarchical level is cancelled, the remaining subordination relations can be kept.

<7. Seventh Embodiment>
<7-1: Configuration of the Seventh Embodiment>
<7-1-1: Overall Configuration of the Mobile Communication System>

Figure 20:
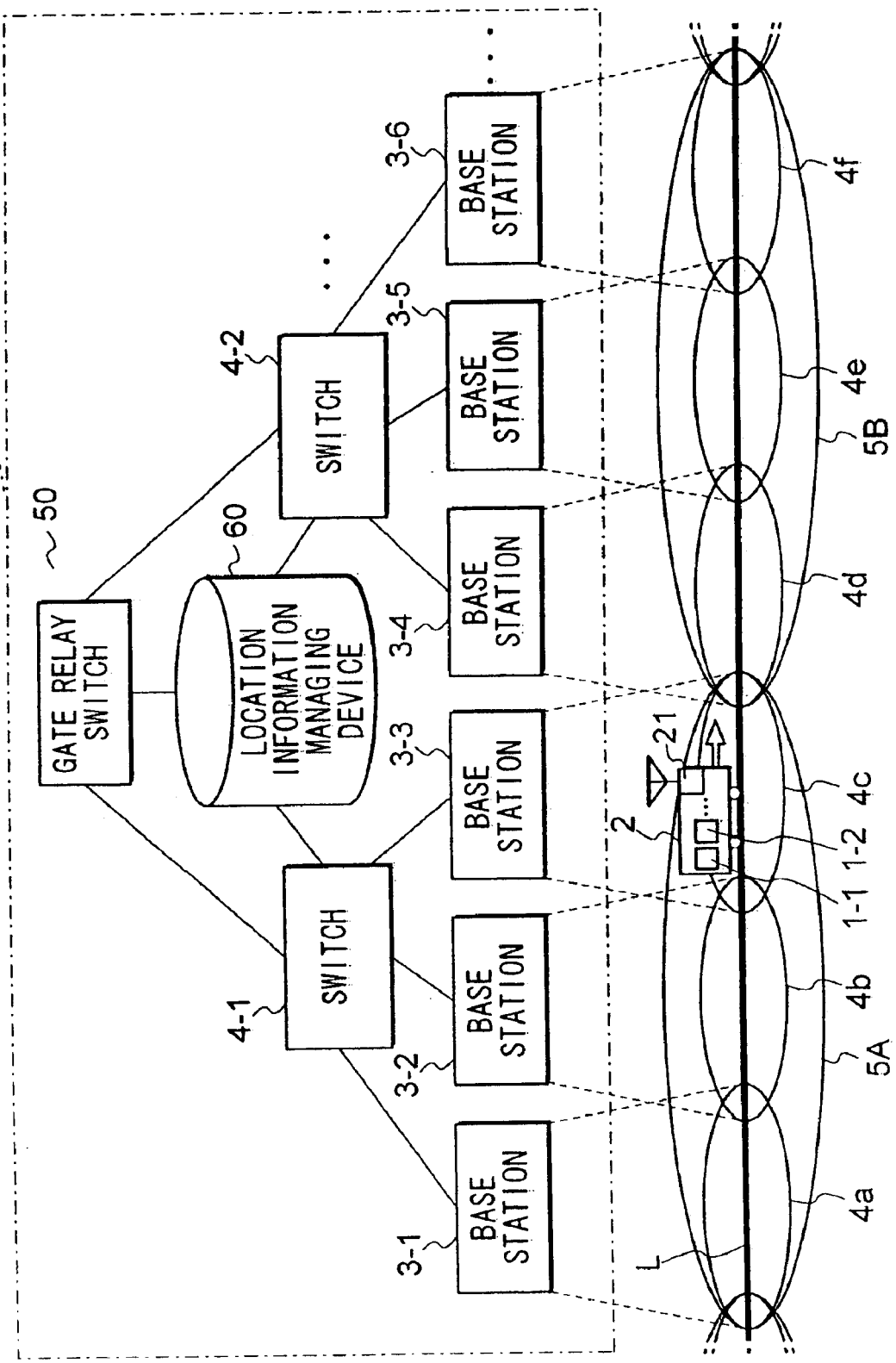
FIG. 20 is a block diagram illustrating the overall configuration of a mobile communication system according to a seventh embodiment of the present invention.

FIG. 20 is a diagram illustrating the overall configuration of the mobile communication system according to the seventh embodiment of the present invention. The mobile communication system shown in the figure has the same configuration as the mobile communication system according to the first embodiment, shown in FIG. 1.

<7-1-2: Configuration of Location Information Managing Device>

Figure 21:
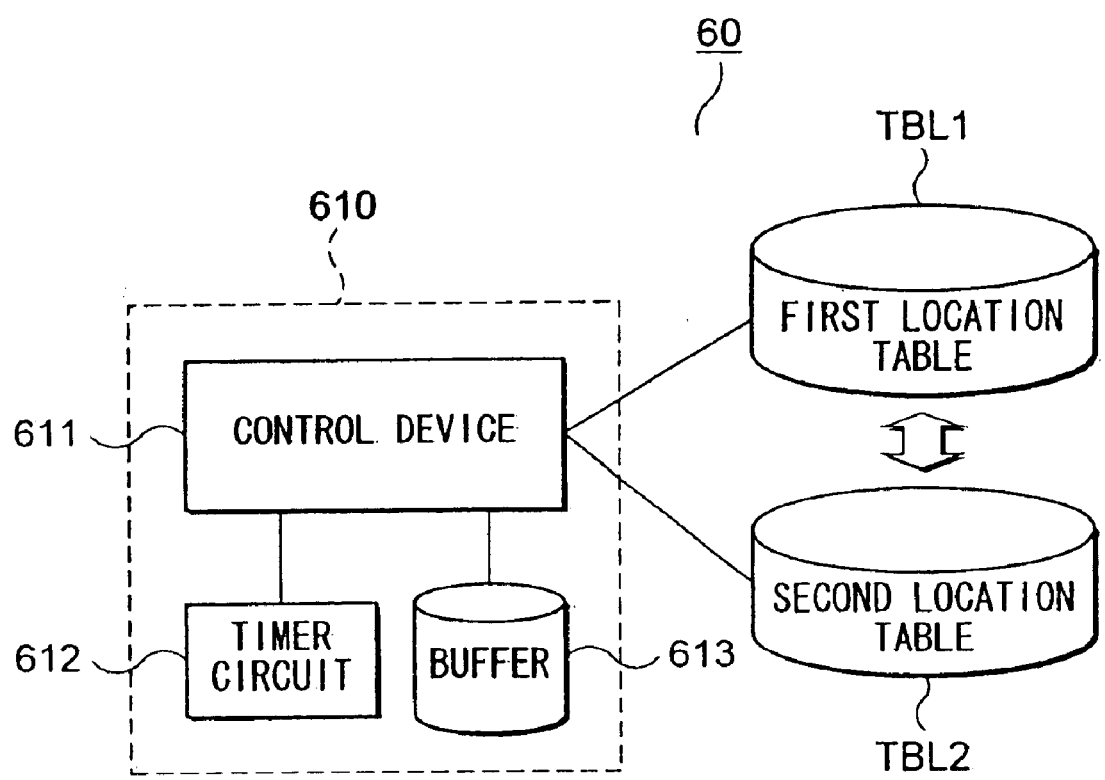
FIG. 21 is a block diagram illustrating the configuration of a location information managing device in a mobile communication system according to the seventh embodiment of the present invention.

FIG. 21 is a block diagram illustrating the configuration of the location information managing device. As shown in this figure, the location information managing device 60 comprises an paging request generating device 610, a first location table TBL1, and a second location table TBL2.

In the event that there has been a termination request REQt to a certain mobile communication terminal 1, the location information managing device 60 generates an paging request REQc.

Particularly, in the event that the location registration area information of plural mobile communication terminals 1 contained in the moving unit 2 such as a train or the like are consolidated and managed with the relay device 21 of the moving unit 2 as a key, the location information managing device 60 generates an en bloc paging request REQcx as a batch of plural paging requests REQc.

Figure 22:
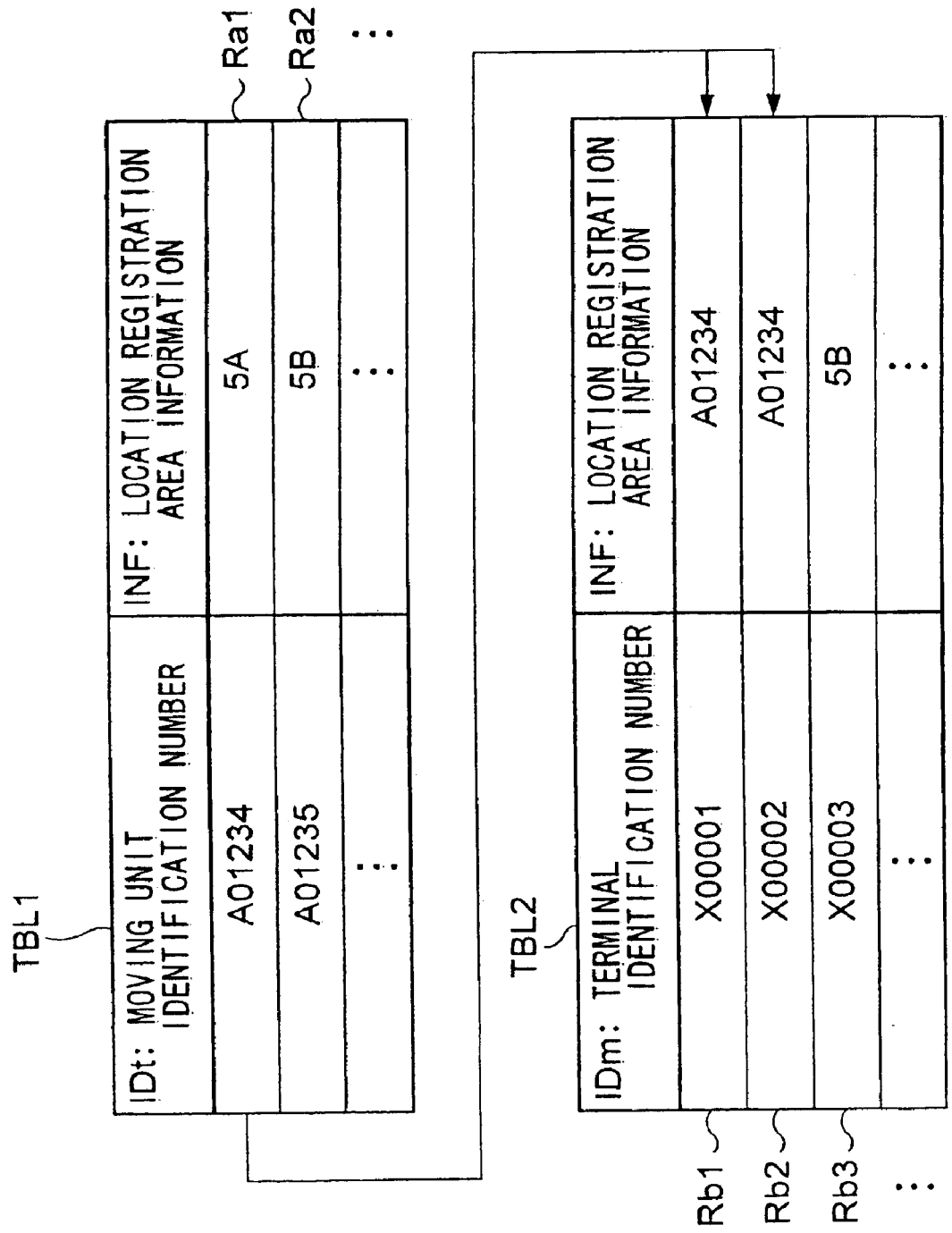
FIG. 22 is a diagram illustrating the stored contents of first and second tables in the system.

With the present embodiment, the location registration area information of plural mobile communication terminals 1 are managed using the first location table TBL1 and second location table TBL2. FIG. 22 is a diagram illustrating the stored contents of the first location table TBL1 and second location table TBL2, hierarchically arranged. The first location table TBL1 has plural records Ra1, Ra2, . . . , with one record storing a moving unit identification number IDt given to the relay device 21 of the moving unit 2 and the location registration area information, in a correlated manner. The total number of records matches the total number of moving units 2 having relay devices 21. Now, the moving unit identification number IDt is an identifier, uniquely appropriated so that the relay devices 21 can be identified. Also, the location registration area information is information indicating the location registration area where the terminal (in this example, the relay device 21) exists. Accordingly, which location registration area a certain relay device 21 belongs to can be known by making reference to the first location table TBL1.

For example, in the event that moving unit 2 exists in the location registration area 5A, as shown in FIG. 20, and a terminal identification number IDm given to the relay device 21 in the moving unit 2 is "A01234", the terminal identification number IDm "A01234" and the location registration area "5A" are recorded in the record Ra1, in a correlated manner, as shown in FIG. 22.

The second location table TBL2 has plural records Rb1, Rb2, . . . , with one record storing terminal identification numbers IDm of the mobile communication terminals 1 and the location registration area information, in a correlated manner. However, in the event that a certain mobile communication terminal 1 is contained in the moving unit 2, the moving unit identification number IDt given to the relay device 21 in the moving unit 2 is stored instead of the location registration area information. The terminal identification number IDm is an identifier, uniquely appropriated, such as a phone number for example, so that the mobile communication terminals can be identified.

In the event that the mobile communication terminals 1-1 and 1-2 are contained in the moving unit 2 of the above-described example, and the terminal identification numbers IDm given thereto are "X00001" and "X00002", the terminal identification number IDm of the mobile communication terminal 1-1 "X00001" and the moving unit identification number IDt "A01234" of the relay device 21 are stored in the record Rb1 of the second location table TBL2, in a correlated manner, as shown in FIG. 22.

In this case, in order to find out the location registration area information of the mobile communication terminal 1-1, first, the second location table TBL2 is searched with the terminal identification number IDm "X00001" as a key, and the moving unit identification number IDt "A01234" of the relay device 21 is obtained. Next, the first location table TBL1 is searched with the moving unit identification number IDt "A01234" as a key, and the location registration area information "5A" is obtained. (Paging request generating device)

As shown in FIG. 21, the paging request generating device 610 comprises a control circuit 611, a timer device 612, and a buffer 613.

The control device 611 is connected to the above-described first and second tables TBL1 and TBL2, besides the timer circuit 612 and buffer 613, and functions as a control center to control the components. Also, the control device 611 comprises an unshown interface unit, so that control signals such as termination requests REQt, paging requests REQc, or en bloc paging requests REQcx, and the like can be communicated between the switches 4-1, 4-2, . . . .

The timer circuit 612 measures a predetermined time, generates cycle signals W, and supplies these to the control device 611. The high-level period of this cycle signal W and the low-level period thereof are equal.

The buffer 613 buffers the termination requests REQt to the mobile communication terminals. The termination request REQt contains the terminal identification number IDm of the transmission destination.

The buffer 613 is made up of two storage areas, A and B, and reads termination requests REQt from the storage area B during the period of writing termination requests REQt to the storage area A, while reading termination requests REQt from the storage area A during the period of writing termination requests REQt to the storage area B. The control device 611 controls the buffer 613 based on the cycle signal W. More specifically, termination requests REQt are read from the storage area B and termination requests REQt are written to the storage area A in the high-level period of the cycle signal W, while termination requests REQt are read from the storage area A and termination requests REQt are written to the storage area B in the low-level period of the cycle signal W.

The control device 611 generates paging requests REQc or en bloc paging requests REQcx based on the termination requests REQt that have been read out. Specifically, first, the second location table TBL2 is searched regarding all buffered termination requests REQt, with the terminal identification numbers IDm contained therein as a key. Second, judgment is made regarding whether a moving unit identification number IDt or location registration area information has been obtained as the result of the search. Third, normal paging requests REQc are generated for those regarding which location registration area information has been obtained. Fourth, for those regarding which a moving unit identification number IDt has been obtained, the first location table TBL1 is searched with the moving unit identification number IDt as a key, thereby obtaining location registration area information. In the event that the same moving unit identification number IDt has been obtained for plural terminal identification numbers IDm, the first location table TBL1 is searched just once based on the moving unit identification number IDt. Fifth, an en bloc paging request REQcx is generated, based on the moving unit identification number IDt, the plural terminal identification numbers IDm, and the location registration area information.

That is to say, the control device 611 buffers the termination requests REQt occurring within a predetermined time, and in the event of terminations at plural mobile communication terminals 1 belonging to the same group within that time, these are viewed as simultaneous terminations, so using the first and second location tables TBL1 and TBL2, the paging requests REQc thereof are generated as an en bloc paging request REQcx to the relay device 21.

Figure 23:
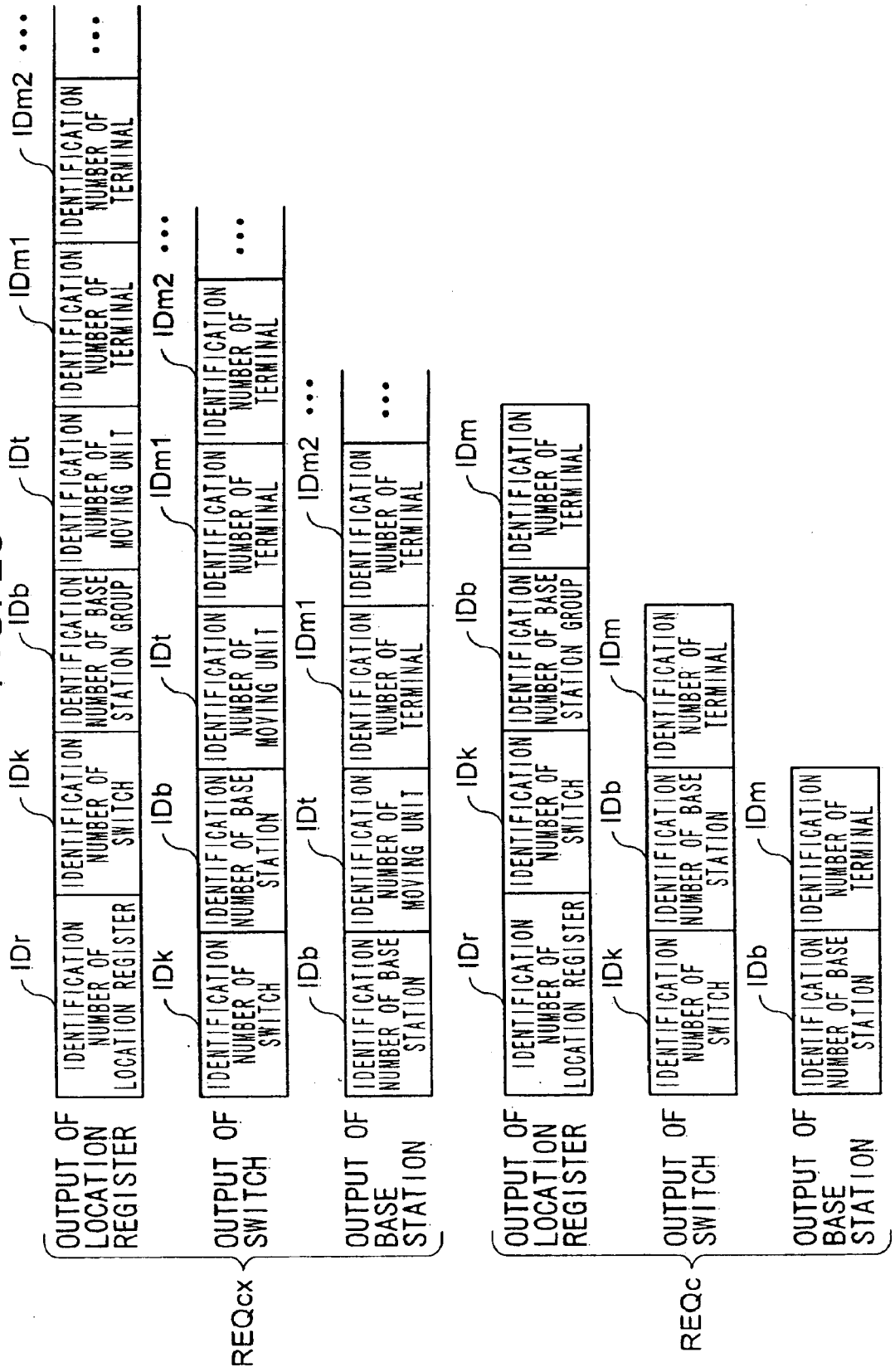
FIG. 23 is a diagram illustrating the configuration of en bloc paging requests and paging requests in the system.

FIG. 23 is a diagram illustrating the data configuration of an en bloc paging request REQcx and an paging request REQc. As shown in this diagram, the en bloc paging request REQcx output from the location information managing device 60 contains the identification number IDr of the location information managing device 60, the identification number IDk of the switch 4, the identification number IDb of the base station group, the moving unit identification number IDt, and the terminal identification numbers IDm1, IDm2, . . . . On the other hand, the paging request REQc differs from the en bloc paging request REQcx in that it only contains a single terminal identification number IDm.

An en bloc paging request REQcx consolidates plural paging requests REQc, and accordingly the number of times of transmission over the mobile communication network NET can be reduced. Additionally, each of the mobile communication terminals 1 subordinate to the relay device 21 belong to the same location registration area. Accordingly, in the event that individual paging requests REQC are generated, the identification number IDr of the location information managing device 60, the identification number IDk of the switch 4, and the identification number IDb of the base station group, are redundant in the paging requests REQc. The en bloc paging request REQcx consolidates common identification numbers, so the amount of signals can be reduced as compared with plural paging requests REQc.

<7-1-3: Configuration of the Moving Unit>

Figure 24:
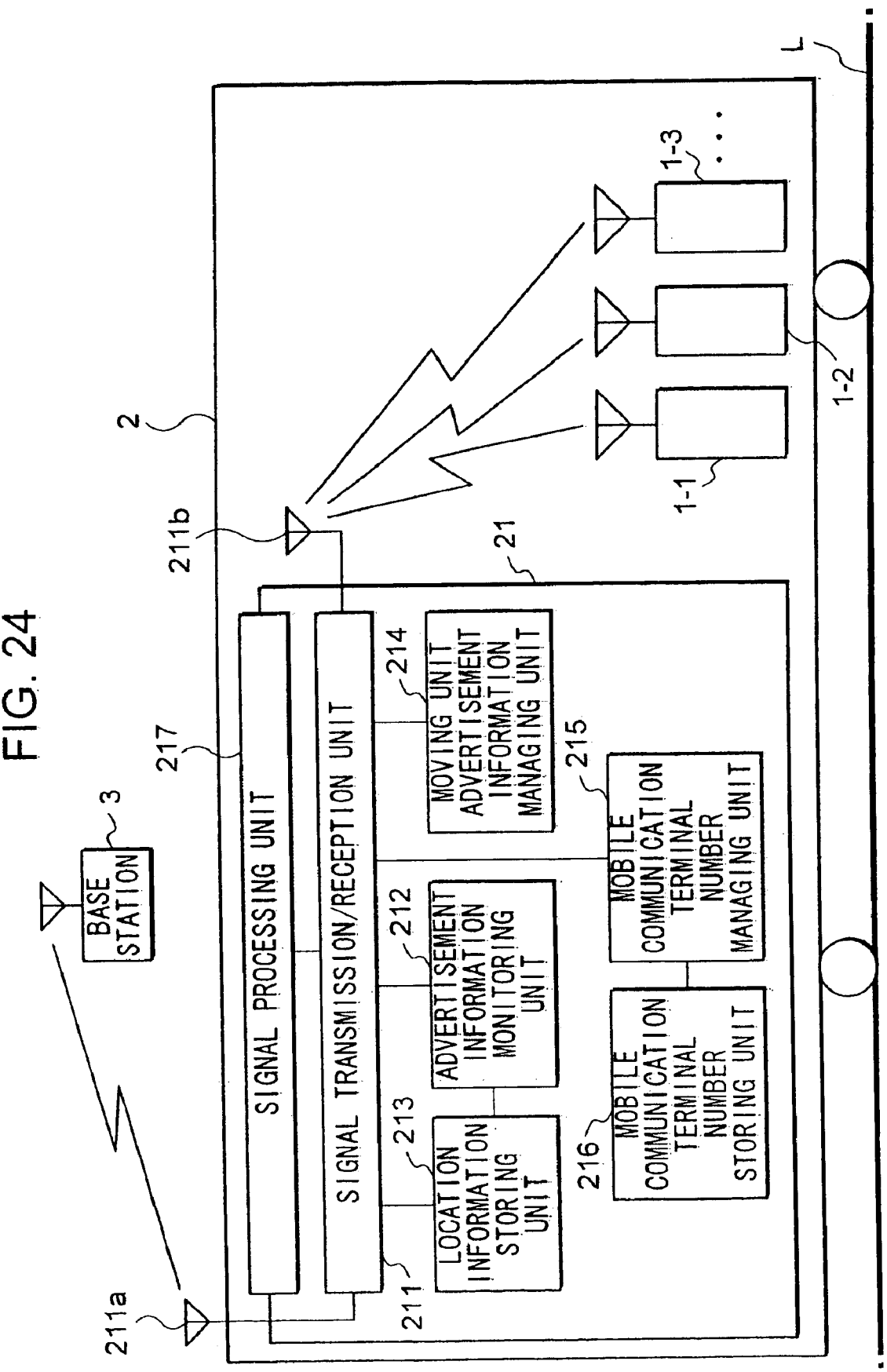
FIG. 24 is a block diagram illustrating the configuration of the moving unit in the system.

FIG. 24 is a block diagram illustrating the configuration of a moving unit 2 in the mobile communication system according to the present embodiment. An embodiment may be conceived wherein, instead of the relay device 21 shown in the figure, a certain mobile communication terminal 1 takes on the functions of the relay device 21. An example of such an embodiment will be described in the later-described eighth embodiment of the present invention.

The relay device 21 shown in the figure comprises a signal processing unit 217, in addition to the components of the relay device 21 shown in FIG. 2.

The signal processing unit 217 generates plural paging requests REQc by dividing the en bloc paging request REQcx which the relay unit 21 has received. Specifically, the moving unit identification number IDt and the plural terminal identification numbers IDm contained in the en bloc paging request REQcx are each combined, thereby generating plural paging requests REQc.

Figure 25:
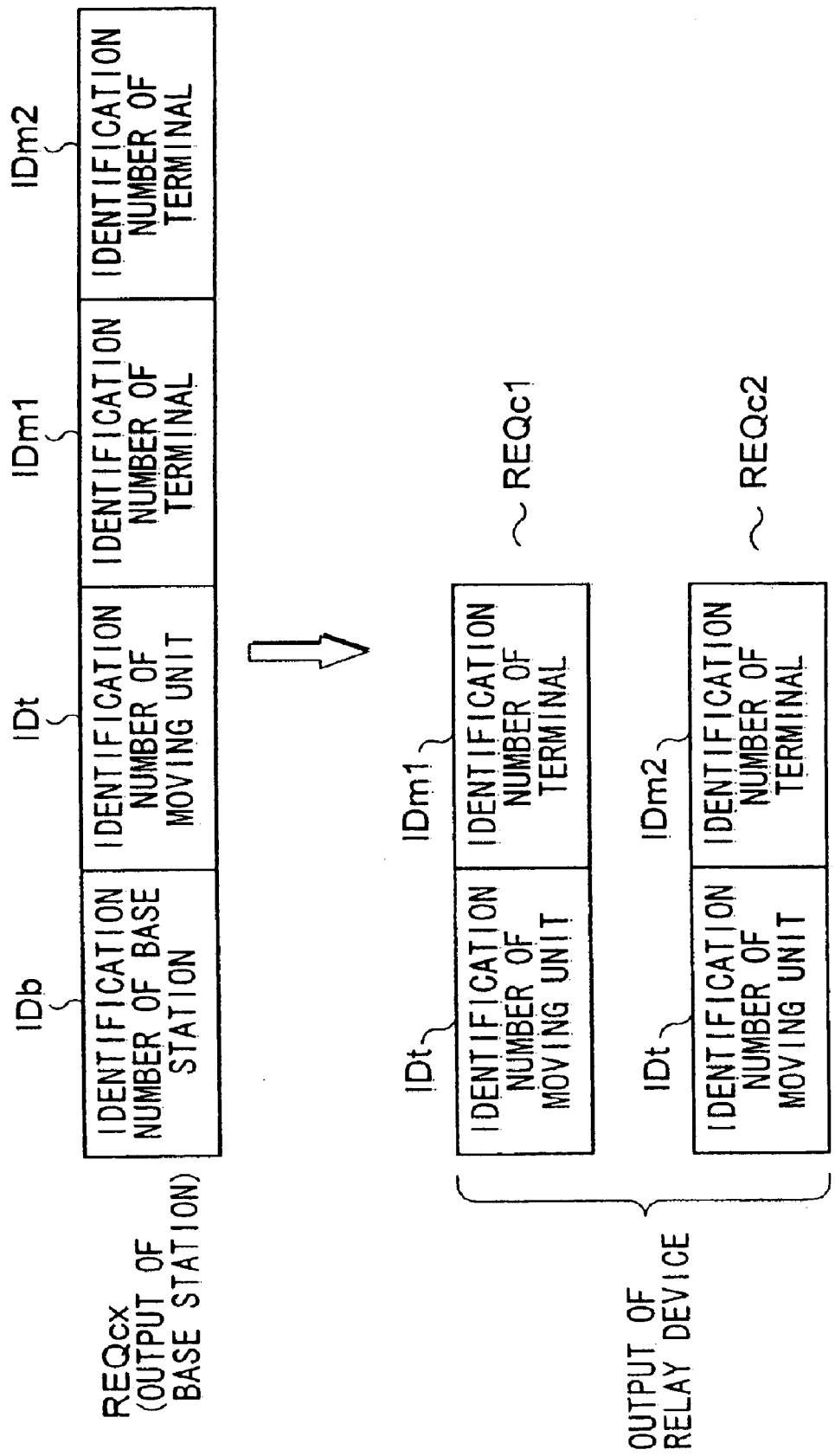
FIG. 25 is a diagram illustrating the contents of en bloc paging requests in the system.

For example, in the event that the relay device 21 has received an en bloc paging request REQcx containing the two terminal identification numbers IDm1 and IDm2 as shown in FIG. 25, the signal processing unit 217 generates a REQc1 wherein the moving unit identification number IDt and the terminal identification number IDm1 has been combined, and a REQc2 wherein the moving unit identification number IDt and the terminal identification number IDm2 has been combined. Upon the mobile communication terminals 1-1 and 1-2 receiving the paging requests REQc1 and REQc2, the mobile communication terminals 1-1 and 1-2 each generate paging responses RESc1 and RESc2, and transmit these to the relay device 21.

<7-2: Operations of the Seventh Embodiment>
<7-2-1: Hierarchical Location Registration>

Figure 26:
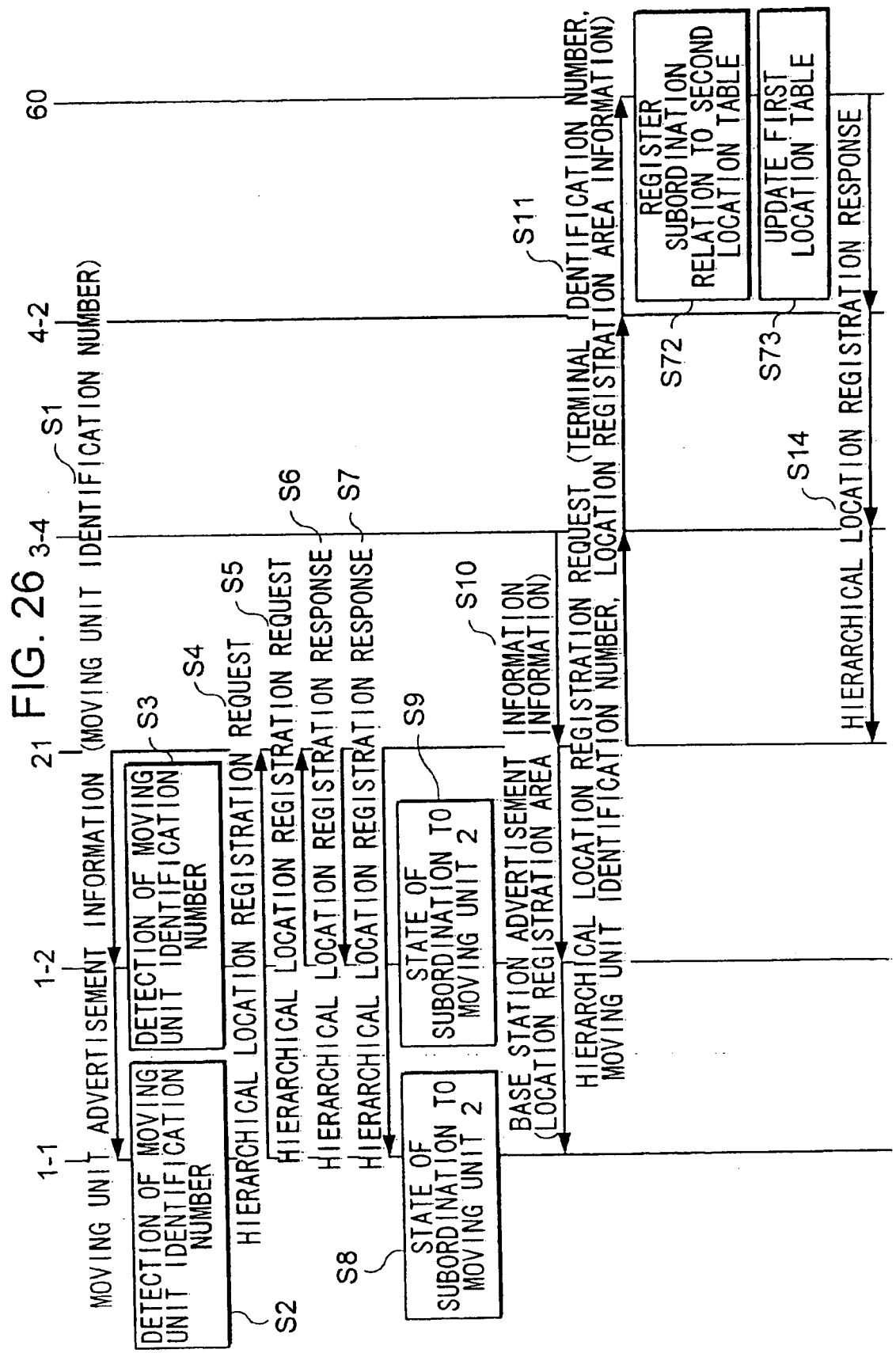
FIG. 26 is a sequence diagram illustrating the operation of hierarchical location registration in the system.

FIG. 26 is a sequence diagram illustrating the operations for en bloc location registration in the mobile communication system according to the seventh embodiment. As shown in the figure, the operations of the en bloc location registration are the same as the hierarchical location registration of the first embodiment shown in FIG. 7, except for the point that the subordination relation is registered in the second location table (step S72) instead of the moving unit table 631, and the point that the first table is updated (step S73) instead of the location table 632.

Upon the location information managing device 60 receiving a hierarchical location registration request, the control device 611 registers the terminal identification numbers IDm of the mobile communication terminals 1-1 and 1-2 in the second table TBL2, in a manner correlated with the moving unit identification number IDt of the moving unit 2 (step S72). Also, the control device 611 overwrites the received location registration area information in the location registration area information space corresponding to the moving unit identification number IDt of the moving unit 2 in the first location table TBL (step S73). Accordingly, the subordination relation between the mobile communication terminals 1-1 and 1-2 and the moving unit 2 is registered, and also the location registration area information is updated.

Thus, the location information managing device 60 group and manage the location registration area information of plural mobile communication terminals, with the relay device 21 of the moving unit 2 as a key.

<7-2-2: En Bloc Paging Request and Paging Response>

Figure 27:
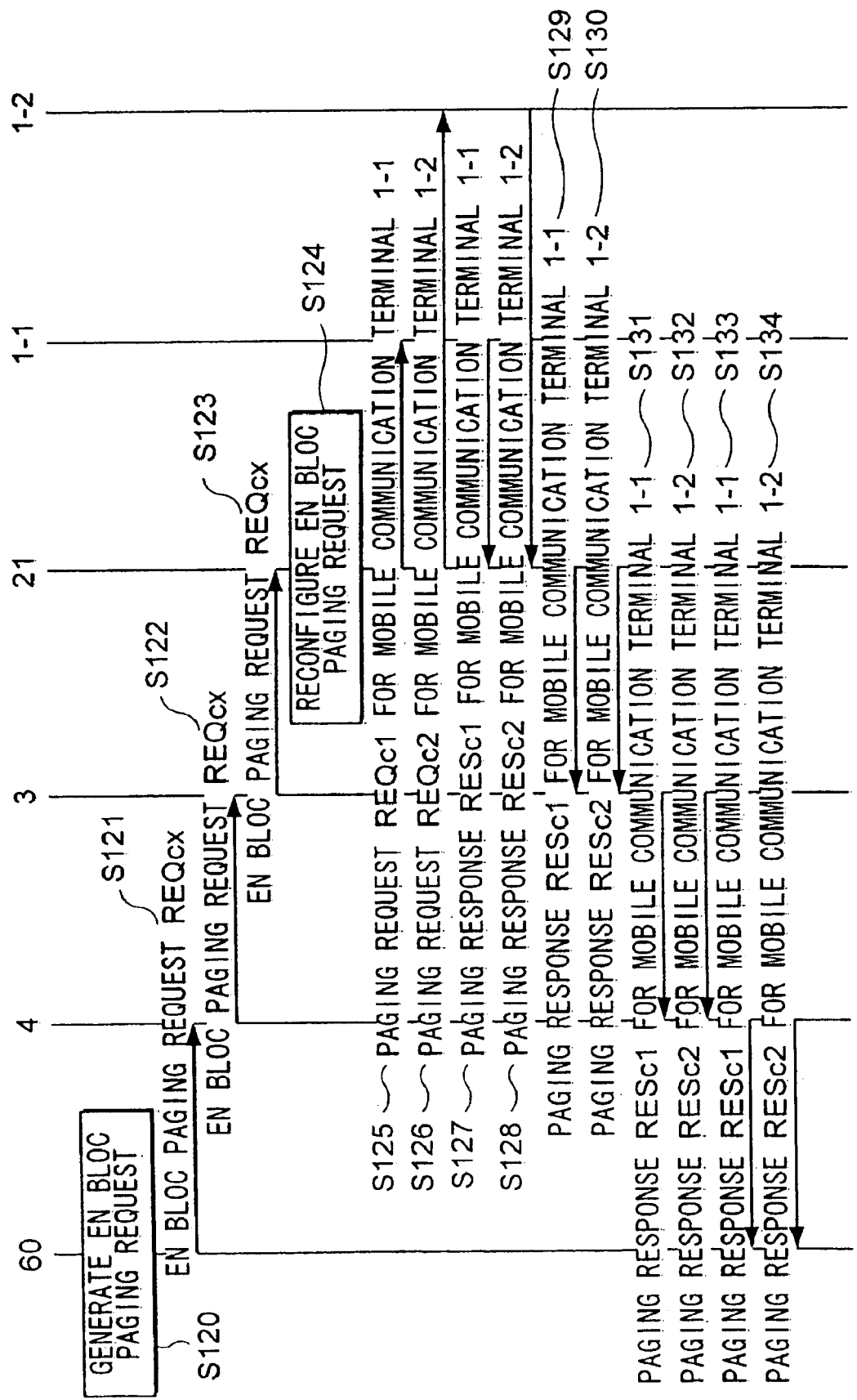
FIG. 27 is a sequence diagram illustrating the operation relating to en bloc paging requests and paging requests in the system.

FIG. 27 is a sequence diagram illustrating the operation of the mobile communication system relating to en bloc paging requests and paging responses. In this example, let us assume that a termination request REQt1 to the mobile communication terminal 1-1 and a termination request REQt2 to the mobile communication terminal 1-2 have occurred within a predetermined time, and that the mobile communication terminals 1-1 and 1-2 are subordinate to the same relay device 21.

Figures 28, 29, 30:
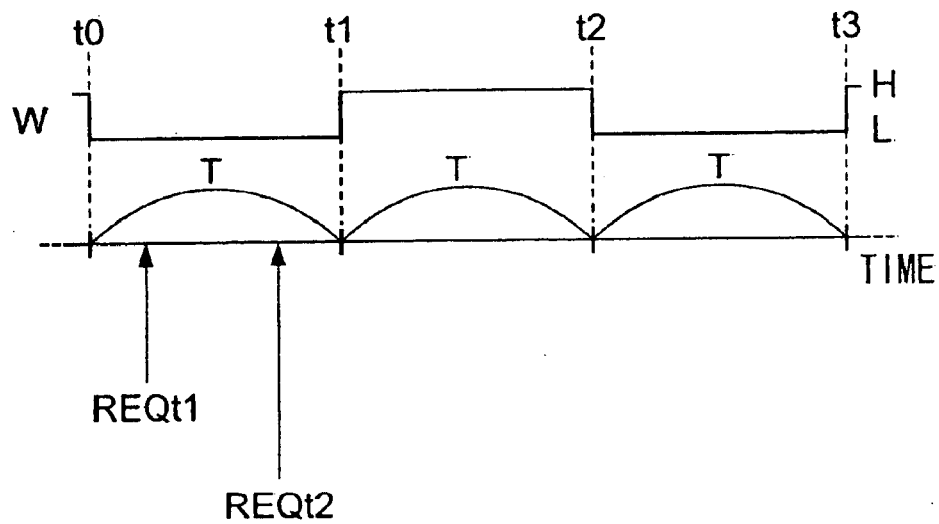
FIG. 28 is a diagram explaining an example of operation of a control device relating to generating of en bloc paging requests in the system.
FIG. 29 is a diagram illustrating the contents of en bloc paging requests in the system.
FIG. 30 is a diagram illustrating the contents of paging requests in the system.

Upon the termination requests REQt1 and REQt2 occurring, the location information managing device 60 generates an en bloc paging request REQcx (step S120). For example, as shown in FIG. 28, in the event that the termination requests REQt1 and REQt2 occur within the period from time t0 to time t1, and these are supplied to the control device 611 of the location information managing device 60, the control device 611 stores the termination requests REQt1 and REQt2 in the buffer 613. In the period from time t0 to time t1, the cycle signal W is at the low level, so the termination requests REQt1 and REQt2 are written to the storage area B of the buffer 613. Upon reaching the time t1, the control device 611 reads out the termination requests REQt1 and REQt2 from the storage area B.

Then, the second location table TBL2 is searched with the terminal identification number IDm1 indicated by the termination request REQt1, thereby obtaining the moving unit terminal identification number IDt. Next, the second location table TBL2 is searched with the terminal identification number IDm2 indicated by the termination request REQt2 as a key, thereby obtaining the moving unit terminal identification number IDt. In this case, the termination request REQt1 corresponds to the mobile communication terminal 1-1, while the termination request REQt2 corresponds to the mobile communication terminal 1-2, so in the event that the stored contents of the second location table TBL2 are those shown in FIG. 22, the results of the searches indicate the same moving unit identification number IDt "A01234".

Accordingly, the control device 611 recognizes that the mobile communication terminals 1-1 and 1-2 are subordinate to the same relay device 21, and make these the object of an en bloc paging request REQcx. Next, the control device 611 searches the first location table TBL1 with the moving unit identification number IDt "A01234" as a key, and the location registration area information "5A" is obtained. Subsequently, the control device 611 searches the database, and obtains the identification number IDk of the switch 4 corresponding to the location registration area information "5A" and the identification number IDb of the base station group, and generates an en bloc paging request REQcx. The en bloc paging request REQcx in this example is that shown in FIG. 29.

The en bloc paging request REQcx thus generated is, as shown in FIG. 27, sent by the route of the location information managing device 60→switch 4→base station 3→relay device 21 (step S121 through S123). Subsequently, at the relay device 21, the en bloc paging request REQcx is reconfigured, and an paging request REQC1 to the mobile communication terminal 1-1 and an paging request REQc2 to the mobile communication terminal 1-2 are generated (step S124). As shown in FIG. 30, the paging request REQc1 in this example contains the moving unit identification number IDt "A01234" and the terminal identification number IDm1 "X00001" of the mobile communication terminal 1-1, while the paging request REQc2 contains the moving unit identification number IDt "A01234" and the terminal identification number IDm2 "X00002" of the mobile communication terminal 1-2.

Next, upon the paging requests REQc1 and REQc2 being transmitted to the mobile communication terminals 1-1 and 1-2 (steps S125 and S126), the mobile communication terminals 1-1 and 1-2 generate paging responses RESc1 and RESc2. The paging responses RESc1 and RESc2 are then sent by the route of the relay device 21→base station 3→switch 4→location information managing device 60 (step S127 through S134). That is, in this example, the paging responses RESc1 and RESc2 are returned via the relay device 21. As described above, the relay device 21 performs communication with the mobile communication terminals 1-1 and 1-2 within the moving unit 2. Accordingly, the mobile communication terminals 1-1 and 1-2 transmit the paging responses RESc1 and RESc2 to the relay device 21 using a smaller transmission power than when performing communication with the base station 3.

Subsequently, the location information managing device 60 performs verification processing of the mobile communication terminals 1-1 and 1-2, and upon the validity thereof being verified, notifies the switch 4 regarding which base station 3 the mobile communication terminals 1-1 and 1-2 are contained in, and communication is established at the switch 4.

As described above, according to the seventh embodiment, in the event that there are terminations at plural mobile communication terminals belonging under the relay device 21 within a predetermined time, an en bloc paging request REQcx consolidating plural paging requests REQc is used for paging processing, so the number of times of transmission of the paging request and the amount of signals can be reduced from the perspective of the mobile communication network NET. For example, in the event that there are terminations at an n number of mobile communication terminals 1 within a predetermined time, the number of transmissions can be reduced to 1/n.

Consequently, the wireless channels and resources of the mobile communication network NET can be used effectively, and communication traffic can be markedly reduced.

<7-3: Modification of Seventh Embodiment>
<7-3-1: Modification 1>

In the above-described seventh embodiment, the mobile communication terminals 1-1 and 1-2 return the paging responses RESc1 and RESc2 via the relay device 21, but an arrangement may be made wherein the mobile communication terminals 1-1 and 1-2 return the paging responses RESc1 and RESc2 to the base station 3 directly.

Figure 31:
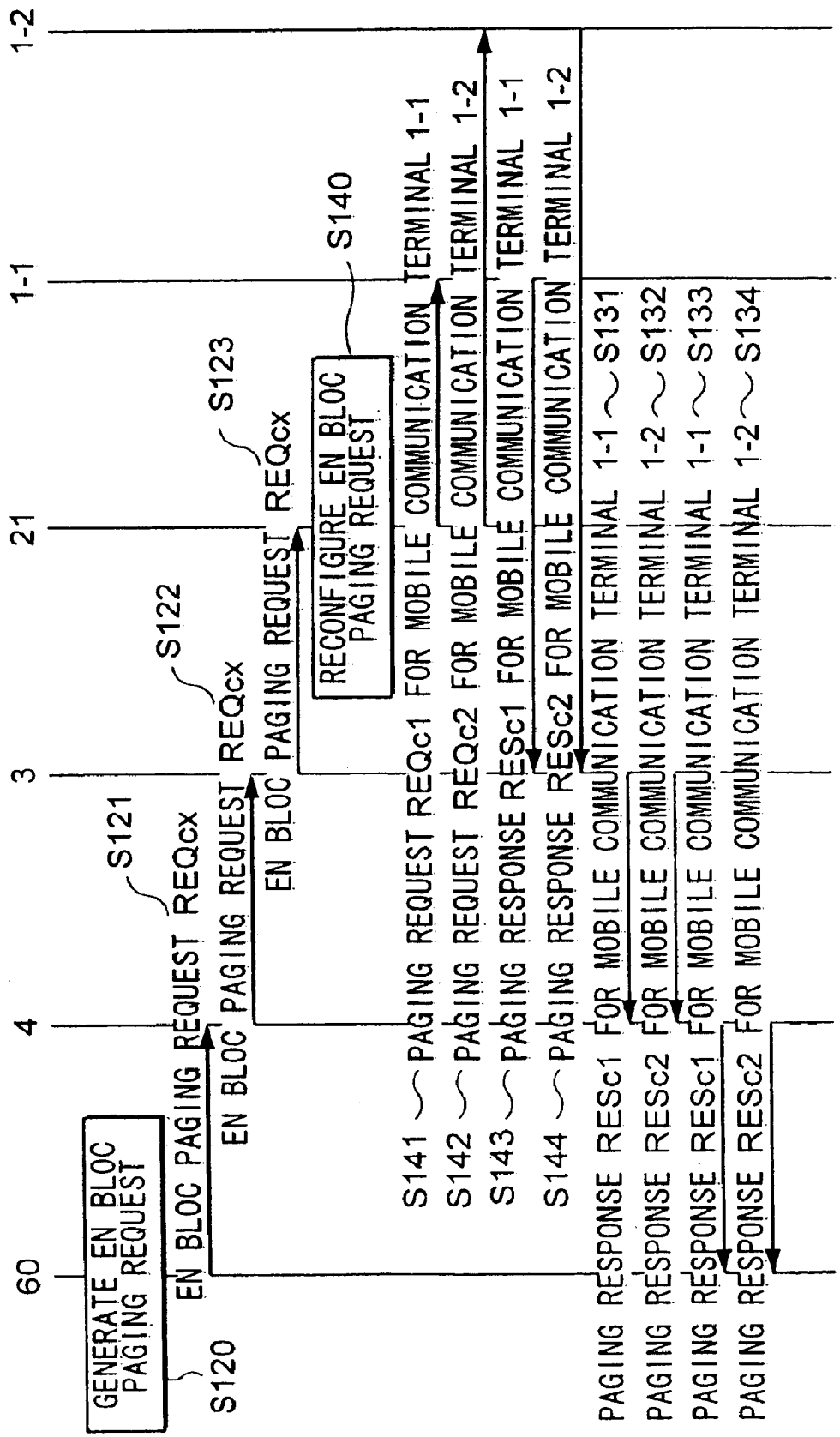
FIG. 31 is a sequence diagram illustrating the operations relating to en bloc paging requests and paging responses in a Modification 1 of the system.

FIG. 31 is a sequence diagram illustrating the operation of a mobile communication system relating to the en bloc paging request REQcx and paging responses RESc according to the modification 1. The processing wherein the en bloc paging request REQcx is generated at the location information managing device 60 and then transmitted to the relay device 21 (steps S120 through S123), and the processing for transferring the paging responses RESc1 and RESc2 from the base station 3 to the location information managing device 60 (steps 131 through S134) are the same as the processing of the seventh embodiment shown in FIG. 7, so description thereof will be omitted.

Figure 32:
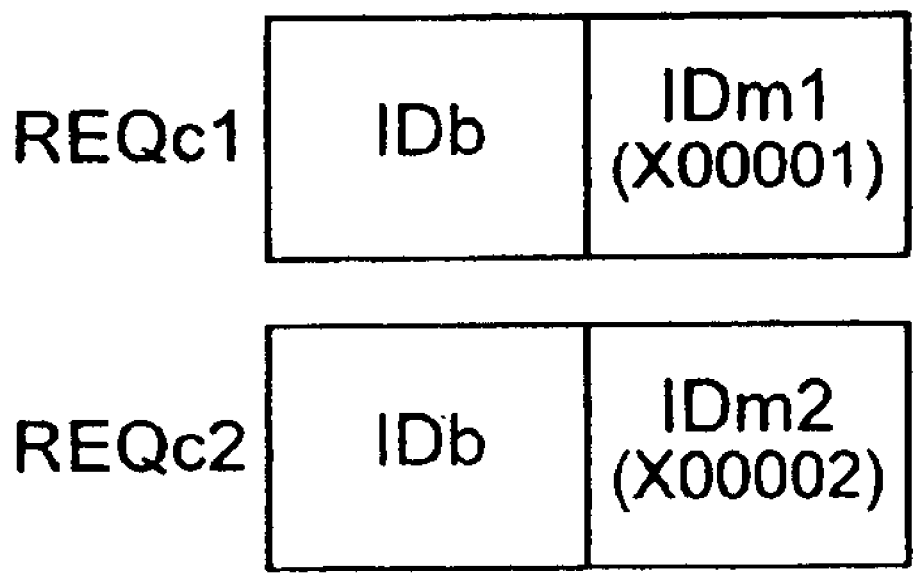
FIG. 32 is a diagram illustrating the contents of paging requests in the Modification 1.

In the modification 1, upon the relay device 21 receiving the en bloc paging request REQcx, the relay device 21 combines the identification number IDb of the base station 3 contained in the en bloc paging request REQcx and the terminal identification numbers IDm1 and IDm2 of the mobile communication terminals 1-1 and 1-2, thereby generating the paging requests REQc1 and REQc2 (Steps S140 and S142). In this case, the paging requests REQc1 and REQc2 output from the relay device 21 are such as shown in FIG. 32.

Accordingly, the mobile communication terminals 1-1 and 1-2 can know the identification number IDb of the base station 3 in which they are contained, so as to generate paging responses RESc1 and RESc2 containing the identification number IDb and the terminal identification numbers IDm1 and IDm2, which are returned to the base station 3 (steps S143 and S144).

According to this modification 1, the mobile communication terminals 1-1 and 1-2 receive paging requests REQc1 and REQc2 via the relay device 21, but transmit the paging responses RESc1 and RESc2 to the base station 3, so there is no need to perform control for weakening the transmission power. In other words, conventional mobile communication terminals 1 can be used.

<7-3-2: Modification 2>

In the above-described seventh embodiment, the relay device 21 returns the paging responses RESc1 and RESc2, but an arrangement may be made wherein the relay device 21 consolidates these to generate an en bloc paging response REScx, which is returned.

In this example, the signal processing unit 217 of the relay device 21 comprises a storing unit for storing the paging responses RESc transmitted from the mobile terminals, a timer unit for measuring predetermined time, and a control unit for controlling the storing unit and the timer unit.

Figure 33:
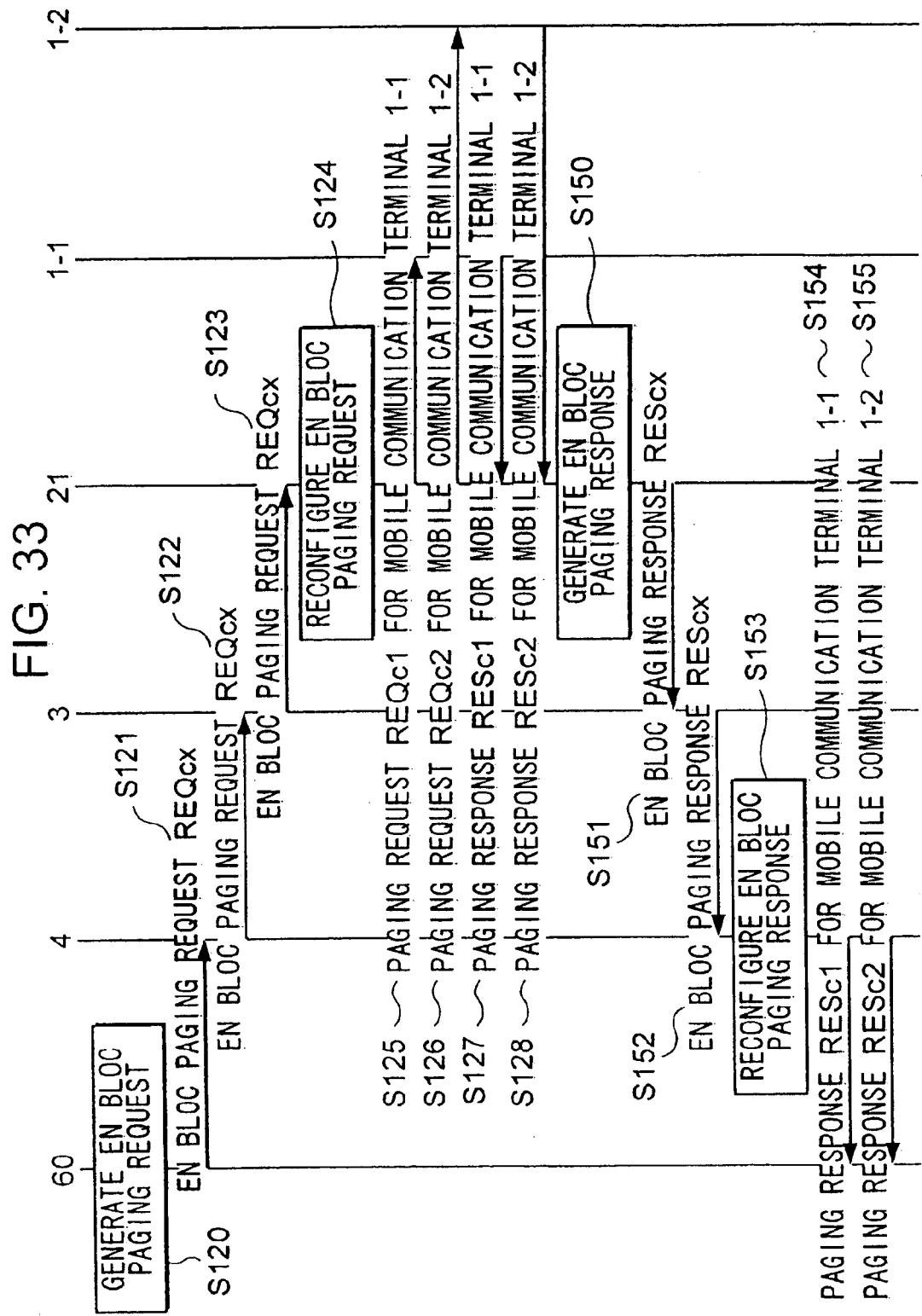
FIG. 33 is a sequence diagram illustrating the operations relating to en bloc paging requests and paging responses in a Modification 2 of the system.

FIG. 33 is a sequence diagram indicating the operations of the mobile communication system relating to the en bloc paging request and en bloc paging response according to the modification 2. The processing from the en bloc paging request REQcx being generated at the location information managing device 60 through the processing of the mobile communication terminals 1-1 and 1-2 returning the paging responses RESc1 and RESc2 (steps S120 through S128) is the same as the processing of the seventh embodiment shown in FIG. 27, so description thereof will be omitted.

In the modification 2, upon the relay device 21 receiving the paging responses RESc1 and RESc2, the relay device 21 generates an en bloc paging response REScx based on the identification numbers IDm1 and IDm2 contained in the paging responses RESc1 and RESc2 (step S150). Specifically, the control unit of the signal processing unit 217 stores the paging responses RESc in the storing unit, reads out the paging responses RESc from the storing unit every predetermined time measured by the timer unit, and temporarily erases the stored contents of the storing unit. Then, the control unit generates an en bloc paging response REScx, based on the terminal identification numbers IDm contained in the paging responses RESc and the moving unit identification number IDt that has been read out. The en bloc paging response REScx in this example contains the moving unit identification number IDt and the terminal identification numbers IDm1 and IDm2 of the mobile communication terminals 1-1 and 1-2.

Subsequently, upon the relay device 21 transmitting an en bloc paging response REScx to the switch 4 via the base station 3 (steps S151 and S152), the switch 4 reconfigures the en bloc paging response REScx (step S153), generates the paging responses RESc1 and RESc2, and transmits these to the location information managing device 60 (steps S154 and S155).

According to this modification 2, an en bloc paging response REScx consolidating plural paging responses RESc is used, so the number of times of transmission and the amount of signals can be reduced. In addition, the en bloc paging response REScx is converted into plural paging responses RESc at the switch 4, so the location information managing device 60 only needs to handle normal paging responses RESc.

<8. Eighth Embodiment>

With the mobile communication system according to the seventh embodiment, a subordinate relation is formed between the relay device 21 and the mobile communication terminals 1 contained in the moving unit 2. Considering the subordination relation as a parent-child relation, the relay device 21 is equivalent to a parent for bringing a mobile communication terminal 1 into subordination, and the mobile communication terminal 1 is equivalent to a child which is subordinate to the relay device 21. Here, becoming a parent was restricted to the relay device 21. Conversely, with the mobile communication system according to the eighth embodiment, each mobile communication terminal 1 may become either a parent or a child, and freely structure subordination relations.

<8-1: Overview of the Mobile Communication System>

Figure 34:
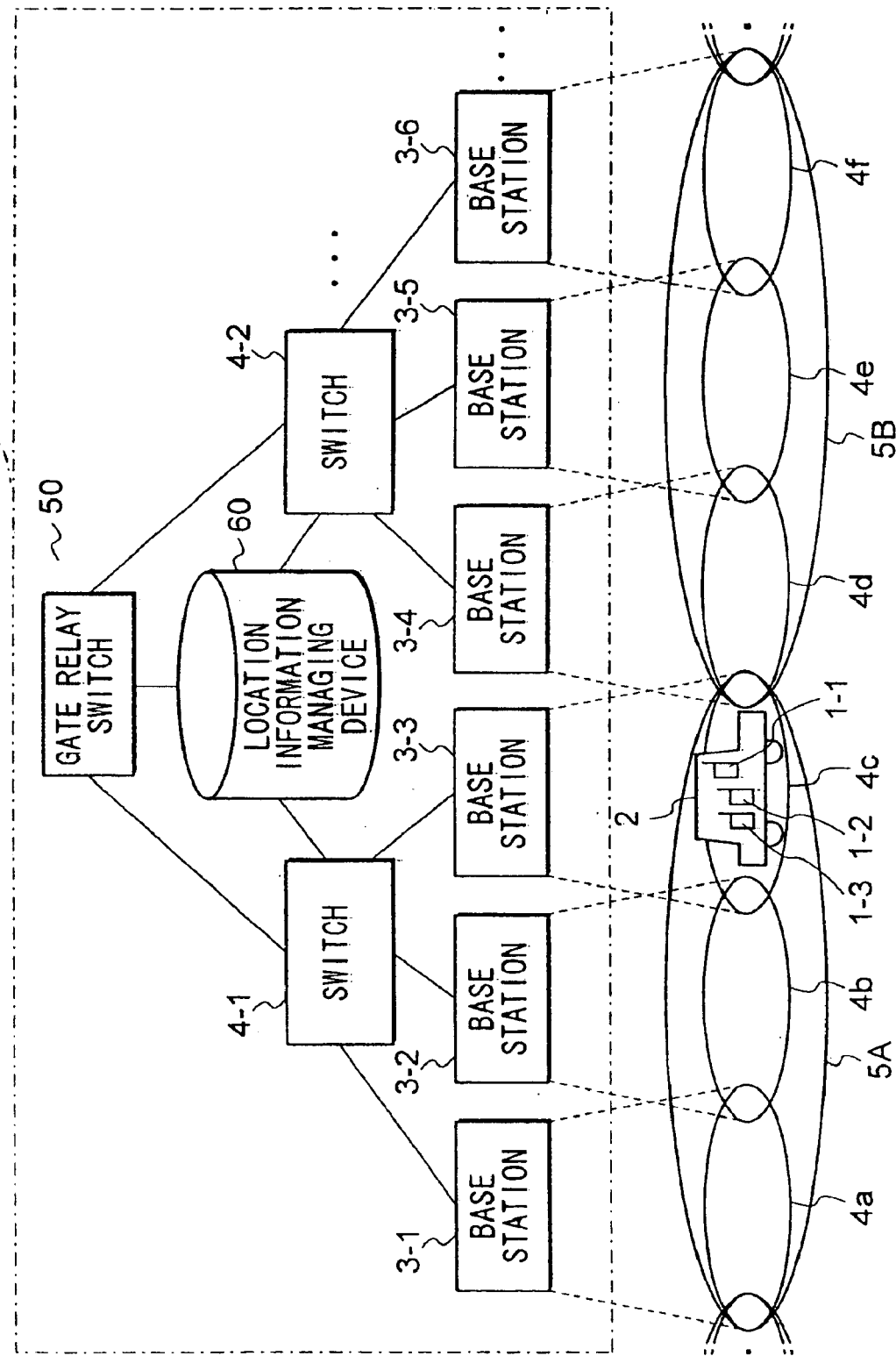
FIG. 34 is a block diagram illustrating the overall configuration of a mobile communication system according to an eighth embodiment of the present invention.

FIG. 34 is a block diagram illustrating the configuration of the mobile communication system according to the eighth embodiment. With this example, an automobile is assumed as the moving unit 2. Also, the moving unit 2 contains mobile communication terminals 1-1, 1-2, and 1-3. Further, these mobile communication terminals 1-1 are grouped, so that of these, the mobile communication terminal 1-1 represents the mobile communication terminals 1-2 and 1-3 and receives en bloc response requests REQcx and also generates plural response requests REQc based on the en bloc response request REQcx. That is to say, the mobile communication terminal 1-1 also functions as the above-described relay device 21, in addition to functioning as a communication terminal. In the following description, a mobile communication terminal functioning as a relay device 21 will be referred to as a representative mobile communication terminal, and the terminal identification number IDm of the representative mobile communication terminal as a representative terminal identification number IDm'.

<8-2: First and Second Location Tables>

Figure 35:
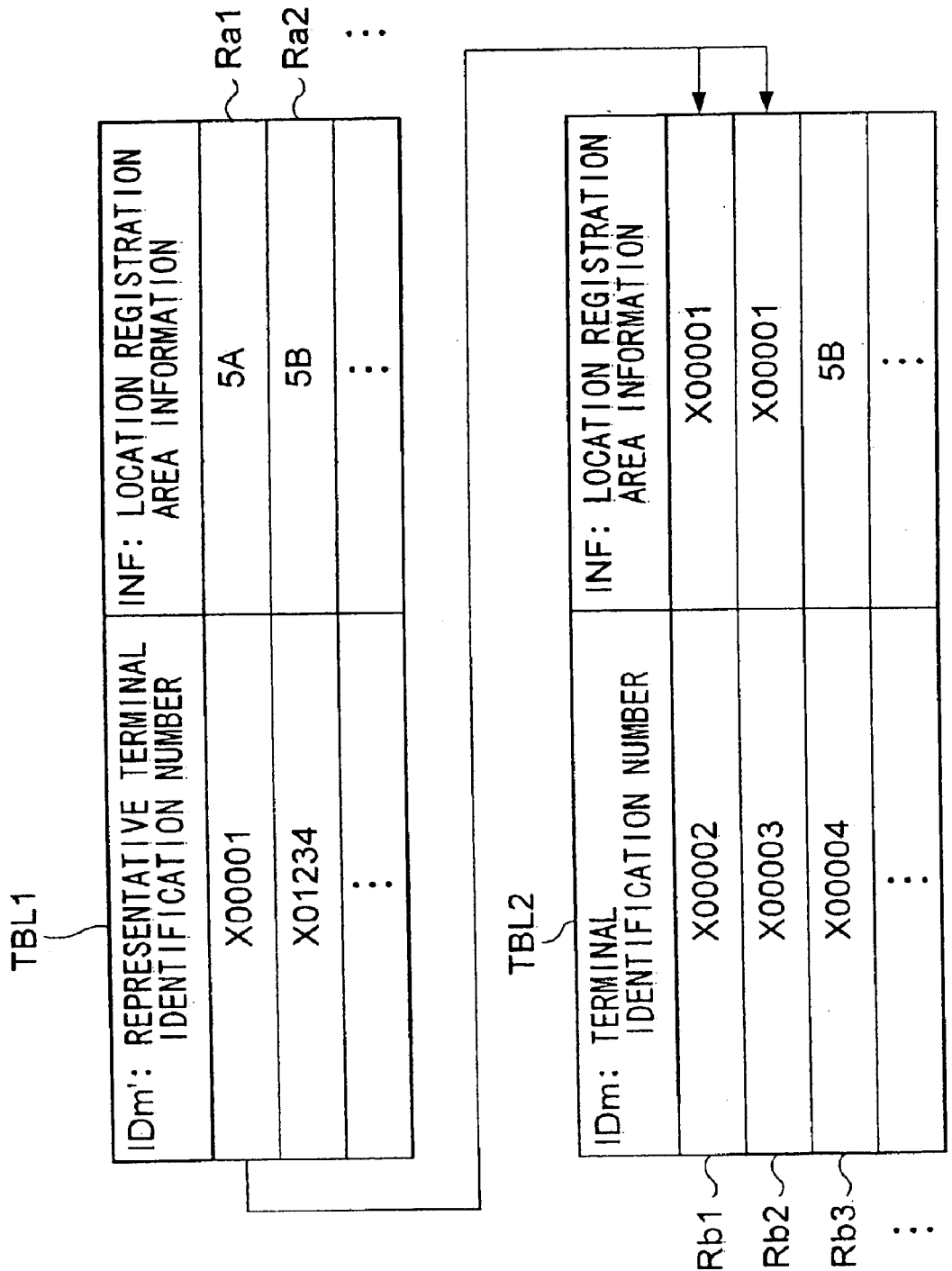
FIG. 35 is a diagram illustrating the stored contents of first and second location tables in the system.

FIG. 35 is a diagram illustrating the stored contents of the first and second location tables TBL1 and TBL2 according to the eighth embodiment. In this example, the representative terminal identification number IDm' of the representative mobile communication terminal 1-1 is "X00001", the terminal identification number IDm of the mobile communication terminal 1-2 is "X00002", and the terminal identification number IDm of the mobile communication terminal 1-3 is "X00003".

First, the first location table TBL1 stores the representative terminal identification number IDm' and the location registration area information of the corresponding representative mobile communication terminal, in a correlated manner. Next, the second location table TBL2 stores the terminal identification numbers IDm and the location registration area information, in a correlated manner. Note, however, that in the event that a mobile communication terminal 1 is subordinate to the representative mobile communication terminal, the representative terminal identification number IDm' is stored instead of the location registration area information.

In this example, the moving unit 2 belongs to the location registration area 5A, so the representative terminal identification number IDm' "X00001" and the location registration area "5A" are stored in the record Ra1 of the first location table TBL1. On the other hand, the terminal identification number IDm "X00002" and the representative terminal identification number IDm' "X00001" are stored in the record Rb1 of the second location table TBL2, and is the terminal identification number IDm "X00003" and the representative terminal identification number IDm' "X00001" are stored in the record Rb2. The record Ra1 of the first location table TBL1 and the records Rb1 and Rb2 of the second location table TBL2 are correlated with the representative terminal identification number IDm' "X00001" as a key.

That is to say, the first and second location tables TBL1 and TBL2 according to the eighth embodiment are the same as the first and second location tables TBL1 and TBL2 except for the point that the representative terminal identification number is stored instead of the moving unit identification number IDt.

However, in the event of grouping plural mobile communication terminals around the representative mobile communication terminal, there is the need to register the subordination relation in the first and second location tables TBL1 and TBL2. There are various ways of registering. A first method is to automatically form a group following predetermined rules, the representative mobile communication terminal generating a hierarchy registration request containing the representative terminal identification number IDm' and the terminal identification numbers IDm of the subordinate mobile communication terminals, and transmitting this to the location information managing device 60 via the base station 3 and switch station 4. Also, a second method is for the users to discuss one with another, transmit a message indicating that a certain mobile communication terminal is to serve as the representative mobile communication terminal from that mobile communication terminal, transmit from a mobile communication terminal subordinate thereto a set of the representative IDm' (phone number) of the representative mobile communication terminal and the terminal identification number IDm of the mobile communication terminal, and register this with the location information managing device 60.

On the other hand, in the event of releasing the subordination relation, a release request can be transmitted to the location information managing device 60 using the same method, updating the stored contents of the first location table TBL1 and the second location table TBL2.

<8-3: En Bloc Paging Request>

Next, the control device 611 of the location information managing device 60 generates an en bloc paging request REQcx in the same manner as with the seventh embodiment. In this case, the control device 611 uses the representative terminal identification number IDm' instead of the moving unit identification number IDt to generate the en bloc paging request REQcx. That is, the en bloc paging request REQcx according to the eighth embodiment has the moving unit identification number IDt making up the en bloc paging request REQcx shown in FIG. 23 replaced with the representative terminal identification number IDm'.

In the above configuration, the operations of the mobile communication system regarding the en bloc paging request REQcx and paging responses REQc are the same as the sequences shown in FIG. 27, FIG. 31, and FIG. 33, described with the seventh embodiment, with the relay device 21 replaced with the representative mobile communication terminal 1-1. Accordingly, even in cases of using a certain mobile communication terminal 1 as a representative mobile communication terminal, so the number of times of transmission and the amount of signals relating to paging requests REQC can be reduced as with the seventh embodiment, so traffic can be reduced.

<9. Ninth Embodiment>

<9-1: Configuration of the Ninth Embodiment>

The overall configuration of the mobile communication system according to the ninth embodiment of the present invention is basically the same as the overall configuration of the mobile communication system according to the seventh embodiment shown in FIG. 20. The configuration of the moving unit 2 in the mobile communication system according to the present embodiment is also of the same configuration as that of the seventh embodiment.

The location information managing device 60 in the mobile communication system according to the present embodiment comprise a first location table TBL1 and second location table TBL2, as with the seventh embodiment. The configurations of the first location table TBL1 and second location table TBL2 are the same as with the seventh embodiment.

As with a normal mobile communication system, in the event that there is a termination request bound for a moving unit terminal existing in the range of a certain base station 3, the termination request is sent to a switch 4 connected to the base station 3. The termination requests bound for the moving unit terminals in the range of the base stations under the switch 4 are sent to this switch. These termination requests contain a moving unit terminal identification number for determining the moving unit terminal as the destination thereof. Upon receiving such as termination request, the switch 4 sends an inquiry regarding the location of the moving unit terminal which is the destination of the termination request to the location information managing device 60. This inquiry contains the moving unit terminal identification number of the moving unit terminal which is to be located.

Upon receiving an inquiry containing the terminal identification number IDm, the location information managing device 60 searches the second location table TBL2 with the terminal identification number contained in the received inquiry as a key, thereby obtaining a moving unit identification number IDt or location registration area information. In the event that a moving unit terminal identification number IDt is obtained, the first location table TBL1 is then searched with the obtained moving unit terminal identification number IDt as a key, thereby obtaining location registration area information. The location information managing device 60 returns the received terminal identification number IDm, the obtained moving unit terminal identification number IDt (only in the event that this has been obtained as the result of a search), and the location registration area information, to the switch 4 which has placed the inquiry.

The switch 4 in the mobile communication system according to the present embodiment comprises an paging request generating device 610 for generating en bloc paging requests based on the information being returned in such a manner. The paging request generating device 610 comprises a control device 611, a timer circuit 612, and a buffer 613. The configuration of the components is the same as that described with the seventh embodiment.

<9-2: Operations of the Ninth Embodiment>
<9-2-1: Hierarchical Location Registration>

The operations of en bloc location registration in the mobile communication system according to the present embodiment are the same as those of the hierarchical location registration of the seventh embodiment shown in FIG. 26.

<9-2-2: En Bloc Paging Request and Paging Response>

The operations of the paging request generating device 610 of the switch in the mobile communication system according to the present embodiment are as described next. Here, let us say that the switch 4-1 receives a termination request REQt1 to the mobile communication terminal 1-1 and a termination request REQt2 to the mobile communication terminal 1-2 within a predetermined time, and at the time that the switch 4-1 transmits an en bloc paging request REQcx and at the time that the mobile communication terminals 1-1 and 1-2 transmit paging request responses RESc1 and RESc2, the mobile communication terminals 1-1 and 1-2 are subordinate to the relay device 21 in the same moving unit 2 within the base station area 4c.

Upon receiving the termination request REQt1 and the termination request REQt2, the paging request generating device 610 in the switch 4-1 stores the termination requests REQt in the buffer 613. After a predetermined amount of time elapses, the en bloc paging request generating device 610 sends an inquiry containing the terminal identification number IDm1 which the termination request REQt1 indicates, to the location information managing device 60, thereby obtaining the moving unit identification number IDt and the location registration area information. Next, the paging request generating device 610 sends an inquiry containing the terminal identification number IDm2 which the termination request REQt2 indicates, to the location information managing device 60, thereby obtaining the moving unit identification number IDt and the location registration area information.

Assuming that the stored contents of the first location table TBL1 and the second location table TBL2 are those shown in FIG. 22, the first and second searches obtain the same moving unit identification number IDt "A01234" and the same location registration area information "5A".

Thus, the paging request generating device 610 recognizes that the mobile communication terminals 1-1 and 1-2 are subordinate to the relay device 21 having the same moving unit identification number IDt "A01234", and makes these the object of an en bloc paging request REQcx.

Next, the paging request generating device 610 searches the database, obtains the identification number IDb of the base station 3 group corresponding to the location registration area information "5A", and generates an en bloc paging request REQcx. The en bloc paging request REQcx output in this example contains the identification number IDk of the switch 4, the identification number IDb of the base station group, the moving unit identification number IDt, and the terminal identification numbers IDm1 and IDm2.

The en bloc paging request REQcx thus generated is transmitted from the paging request generating device 610 of the switch 4-1 to the base stations 3 (3-1, 3-2, 3-3) which the switch 4-1 governs. Next, the base stations 3 (3-1, 3-2, 3-3) transmit the en bloc paging request REQcx within the respective base station areas (4a, 4b, 4c). In the case of this example, the relay device 21 of the moving unit 2 located in the base station area 4c receives the en bloc paging request REQcx transmitted by the base station 3-3.

Subsequently, the relay device 21 restructures the en bloc paging request REQcx, and generates an paging request REQc1 to the mobile communication terminal 1-1 and an paging request REQc2 to the mobile communication terminal 1-2.

Next, upon the paging requests REQc1 and REQc2 being transmitted to the mobile communication terminals 1-1 and 1-2, the mobile communication terminals 1-1 and 1-2 generate paging responses RESc1 and RESc2. Then, the paging responses RESc1 and RESc2 are sent in the order of relay device 21→base station 3-3→switch 4-1→paging request generating device 610. That is, in this example, the paging responses RESc1 and RESc2 are returned via the relay device 21.

Upon receiving the paging request responses corresponding to the paging requests stored in the buffer 613, the paging request generating device 610 deletes the corresponding paging requests from the buffer 613.

<9-3: Modification of Ninth Embodiment>

In the above-described ninth embodiment, the paging request generating device 610 is installed in the switch 4, but an arrangement may be made wherein the paging request generating device 610 is installed in the base station 3.

Generating paging requests with the present modification differs from the above ninth embodiment only in that the paging request generating device 610 transmits inquiry information to the location information managing device 60 via the switch 4, and receives responses to the inquiries via the switch 4.

<10. Modifications>

The first through ninth embodiments have been described above, but the present invention is not restricted to these, and the various modifications described below may be made, for example.

(1) The present invention is not restricted to the mobile communication system shown in FIG. 1, FIG. 20, and FIG. 34, and is applicable to mobile communication networks of other forms. For example, this is applicable to a mobile communication system which is managed in an autonomous scattered manner with plural nodes (including switches), instead of centrally managing location information with the location information managing device 60.

(2) Also, though with the above-described first embodiment, the automatic detection of the moving unit 2 is enabled due to advertisement from the relay device 21 of the moving unit 2, but the mobile communication terminal 1 may be configured such that, in the event that the user has recognized the moving unit 2, the user can manually perform registration/cancellation of hierarchical location registration.

(3) Also, though with the above-described second embodiment, the highest-order mobile communication terminal 1 registers the lower order terminal managing table 731 with the location information managing device 60, it is needless to say that the mobile communication terminals 1 may each register the lower order terminal managing table 731 with the location information managing device 60.

(4) Though with the above-described third embodiment, a hierarchical location registration release is constantly transmitted from the mobile communication terminal 1-1 to the location information managing device 60 in the hierarchical location registration releasing procedures, in the event that updating of the location registration area information at the mobile communication terminal 1-1 managed by the location information managing device 60 is unnecessary and the location of the moving unit 2 can be determined by the base station 3-4 and the switch 4-2, the hierarchical location registration release request may be transmitted from such a node to the moving unit 2 to release the subordination relation.

(5) Though with the hierarchical location registration releasing procedures in the above-described first embodiment, hierarchical location registration releasing is performed from the mobile communication terminals 1 to the location information managing device 60, an arrangement may be made which is the same as the hierarchical location registration releasing procedures according to the third embodiment, wherein the reception level of the moving unit advertisement information is monitored at the mobile communication terminal 1, and the hierarchical location registration releasing procedures are performed as to the moving unit 2 in the event that the reception level is at or lower than the threshold value, thereby aggregating the hierarchical location registration releases of plural mobile communication terminals 1 at the moving unit 2, and transmitting these to the location information managing device 60.

(6) Though with the above-described first and fourth embodiments, the hierarchical relation is managed by both the mobile communication network NET and the relay device 21, the present invention is not restricted to this, and may be made to manage the hierarchical relations with the mobile communication network NET alone.

In this case, the procedures for registering the hierarchical relations to the mobile communication network NET (location information managing device 60) may be the same as the procedures for hierarchical location registration described with the first embodiment, or may be arranged such that the relay device 21 functions as a simple relay device for airwaves and the mobile communication terminals 1 each transmit and register their own terminal identification numbers individually to the mobile communication network NET via the relay device. Also, with regard to releasing of hierarchy registration as well, the relay device 21 may be made to function as a simple relay device for airwaves, such that the mobile communication terminals 1 transmit their terminal identification numbers individually to the mobile communication network NET, thereby releasing the hierarchical relation. Or, an arrangement may be made wherein the mobile communication terminals 1 directly transmit hierarchical release requests to the mobile communication network NET.

Further, updating of the location registration area information following the mobile communication terminal 1 belonging to a certain moving unit (relay device 21) may be performed in the same manner as with the first or fourth embodiments.

(7) Though with the above-described second and fifth embodiments, a parent mobile communication terminal 1 uses a lower order terminal managing table 731 to manage all mobile communication terminals 1 belonging to a lower-order hierarchical level, the present invention is not restricted to this, and an arrangement may be made wherein the parent mobile communication terminal 1 stores the terminal identification number of the child mobile communication terminal 1 and manages the parent-child relation, but does not store the terminal identification number of the grandchild mobile communication terminal 1. In this case, the mobile communication terminal 1 serving as a child may notify the terminal identification number to the mobile communication terminal serving as the parent, with the mobile communication terminal 1 serving as the parent storing the received terminal identification number in the storing unit.

(8) Also, though with the above-described second and fifth embodiments, the hierarchical relation is managed by both the mobile communication network NET and the relay device 21, the present invention is not restricted to this, and the hierarchical relation may be managed by the mobile communication terminal 1 alone. In this case, the parent mobile communication terminal 1 manages only the parent-child relation by receiving the notification of the terminal identification number from the child mobile communication terminal 1 and storing it. Or, the parent mobile communication terminal 1 may manage all mobile communication terminals 1 belonging to lower-order hierarchical levels using the lower order terminal managing table 731.

Also, releasing of the hierarchical relation may be made by mobile communication terminal 1 serving as the child notifying the mobile communication terminal 1 serving as a parent with a hierarchy release request containing its own terminal identification number, so that the mobile communication terminal 1 serving as the parent deletes the terminal identification number of the child from the storing unit. Or, the hierarchical relation may be released by the following procedures. First, the mobile communication terminal 1 transmits a hierarchy release request containing its own terminal identification number and the terminal identification number of the parent to the mobile communication network NET. Next, upon receiving the hierarchy release request, the location information managing device 60 determines the location registration area of the parent terminal based on the terminal identification number of the parent contained therein, and transmits the hierarchy release request to this location registration area. Next, upon receiving the hierarchy release request, the parent mobile communication terminal 1 deletes the terminal identification number of the child form the storing unit thereof.

Now, the hierarchical relation is not registered with the mobile communication network NET even after the hierarchical relation is registered with the parent mobile communication terminal 1, so there is the need to update the location registration area information regarding all mobile communication terminals 1. However, the parent mobile communication terminal 1 aggregates the location registration requests of the child mobile communication terminal 1 and the parent mobile communication terminal 1, and transmits an en bloc location registration request to the mobile communication network NET. This en bloc location registration request contains the location registration area information, the terminal identification number of the parent, and the terminal identification number of the child.

(9) Though description has been made regarding a two-level hierarchical structure between a relay device 21 and mobile communication terminal 1 in the above-described seventh embodiment, or between a representative mobile communication terminal and a mobile communication terminal 1 in the eighth embodiment, the present invention is not restricted to this, and may be applied to mobile communication terminals having a three-level or higher hierarchical structure.

In this case, a location table matching the number of hierarchical levels is prepared at the location information managing device 60. For example, in order to have an n-level hierarchical structure, first through n'th location table may be used and the tables may be linked.

(10) Also, with the mobile communication system according to the above-described seventh through ninth embodiments, in the event that there is no paging response RESc from a subordinate mobile communication terminal 1 in response to an paging request REQc from the relay device 21 or representative mobile communication terminal, the paging request REQc may be re-sent between the relay device 21 or representative mobile communication terminal and the subordinate mobile communication terminal 1. Thus, once the mobile communication network NET transmits the en bloc paging request REQcx to the relay device 21 or representative mobile communication terminal, there is no need for re-sending, so the paging traffic can be reduced.

(11) Also, with the above-described mobile communication system according to the above-described seventh through ninth embodiments, the transmission power of subordinate mobile communication terminals can be set low by causing the relay device 21 or representative mobile communication terminal to relay communications even after communication has been established.

(12) Additionally, with the above-described seventh through ninth embodiments, the relay device 21 or representative mobile communication terminal reconstructs en bloc paging requests to generate the paging requests to each of the mobile communication terminals, but the present invention is not restricted to this, and it is needless to say that the relay device 21 or representative mobile communication terminal may be made to function as a simple relay device, and transmit the en bloc paging requests to the subordinate mobile communication terminals. In this case, the mobile communication terminals first each judge whether or not its own terminal identification number is contained in the en bloc paging request, and second, in the event that it is contained therein, detects that there has been an paging request, and generates an paging response, which is transmitted to the relay device 21 or representative mobile communication terminal.

(13) Further, with the above-described seventh and eighth embodiments, the identification number IDk of the switch or the identification number IDb of the base station are contained in the en bloc paging request REQcx, but the functions of the en bloc paging request REQcx are to perform paging of the moving unit 2 (relay device 21) or the mobile communication terminals 1 subordinate to the representative mobile communication terminal. Accordingly, an en bloc paging request REQcx which omits the identification number IDk of the switch or the identification number IDb of the base station may be used. For example, an arrangement may be used wherein the base stations 3 use control channels of different frequencies to transmit the en bloc paging requests REQcx to the relay device 21 or representative mobile communication terminal, with the receiving side determining the base station 3 based on the frequency of the control channel.

What is claimed is:

1. A mobile communication terminal location registration method for registering, with a mobile communication network, location registration area information indicating which location registration area mobile communication terminals belong to;

wherein plural mobile communication terminals are placed in a hierarchical subordination relation;

wherein a mobile communication terminal serving as a child notifies terminal identification numbers of mobile communication terminals at lower hierarchical levels than itself to a mobile communication terminal serving as a parent, along with own terminal identification number;

and wherein a mobile communication terminal at the highest order registers, with said mobile communication network, terminal identification numbers of mobile communication terminals at lower hierarchical levels than itself to said mobile communication network, along with own terminal identification number;

and wherein, in the event that there is a change in the location registration area, only the highest order mobile communication terminal registers the location registration area information with said mobile communication network.

2. A mobile communication terminal location registration method for registering, with a mobile communication network, location registration area information indicating which location registration area mobile communication terminals belong to;

wherein plural mobile communication terminals are placed in a hierarchical subordination relation;

wherein a mobile communication terminal serving as a child notifies a mobile communication terminal, serving as a parent, of a terminal identification number;

and wherein a mobile communication terminal serving as a parent registers, with said mobile communication network, the terminal identification number of a mobile communication terminal serving as a child, along with own terminal identification number;

and wherein, in the event that there is a change in the location registration area, said mobile communication network updates the location registration area information for only the highest order mobile communication terminal.

3. A mobile communication terminal location registration method according to claim 1, wherein said mobile communication terminal serving as a parent stores the terminal identification number of a mobile communication terminal serving as a child.

4. A mobile communication terminal location registration method for registering, with a mobile communication network, location registration area information indicating which location registration area mobile communication terminals belong to;

wherein plural mobile communication terminals are placed in a hierarchical subordination relation;

wherein a mobile communication terminal serving as a child registers, with said mobile communication network, the terminal identification number of a parent and own terminal identification number, upon receiving a terminal identification number from a mobile communication terminal serving as a parent;

and wherein, in the event that there is a change in the location registration area, said mobile communication network updates the location registration area information for only the highest order mobile communication terminal.

5. A mobile communication terminal location registration method for registering, with a mobile communication network, location registration area information indicating which location registration area mobile communication terminals belong to;

wherein plural mobile communication terminals are placed in a hierarchical subordination relation;

wherein a mobile communication terminal serving as a child notifies a mobile communication terminal, serving as a parent, of a terminal identification number;

and wherein a mobile communication terminal serving as a parent stores the terminal identification number of a mobile communication terminal serving as a child;

and wherein, in the event that there is a change in the location registration area, said mobile communication terminal serving as a parent registers the location registration area information with the mobile communication network.

6. A mobile communication terminal location registration method according to claim 1, wherein, in the event of releasing a parent-child subordination relation, the child mobile communication terminal notifies said mobile communication network of the terminal identification number of the parent mobile communication terminal and own terminal identification number;

and wherein said mobile communication network releases the parent-child subordination relation based on the terminal identification number of the child and the terminal identification number of the parent.

7. A mobile communication terminal location registration method according to claim 6, wherein the child mobile communication terminal notifies said mobile communication network of the terminal identification number of the parent and own terminal identification number via said parent mobile communication terminal.

8. A mobile communication terminal location registration method according to claim 3, wherein, in the event of releasing a parent-child subordination relation, the child mobile communication terminal notifies said parent mobile communication terminal of the terminal identification number of the parent mobile communication terminal and own terminal identification number.

and wherein said parent mobile communication terminal deletes the terminal identification number of the child mobile communication terminal.

9. A mobile communication terminal location registration method according to claim 3, wherein, in the event of releasing a parent-child subordination relation, the child mobile communication terminal notifies said mobile communication network of a release request containing the terminal identification number of the parent mobile communication terminal and own terminal identification number;

and wherein said mobile communication network notifies said release request to said parent mobile communication terminal;

and wherein said parent mobile communication terminal deletes the terminal identification number of the child mobile communication terminal.

10. An en bloc paging method for mobile communication terminals, wherein a plurality of mobile communication terminals are aggregated to form a group, and one of the mobile communication terminals belonging to said group is set as a representative mobile communication terminal, said mobile communication terminals performing communication with a mobile communication network which stores which location registration area said representative mobile communication terminal belongs to as well as the correlation between other mobile communication terminals belonging to said group and said representative mobile communication terminal;

wherein termination requests occurring within a predetermined time are stored;

and wherein, of said termination requests, those with said mobile communication terminals correlated to the same said representative mobile communication terminal as the termination destinations thereof are specified;

and wherein an en bloc paging request for specifying all of said mobile communication terminals correlating to the specified plurality of termination requests is generated;

and wherein said en bloc paging request is transmitted to the location registration area where said representative mobile communication terminal exists.

11. An en bloc paging method for mobile communication terminals according to claim 10, wherein, upon said representative mobile communication terminal receiving an en bloc paging request, said representative mobile communication terminal transmits an paging request to said mobile communication terminals specified by said en bloc paging request.

12. An en bloc paging method for mobile communication terminals according to claim 11, wherein, upon said mobile communication terminals receiving said paging request from said representative mobile communication terminal, said mobile communication terminals each transmit paging responses to said mobile communication network.

13. An en bloc paging method for mobile communication terminals according to claim 11, wherein, upon said mobile communication terminals each receiving said paging request from said representative mobile communication terminal, said mobile communication terminals each transmit said paging responses to said representative mobile communication terminal;

and wherein said representative mobile communication terminal transmits said paging responses that have been received, to said mobile communication network.

14. An en bloc paging method for mobile communication terminals according to claim 11, wherein, upon said mobile communication terminals each receiving said paging request from said representative mobile communication terminal, said mobile communication terminals each transmit paging responses to said representative mobile communication terminal;

and wherein said representative mobile communication terminal generates an en bloc paging response obtained by aggregation of said paging responses that have been received, and transmits to said mobile communication network.

15. An en bloc paging method for mobile communication terminals according to claim 13, wherein said mobile communication network comprises a plurality of base stations and a plurality of switches;

and wherein said mobile communication terminals transmit said paging responses to said representative mobile communication terminal with a smaller transmitting power as compared to the transmitting power for communicating with said base stations.

16. An en bloc paging method for mobile communication terminals according to claim 14, wherein said mobile communication network comprises a plurality of switches and a plurality of base stations;

and wherein said representative mobile communication terminal transmits said en bloc paging responses to said switches via said base stations;

and wherein said switches divide said en bloc paging response that has been received and generate said paging responses.

17. An en bloc paging method for mobile communication terminals according to claim 10, wherein said representative mobile communication terminal is a predetermined mobile communication terminal.

18. A relay device which is installed in a moving unit and which registers location registration area information indicating which location registration area that mobile communication terminals contained within said moving unit belong to, with a mobile communication network; said relay device comprising:

a transmission/reception unit for performing transmission/reception of signals with an external device;

a first storing unit which, upon said transmission/reception unit receiving, from said mobile communication terminal, a hierarchy request containing a terminal identification number for identifying said mobile communication terminal, stores said terminal identification number that has been received;

a second storing unit for storing, beforehand, a moving unit identification number for identifying said moving unit;

a third storing unit for storing location registration area information indicating a location registration area; and a control unit which, in the event of detecting a change in said location registration area upon comparing location registration area information received from said mobile communication network via said transmission/reception unit with location registration area information stored in said third storing unit, stores the received location registration area information in said third storing unit, but which, on the other hand, in the event of detecting change in first location registration area following reception of said hierarchy request, transmits a hierarchy location registration request containing said moving unit identification number, said terminal identification numbers, and said new location registration area information, to said mobile communication network, using said transmission/reception unit.

19. A relay device for performing communication with a mobile communication network wherein a plurality of mobile communication terminals are aggregated and registered as a group, and wherein in the event that there are termination requests within a predetermined time to a plurality of mobile communication terminals belonging to said group, an en bloc paging request which is a compilation of the paging requests corresponding to the termination requests is transmitted, said relay device comprising:

a reception unit for receiving said en bloc paging request;

a processing unit for dividing said en bloc paging request that has been received and generating said paging requests; and a transmitting unit for transmitting said generated paging requests to the mobile communication terminals belonging to said group.

20. A relay device according to claim 19, wherein said en bloc paging request contains each set of terminal identification information for identifying said mobile communication terminals corresponding to each said termination request;

and wherein said processing unit combines each set of terminal identification information contained in said en bloc paging request that has been received, and identification information for identifying said relay device, and generates said paging requests.

21. A relay device according to claim 20, wherein said reception unit receives the paging responses transmitted from said mobile communication terminals;

and wherein said processing unit aggregates said paging responses received in each predetermined time and generates an en bloc paging response;

and wherein said transmission unit transmits said generated en bloc paging response to said base station.

22. A relay device according to claim 19, wherein said mobile communication network comprises a plurality of switches and a plurality of base stations;

and wherein said en bloc paging request is transmitted via said base stations, and contains each set of terminal identification information for identifying said mobile communication terminals corresponding to said termination requests;

and wherein said processing unit generates said termination requests for each set of said terminal identification information contained in said en bloc paging requests received.

23. A relay device according to claim 19, which is configured of a mobile communication terminal.

24. A mobile communication terminal which, upon being contained in a moving unit to which a relay device is disposed, registers location registration area information indicating which location registration area it belongs to, with a mobile communication network, using said relay device, said mobile communication terminal comprising:

a transmission/reception unit for performing transmission/reception of signals with an external device;

an advertisement information monitoring unit for detecting whether or not said mobile communication terminal is subordinate to said relay device, based on advertisement information transmitted from said relay device using said transmission/reception unit; and a control unit for, in the event that the state of said mobile communication terminal changes from a state of non-subordination to said relay device to a state of subordination, transmitting a hierarchical registration request for registering the subordination relation to said relay device or said mobile communication network, using said transmission/reception unit.

25. A mobile communication terminal according to claim 24, wherein in the event that the state of said mobile communication terminal changes from a state of subordination to said relay device to a state of non-subordination, said control unit transmits a release request for releasing the subordination relation to said relay device or said mobile communication network, using said transmission/reception unit.

26. A mobile communication terminal according to claim 24, wherein said advertisement information contains a moving unit identification number for identifying said moving unit, said mobile communication terminal comprising:

a moving unit identification number storing unit for storing said moving unit identification number; and a terminal identification number storing unit for storing a terminal identification number for identifying said mobile communication terminal;

wherein said control unit transmits said release request containing said moving unit identification number read out from said moving unit identification number storing unit and said terminal identification number read out from said terminal identification number storing unit, using said transmission/reception unit.

27. A mobile communication terminal which performs communication with a mobile communication network, and autonomously constructs hierarchical relations with other mobile communication terminals, said mobile communication terminal comprising:

a first storing unit for storing own terminal identification number for identifying said mobile communication terminal;

an advertisement unit for performing advertisement of terminal advertisement information containing said own terminal identification number;

a hierarchy unit wherein, in the event of receiving said terminal advertisement information advertised from another mobile communication terminal, one of said mobile communication terminal and the other mobile communication terminal becomes a parent and the other becomes a child, following predetermined rules;

a second storing unit for storing a child terminal identification number for identifying the mobile communication terminal to be a child, in the event that said mobile communication terminal becomes a parent; and a third storing unit for storing a parent terminal identification number for identifying the mobile communication terminal to be a parent, in the event that said mobile communication terminal becomes a child.

28. A mobile communication terminal according to claim 27, wherein, in the event that said mobile communication terminal becomes a parent, a hierarchy registration request containing said own terminal identification number and said child terminal identification number is transmitted to said mobile communication network.

29. A mobile communication terminal according to claim 27, wherein, in the event that said mobile communication terminal becomes a child, a hierarchy registration request containing said own terminal identification number and said parent terminal identification number is transmitted to said mobile communication network.

30. A mobile communication terminal according to claim 27, wherein, in the event of releasing the hierarchical relation after said mobile communication terminal has become a child, a release request containing said own terminal identification number and said parent terminal identification number is transmitted to said mobile communication network.

31. A location information managing device which is used with a mobile communication network comprising a plurality of base stations which perform communication with mobile communication terminals and a plurality of switches which perform communication with the base stations, for performing communication with said plurality of switches and managing location registration area information indicating which location registration area said mobile communication terminals belong to, said location information managing device comprising:

a moving unit table for storing, in a correlated manner, a terminal identification number for identifying a mobile communication terminal, and a moving unit identification number corresponding to a moving unit to which mobile communication terminal having said terminal identification number belong; and a location table for storing, in a correlated manner, said terminal identification number and said moving unit identification number, and said location registration area information.

32. A location information managing device which is used with a mobile communication network comprising a plurality of base stations which perform communication with mobile communication terminals and a plurality of switches which perform communication with the base stations, for performing communication with said plurality of switches and managing location registration area information indicating which location registration area said mobile communication terminals belong to, said location information managing device comprising:

a hierarchical table for storing, in a correlated manner, a terminal identification number for identifying a mobile communication terminal to be a parent, and a terminal identification number of a mobile communication terminal to be a child; and a location table for storing, in a correlated manner, said terminal identification number and said location registration area information.

33. A location information managing device which is used with a mobile communication network comprising a plurality of base stations which perform communication with mobile communication terminals and a plurality of switches which perform communication with the base stations, for performing communication with said plurality of switches and managing location registration area information indicating which location registration area said mobile communication terminals belong to, said location information managing device comprising:

an extended location table for storing, in a correlated manner, a terminal identification number for identifying said mobile communication terminal and a moving unit identification number for identifying a moving unit, location registration area information of said mobile communication terminal, and a moving unit identification number of a moving unit to which said mobile communication terminal is subordinate.

34. A location information managing device which is used with a mobile communication network comprising a plurality of base stations which perform communication with mobile communication terminals and a plurality of switches which perform communication with the base stations, for performing communication with said plurality of switches, said location information managing device comprising:

an extended location table for storing, in a correlated manner, a terminal identification number for identifying said mobile communication terminal, location registration area information of said mobile communication terminal, and a terminal identification number of a mobile communication terminal to which said mobile communication terminal is subordinate.

35. An en bloc paging request generating device, used with a mobile communication system comprising a plurality of switches and a plurality of base stations, wherein a plurality of mobile communication terminals are aggregated to form a group, and wherein one mobile communication terminal belonging to said group is handled as a representative mobile communication terminal, said en bloc paging request generating device comprising:

a table for storing which location registration area said representative mobile communication terminal belongs to, along with storing the correlation between other mobile communication terminals belonging to said group and said representative mobile communication terminal;

a storing unit for storing termination requests; and a control unit for reading out said termination requests from said storing unit once every predetermined time, determining, of the termination requests read out, those having said mobile communication terminals correlated with same said representative mobile communication terminal as the termination destinations thereof, by making reference to said table, and generating an en bloc paging request for specifying all of said mobile communication terminals corresponding to the determined plurality of termination requests.

36. An en bloc paging request generating device according to claim 35, wherein said table contains a first table and a second table;

wherein said first table stores, in a correlated manner, representative terminal identification information for identifying said representative mobile communication terminal and location registration area information indicating the location registration area where said representative mobile communication terminal belongs;

and wherein said second table stores, in a correlated manner, each of terminal identification information for identifying the other mobile communication terminals belonging to said group and said representative terminal identification information;

and wherein said control unit reads out termination requests from said storing unit once every predetermined time, extracts each of said terminal identification information contained in said termination requests that have been read out, determines each of said representative terminal identification information by searching said second table based on each of the extracted terminal identification information, groups said terminal identification information which matches said determined representative terminal identification information, determines said location registration area information by searching said first table based on said representative terminal identification information of each group, and generates an en bloc paging request containing each of said terminal identification information grouped with regard to the location registration area indicated by said location registration area information that has been determined.

37. A switch, used with a mobile communication system wherein a plurality of mobile communication terminals are aggregated to form a group, and one of the mobile communication terminals belonging to said group receives the paging responses from other mobile communication terminals belonging to said group and generates an en bloc paging response wherein said paging responses are aggregated, and transmits said en bloc paging response to a base station;

wherein, upon receiving said en bloc paging response from said base station, said switch reconfigures said en bloc paging response into individual said paging responses, which said switch outputs.

38. A mobile communication network, comprising:

a plurality of switches;

a plurality of base stations; and an en bloc paging request generating device, used with a mobile communication system comprising a plurality of switches and a plurality of base stations, wherein a plurality of mobile communication terminals are aggregated to form a group, and wherein one of the mobile communication terminals belonging to said group is handled as a representative mobile communication terminal, said en bloc paging request generating device comprising a table for storing which location registration area said representative mobile communication terminal belongs to, along with storing the correlation between other mobile communication terminals belonging to said group and said representative mobile communication terminal, a storing unit for storing termination requests, and a control unit for reading out said termination requests from said storing unit once every predetermined time, determining, of the termination requests read out, those having said mobile communication terminals correlated with the same representative mobile communication terminal as the termination destinations thereof, by making reference to said table, and generating an en bloc paging request for specifying all of said mobile communication terminals corresponding to the determined plurality of termination requests.

39. A mobile communication system, comprising:

a plurality of base stations, and one or a plurality of switches;

a location information managing device which is used with a mobile communication network comprising a plurality of base stations which perform communication with mobile communication terminals and a plurality of switches which perform communication with the base stations, for performing communication with said plurality of switches and managing location registration area information indicating which location registration area said mobile communication terminals belong to, said location information managing device comprising a moving unit table for storing, in a correlated manner, a terminal identification number for identifying a mobile communication terminal, and a moving unit identification number corresponding to a moving unit to which mobile communication terminal having said terminal identification number belongs, and a location table for storing, in a correlated manner, said terminal identification number and said moving unit identification number, and said location registration area information:

a relay device which is installed in a moving unit and which registers location registration area information indicating which location registration area that mobile communication terminals contained within said moving unit belong to, with a mobile communication network, said relay device comprising a transmission/reception unit for performing transmission/reception of signals with an external device, a first storing unit which, upon said transmission/reception unit receiving, from said mobile communication terminals, a hierarchy request containing a terminal identification number for identifying said mobile communication terminal, stores said terminal identification number that has been received, a second storing unit for storing, beforehand, a moving unit identification number for identifying said moving unit, a third storing unit for storing location registration area information indicating a location registration area, and a control unit which, in the event of detecting a change in said location registration area upon comparing location registration area information received from said mobile communication network via said transmission/reception unit with location registration area information stored in said third storing unit, stores the received location registration area information in said third storing unit, but which, on the other hand, in the event of detecting change in said first location registration area following reception of said hierarchy request, transmits a hierarchy location registration request containing said moving unit identification number, said terminal identification numbers, and said new location registration area information, to said mobile communication network, using said transmission/reception unit; and a mobile communication terminal which, upon being contained in a moving unit to which a relay device is disposed, registers location registration area information indicating which location registration area it belongs to, with a mobile communication network, using said relay device, said mobile communication terminal comprising
- a transmission/reception unit for performing transmission/reception of signals with an external device,
- an advertisement information monitoring unit for detecting whether or not said mobile communication terminal is subordinate to said relay device, based on advertisement information transmitted from said relay device using said transmission/reception unit, and
- a control unit for, in the event that the state of said mobile communication terminal changes from a state non-subordination to said relay device to a state of subordination, transmitting a hierarchical registration request for registering the subordination relation to said relay device or said mobile communication network, using said transmission/reception unit.

40. A mobile communication system, comprising:

a plurality of base stations, and one or a plurality of switches;

a location information managing device which is used with a mobile communication network comprising a plurality of base stations which perform communication with mobile communication terminals and a plurality of switches which perform communication with the base stations, for performing communication with said plurality of switches and managing location registration area information indicating which location registration area said mobile communication terminals belong to, said location information managing device comprising
- a hierarchical table for storing, in a correlated manner, an terminal identification number for identifying a mobile communication terminal to be a parent, and a terminal identification number of a mobile communication terminal to be a child, and
- a location table for storing, in a correlated manner, said terminal identification number and said location registration area information; and a mobile communication terminal which performs communication with a mobile communication network, and autonomously constructs hierarchical relations with other mobile communication terminals, said mobile communication terminal comprising
- a first storing unit for storing own terminal identification number for identifying said mobile communication terminal,
- an advertisement unit for performing advertisement of terminal advertisement information containing said own terminal identification number,
- a hierarchy unit wherein, in the event of receiving said terminal advertisement information advertised from another mobile communication terminal, one of said mobile communication terminal and the other mobile communication terminal becomes a parent and the other becomes a child, following predetermined rules,
- a second storing unit for storing a child terminal identification number for identifying the mobile communication terminal to be a child, in the event that said mobile communication terminal becomes a parent, and
- a third storing unit for storing a parent terminal identification number for identifying the mobile communication terminal to be a parent, in the event that said mobile communication terminal becomes a child.

* * * * *

UNITED STATES PATENT AND TRADEMARK OFFICE
CERTIFICATE OF CORRECTION

| | |
|---|---|
| PATENT NO. | : 7,113,784 B2 |
| APPLICATION NO. | : 10/182926 |
| DATED | : September 26, 2006 |
| INVENTOR(S) | : Masumi Fujiwara et al. |

It is certified that error appears in the above-identified patent and that said Letters Patent is hereby corrected as shown below:

On the Title Page

In column 1, item (54), delete "METHOD OF REGISTERING POSITION OF MOBILE COMMUNICATION TERMINAL, GENERAL CALLING METHOD FOR MOBILE COMMUNICATION TERMINAL AND MOBILE COMMUNICATION SYSTEM" and substitute --LOCATION REGISTRATION METHOD FOR MOBILE COMMUNICATION TERMINALS, EN BLOC PAGING METHOD FOR MOBILE COMMUNICATION TERMINALS, AND MOBILE COMMUNICATION SYSTEM-- in its place.

Column 48, in claim 11, line 5, after "terminal transmits" delete "an" and substitute --a-- in its place.

Column 48, in claim 13, line 2, immediately after "according to claim 11" delete "," (comma) and substitute --;-- (semicolon) in its place.

Column 48, in claim 13, line 10, immediately after "received" delete "," (comma).

Column 48, in claim 14, line 2, immediately after "according to claim 11" delete "," (comma) and substitute --;-- (semicolon) in its place.

Column 48, in claim 15, line 2, immediately after "according to claim 13" delete "," (comma) and substitute --;-- (semicolon) in its place.

Column 49, in claim 16, line 2, immediately after "according to claim 14" delete "," (comma) and substitute --;-- (semicolon) in its place.

Columns 51-52, in claim 31, line 16, after "identification number" delete "belong" and substitute --belongs-- in its place.

Columns 53-54, in claim 38, line 12, immediately after "comprising" insert --:-- (colon).

Columns 54-55, in claim 39, line 14, immediately after "comprising" insert --:-- (colon).

Columns 54-55, in claim 39, line 24, immediately after "area information" delete ":" (colon) and substitute --;-- (semicolon) in its place.

UNITED STATES PATENT AND TRADEMARK OFFICE
CERTIFICATE OF CORRECTION

PATENT NO. : 7,113,784 B2
APPLICATION NO. : 10/182926
DATED : September 26, 2006
INVENTOR(S) : Masumi Fujiwara et al.

It is certified that error appears in the above-identified patent and that said Letters Patent is hereby corrected as shown below:

Columns 54-55, in claim 39, line 30, immediately after "said relay device comprising" insert --:-- (colon).

Columns 54-55, in claim 39, line 68, immediately after "terminal comprising" insert --:-- (colon).

Columns 54-55, in claim 39, line 80, before "non-subordination" insert --of--.

Columns 55-56, in claim 40, line 14, immediately after "comprising" insert --:-- (colon).

Columns 55-56, in claim 40, line 16, before "terminal identification number" delete "an" and substitute --a-- in its place.

Columns 55-56, in claim 40, line 27, immediately after "terminal comprising" insert --:-- (colon).

Columns 55-56, in claim 40, line 37, after "mobile communication" delete "terminal" and substitute --terminals-- in its place.

Signed and Sealed this

Third Day of April, 2007

JON W. DUDAS
*Director of the United States Patent and Trademark Office*